US010571951B2

(12) United States Patent
Takizawa et al.

(10) Patent No.: US 10,571,951 B2
(45) Date of Patent: Feb. 25, 2020

(54) INPUT/OUTPUT OPERATION DEVICE

(71) Applicant: Panasonic Intellectual Property Management Co., Ltd., Osaka (JP)

(72) Inventors: Teruyuki Takizawa, Osaka (JP); Hironori Tomita, Nara (JP); Hideki Shirane, Osaka (JP); Jiro Seki, Osaka (JP); Takeshi Nakazawa, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 287 days.

(21) Appl. No.: 15/526,671

(22) PCT Filed: Nov. 18, 2015

(86) PCT No.: PCT/JP2015/005775
§ 371 (c)(1),
(2) Date: May 12, 2017

(87) PCT Pub. No.: WO2016/079987
PCT Pub. Date: May 26, 2016

(65) Prior Publication Data
US 2019/0101949 A1   Apr. 4, 2019

(30) Foreign Application Priority Data

Nov. 19, 2014  (JP) ................. 2014-234815

(51) Int. Cl.
*G05G 9/047* (2006.01)
*G05B 19/042* (2006.01)
(Continued)

(52) U.S. Cl.
CPC .......... *G05G 9/047* (2013.01); *G01C 21/365* (2013.01); *G01C 21/3664* (2013.01);
(Continued)

(58) Field of Classification Search
USPC ...................................................... 345/161
See application file for complete search history.

(56) References Cited

U.S. PATENT DOCUMENTS 4,533,827 A * 8/1985 Fincher ................. G05G 9/047
250/214 PR
5,643,087 A * 7/1997 Marcus .................. A63F 13/06
463/38
(Continued)

FOREIGN PATENT DOCUMENTS

JP   58-172739 A   10/1983
JP   05-057645 A   3/1993
(Continued)

OTHER PUBLICATIONS

International Search Report for corresponding International Application No. PCT/JP2015/005775 dated Feb. 23, 2016.

*Primary Examiner* — Chineyere D Wills-Burns
(74) *Attorney, Agent, or Firm* — Renner, Otto, Boisselle & Sklar, LLP

(57) ABSTRACT

An input/output operation device includes an actuator detection circuit part, a drive circuit part, a drive control calculation processing part that controls the drive circuit part, and a rotation body on which the actuator is installed. The actuator includes a movable unit freely rotatable independently about two axes orthogonal to each other, a fixed unit supporting the movable unit for free rotation, and a drive part driving the movable unit with respect to the fixed unit. The detection circuit part outputs a position signal corresponding to a position of an operation part. The drive circuit part controls the drive part. The rotation body rotates about a rotation axis, in which the control calculation processing part controls the drive of the operation part through use of a coordinate system stationary with respect to a reference rotation angle of the rotation body at different rotation angles of the rotation body.

20 Claims, 34 Drawing Sheets

(51) Int. Cl.
*G01C 21/36* (2006.01)
*G06F 3/0338* (2013.01)
*G05G 5/03* (2008.04)
*G05B 19/418* (2006.01)

(52) U.S. Cl.
CPC ..... *G05B 19/0423* (2013.01); *G05B 19/4184* (2013.01); *G05G 5/03* (2013.01); *G06F 3/0338* (2013.01); *G05G 2009/04707* (2013.01); *G05G 2009/04714* (2013.01); *G05G 2009/04748* (2013.01); *G05G 2009/04755* (2013.01); *G05G 2009/04759* (2013.01); *G05G 2009/04766* (2013.01); *G05G 2009/04781* (2013.01)

(56) References Cited

U.S. PATENT DOCUMENTS

| | | | |
|---|---|---|---|
| 6,873,931 B1* | 3/2005 | Nower | G01B 11/272 |
| | | | 702/151 |
| 2002/0190945 A1* | 12/2002 | Arita | G05G 9/047 |
| | | | 345/156 |
| 2005/0259075 A1 | 11/2005 | Ishikawa et al. | |
| 2006/0276940 A1* | 12/2006 | Berg | B60K 35/00 |
| | | | 701/1 |
| 2008/0278448 A1* | 11/2008 | Nilsagard | G05G 9/053 |
| | | | 345/161 |
| 2012/0155843 A1* | 6/2012 | Takizawa | G03B 5/00 |
| | | | 396/55 |
| 2012/0188441 A1* | 7/2012 | Takizawa | H04N 5/2251 |
| | | | 348/374 |
| 2016/0357272 A1* | 12/2016 | Kumahara | G06F 3/0338 |
| 2017/0322586 A1* | 11/2017 | Shirane | G06F 3/03 |

FOREIGN PATENT DOCUMENTS

| | | |
|---|---|---|
| JP | 2001-066143 A | 3/2001 |
| JP | 2005-332039 A | 12/2005 |
| JP | 2013-095367 A | 5/2013 |

* cited by examiner

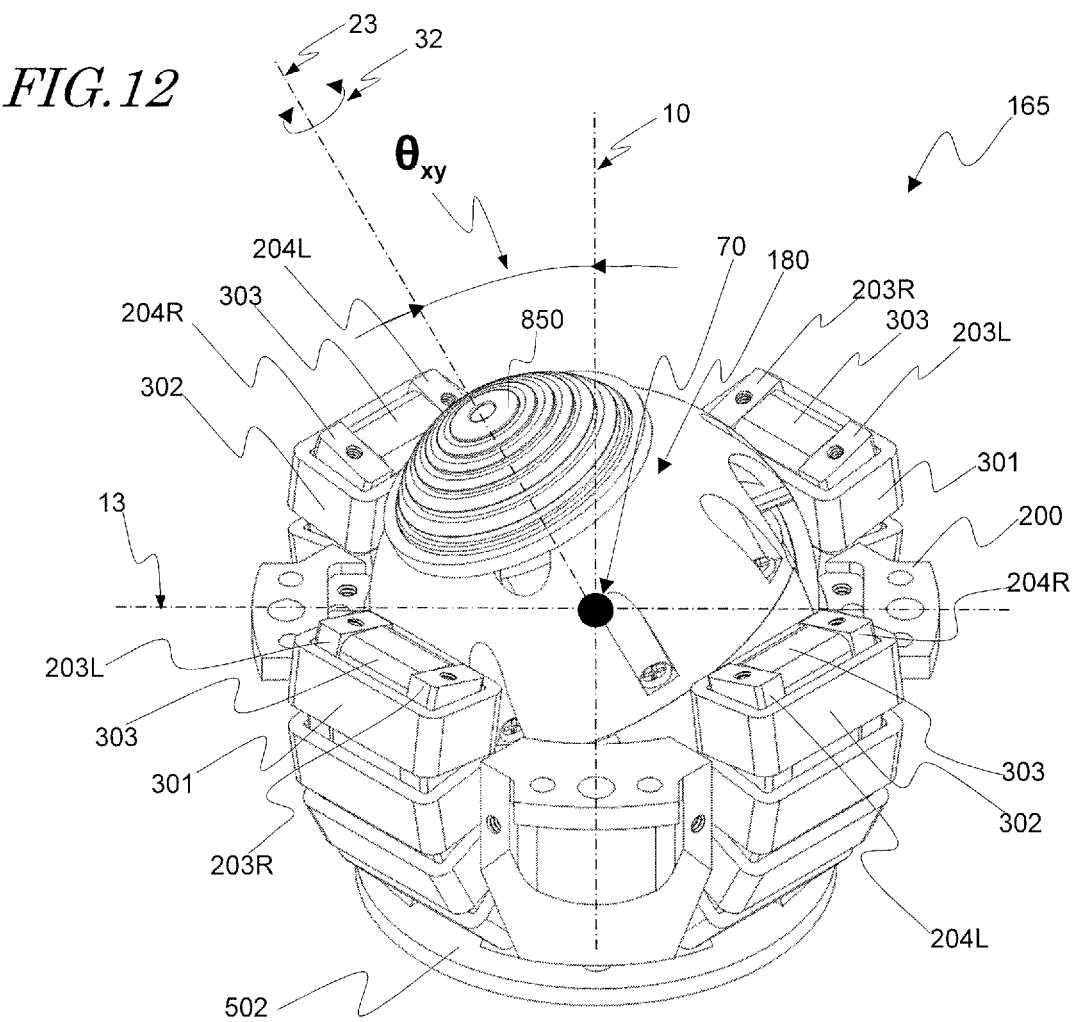

INPUT/OUTPUT OPERATION DEVICE

TECHNICAL FIELD

This application relates to an input/output operation device including a two-axis or three-axis input operation part to be provided on a steering wheel.

BACKGROUND ART

In recent years, an increase in degree and diversity of functionalities are in progress in electronic devices installed, in vehicles in order to increase safety, security, and comfort. As a result, operation procedures carried out by a driver have become very complex. In terms of simplification of the complex operation, for example, a human-machine interface (HMI) matching a sense of an operator and high in operability is required, for operations on a navigation system, an air conditioner, an audio device, a radio, and other such devices. Moreover, in order to suppress movement of the line of sight of the driver during traveling, an input device may be installed on a steering wheel.

As HMIs having compatibility, there have been proposed an input device enabling a three-axis operation and a haptic device having a force feedback function.

For example, in Patent Document No. 1, there is disclosed a three-axis input operation device configured to restrict movement directions of an operation part so that the operation part can move only in X, Y, and Z axis directions, and carry out position detection of the operation part in the X, Y, and Z axis directions.

In Patent Document No. 2, there is disclosed an input operation device configured to hold an operation part for rotation about three axes, and capable of detecting rotation angles.

Moreover, in Patent Document No. 3, there is disclosed a haptic device configured to rotate an operation part about X and Y axes, detect relative displacement amounts about the axes, and apply a force sense to the operation part by motors installed in respective rotation mechanisms.

In Patent Document No. 4, there is disclosed a steering wheel switch that is installed on a steering wheel, and enables a depression operation and a rotation operation.

CITATION LIST

Patent Literature

Patent Document No. 1: Japanese Patent Application Laid-Open Publication No. Sho 58-172739
Patent Document No. 2: Japanese Patent Application Laid-Open Publication No. Hei 5-57645
Patent Document No. 3: Japanese Patent Application Laid-Open Publication No. 2005-332039
Patent Document No. 4: Japanese Patent Application Laid-Open Publication No. 2013-95367

SUMMARY OF INVENTION

Technical Problem

There has been demanded an HMI higher in operability in the related-art input devices and haptic devices. Non-limitative but illustrative embodiments of this application provide an input/output operation device higher is operability.

Solution to Problem

An input/output operation device according to one embodiment of this disclosure includes: an actuator including: a movable unit including an operation part, which has a surface with which a finger comes in contact, and one of a one recessed contact surface and a protruded spherical surface located inside, the movable unit being freely rotatable independently about two axes orthogonal to each other; a fixed unit including another one of recessed contact surface and protruded spherical surface to which the one of the recessed contact surface and the protruded spherical surface of the movable unit loosely fit, the one of the recessed contact surface and the protruded spherical surface of the movable unit and the another one of recessed contact surface and the protruded spherical surface being in point- or line-contact with each other, the fixed unit being configured to support, for free rotation, the movable unit about a spherical center of the protruded spherical surface; and a drive part configured to drive the movable unit with respect to the fixed unit; a detection circuit part configured to output a position signal corresponding to a position of the operation part; a drive circuit part configured to control the drive part; a control calculation processing part configured to control the drive circuit part; and a rotation body on which the actuator is installed, and which is configured to rotate about a rotation axis, in which the control calculation processing part is configured to control the drive of the operation part through use of a coordinate system stationary with respect to a reference rotation angle of the rotation body at different rotation angles of the rotation body.

Advantageous Effects of Invention

With the input/output operation device according to this disclosure, by installing the input/output operation part having two or three operation axes and enabling two- or three-dimensional operation directions on a steering wheel, thereby converting coordinates in the operation direction of the input/output operation part in accordance with an operation rotation angle of the steering wheel, the operation direction can always be maintained constant with respect to absolute coordinates formed of a horizontal axis and a vertical axis orthogonal to the horizontal axis at a neutral position of the steering wheel.

BRIEF DESCRIPTION OF DRAWINGS

FIG. 12 is a perspective view for illustrating the actuator 165 according to the embodiment of the present invention viewed from above without the detachment prevention member 201 under a state in which the actuator 165 is rotated at a composite angle θxy of the same angles in a rotation direction 20 and a rotation direction 21.

DESCRIPTION OF EMBODIMENTS

Figure 1:
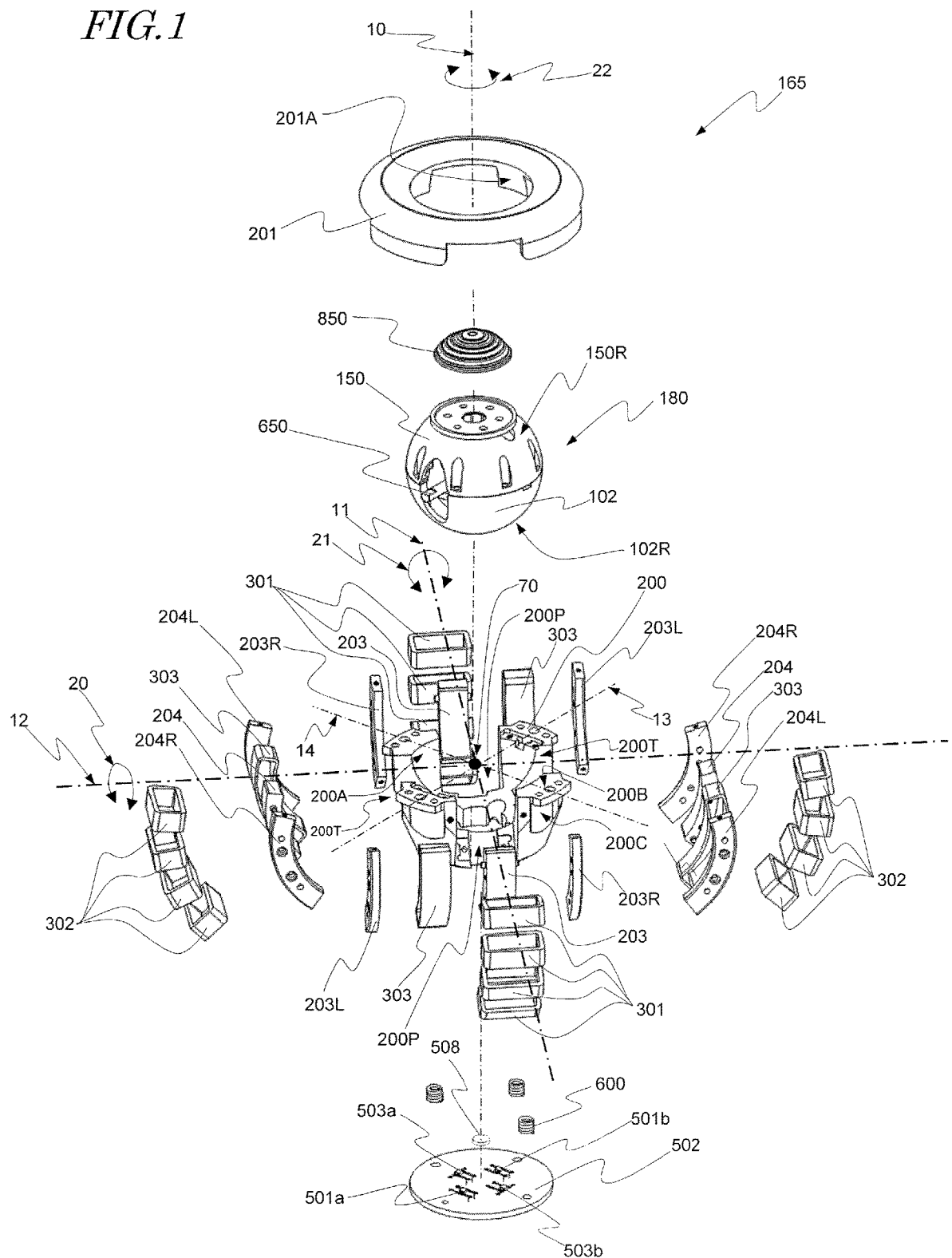
FIG. 1 is an exploded perspective view for illustrating a schematic configuration of an actuator 165 in an input/output operation device 750 according to the present invention.

For example, in an in-vehicle input/output operation device for receiving an operation of a driver, an intuitive operation friendly to the driver, a blind operation without requiring visual recognition of an operation part, and further, quality operation feeling for supporting a comfortable driving environment are required in terms of safety and security.

In general, many of multi-axis input/output operation parts are relatively easy to configure by combining, and thus are realized by combining a plurality of rotation mechanisms rotatable about axes. Moreover, each of the rotation mechanisms is coupled to a drive motor via a transmission mechanism, for example, gears (rack and pinion, and a worm wheel and a worm gear), and the operation part is configured to be rotationally driven about the respective rotation axes. Moreover, an encoder or the like is provided on a drive shaft of the drive motor, and a relative position displacement amount of the operation part is thus detected.

However, when this configuration is used, the weight of a movable operation part increases, and the size the entire input device tends to increase. Moreover, rattle noise caused by a bearing gap and a play in an axial direction occur in a bearing of the rotation mechanism, which can be a cause for generating noise and inducing a mechanical and structural defect.

Moreover, a backlash needs to be provided in the transmission mechanism, for example, gears, interposing between the movable part and the drive motor. Therefore, a gap is increased by a wear and the like, which can cause a decrease in position precision of the operation part, generation of mechanical vibration and noise, and a decrease in the service life of the device.

Further, when a multi-axis input operation part is provided on a steering wheel, the axes of the input operation part also rotate along with the rotation of the steering wheel, and a direction to be operated thus changes, which may disturb the driver.

Such problems may exist in the technologies disclosed in Patent Documents No. 1 to No. 4. In view of such problems, the inventors of this application have arrived at a novel input/output operation device.

An input/output operation device according to this disclosure includes: an actuator including; a movable unit including an operation part, which has a surface with which a finger comes in contact and one of a recessed contact surface and a protruded spherical surface located inside, the movable unit being freely rotatable independently about two axes orthogonal to each other; a fixed, unit including another one of the recessed contact surface and the protruded spherical surface to which the one of the recessed contact surface and the protruded spherical surface of the movable unit loosely fit, the one of the recessed contact surface and the protruded spherical surface of the movable unit and the another one of the recessed contact surface and the protruded spherical surface being in point- or line-contact with each other, the fixed unit being configured to support, for free rotation, the movable unit about a spherical center of the protruded spherical surface; and a drive part configured to drive the movable unit with respect to the fixed unit; a detection circuit part configured to output a position signal corresponding to a position of the operation part; a drive circuit part configured to control the drive part; a control calculation processing part configured to control the drive circuit part; and a rotation body on which the actuator is installed, and which is configured to rotate about a rotation axis, in which the control calculation processing part is configured to control the drive of the operation part through use of a coordinate system stationary with respect to a reference rotation angle of the rotation body at different rotation angles of the rotation body.

The two axes may be an X axis and a Y axis orthogonal to the X axis, the X axis and the Y axis having an origin located at the spherical center of the protruded spherical surface. The fixed unit may include at least one magnetic substance. The movable unit may include at least one attraction magnet, and may be configured to freely rotate about the spherical center of the protruded spherical surface by a magnetic attraction force between the at least one attraction magnet and the at least one magnetic substance. The drive part may include: a first drive part configured to rotate the movable unit about the X axis passing through the spherical center; and a second drive part configured to rotate the movable unit about the Y axis in a plane containing the X axis. The detection circuit part may be configured to generate a first rotation angle signal and a second rotation angle signal corresponding to a first rotation angle about the X axis of the movable unit and a second rotation angle about the Y axis of the movable unit, respectively. The control calculation processing part may be configured to generate a first target rotation angle signal corresponding to a rotation angle about the X axis and a second target rotation angle signal corresponding to a rotation angle about the Y axis.

The stationary coordinate system may have an origin corresponding to the spherical center of the protruded spherical surface.

The control calculation processing part may be configured to generate current position coordinates of the operation part in a two-dimensional coordinate system corresponding to a movable range area of the operation part based on the first rotation angle signal and second rotation angle signal to generate the first target rotation angle signal and the second target rotation angle signal based on position feedback control using a difference between target position coordinates and the current position coordinates.

The drive part further may include a third drive part configured to rotate the movable unit about a Z axis passing through the spherical center and orthogonal to the X axis and the Y axis. The detection circuit part may be configured to generate a third rotation angle signal corresponding to a third rotation angle about the Z axis of the movable unit. The control calculation processing part may be configured to generate a drive signal having a predetermined drive waveform pattern. The drive circuit part may be configured to receive the drive signal to generate a signal for driving the third drive part. The movable unit may be driven for vibration in a direction about the Z axis by the third drive part.

The predetermined driveway waveform pattern may include a vibration waveform including a frequency component in an audible range.

The movable unit may include the recessed contact surface, and the fixed unit may include the protruded spherical surface.

The movable unit may include the protruded spherical surface, and the fixed unit may include the recessed contact surface.

The recessed contact surface may be a conical surface.

The recessed contact surface of the movable unit may have a conical surface.

The fixed unit may further include a base and a coupling rod configured to fix the another one of the recessed contact surface and the protruded spherical surface to the base. The movable unit may include an opening part into which the coupling rod is to be inserted, and a rotation angle of the movable unit may be restricted by contact between the opening part and the coupling rod.

The input/output operation device may further include a detachment prevention member arranged in the fixed unit, the detachment prevention member including a restriction surface for restricting movement of the movable unit so as to prevent the movable unit from being detached from the fixed unit. The restriction surface may include a recessed partial spherical surface having a center matching the spherical center.

The first drive part may include a pair of first drive magnets arranged symmetrically about the Z axis in the movable unit, a pair of first magnetic yokes arranged on a base of the fixed unit so as to be opposed to the pair of first drive magnets, respectively, and a pair of first drive coils wound on the pair of first magnetic yokes, respectively. The second drive part may include a pair of second drive magnets arranged symmetrically about the Z axis in the movable unit, a pair of second magnetic yokes arranged on the base of the fixed unit so as to be opposed to the pair of second drive magnets, respectively, and a pair of second drive coils wound, on the pair of second magnetic yokes, respectively. The pair of first drive magnets and the pair of first drive coils may be arranged on one straight line passing through the spherical center of the protruded spherical surface. The pair of second drive magnets and the pair of second drive coils may be arranged on another straight line passing through the spherical center of the protruded spherical surface and orthogonal to the one straight line. Respective positions in the Z axis direction of centers of the pairs of first drive magnets, the pairs of first drive coils, the pairs of second drive magnets, and the pairs of second drive coils may substantially match a position of the spherical center of the protruded spherical surface.

The third drive part may includes third drive coils wound on the pair of first magnetic yokes and the pair of second magnetic yokes, respectively, and be configured to use the pair of first drive magnets and the pair of second drive magnets as third drive magnets.

The drive part may further include a pair of magnetic back yokes, which are arranged on the spherical center side of the movable unit, and are configured to couple one of the pair of first drive magnets and one of the pair of second drive magnets to each other, and to couple another one of the pair of first drive magnets and another one of the pair of second drive magnets to each other.

Under a state in which the movable unit is at a neutral position, the pair of first drive magnets and the pair of second drive magnets may be arranged downward at a rotation angle A equal to or less than 45 degrees with respect to a horizontal surface passing through the spherical center and vertical to the Z axis, and the pair of first drive coils and the pair of first magnetic yokes, and the pair of second drive coils and the pair of second magnetic yokes may be arranged to be rotated with respect to the fixed unit so as to be opposed to the pair of first drive magnets and the pair of second drive magnets, respectively.

The rotation angle A may be equal to or more than 15 degrees and equal to or less than 25 degrees.

The pair of first drive magnets and the pair of second drive magnets may each be positioned inside the movable unit, and may each be inhibited from being exposed on an external shape surface of the movable unit.

The pair of first drive coils, the pair of second drive coils, and the third drive coils may each be arranged inside the fixed unit, and may each be inhibited from being exposed on an external shape surface of the fixed unit.

A center of gravity of the movable unit may match the spherical center.

The input/output operation device may further include a detector including a first detection part and a second detection part. The first detection part may include: a first magnetic sensor fixed to the fixed unit; and an inclination angle detection magnet arranged in the movable unit. The first magnetic sensor may be configured to detect a magnetic force change caused by a rotation of the inclination angle detection magnet, thereby calculating two-dimensional rotation angles about the X axis and the Y axis.

The first magnetic sensor and the inclination angle detection magnet may be opposed to each other on the Z axis.

The input/output operation device may further include a magnetic bias magnet, which is opposed to the inclination angle detection magnet, arranged on the Z axis, and fixed to the fixed unit.

The magnetic bias magnet may have a function of a magnetic spring configured to return the movable unit to a neutral position.

The input/output operation device may further include a detector including a first detection part and a second detection part. The first detection part may include: an optical sensor fixed to the fixed unit; and a light detection pattern arranged at a position corresponding to the optical sensor on an outside surface of the movable unit. The optical sensor may be configured to detect a change in light entering the optical sensor caused by a rotation of the light detection pattern, thereby calculating two-dimensional rotation angles about the X axis and the Y axis of the operation part.

The optical sensor and the light detection pattern may be positioned on the Z axis.

When the movable unit is at the neutral position, the first magnetic sensor may be arranged, on a plane orthogonal to the Z axis, on a straight line forming angles of 45 degrees with respect to a straight line connecting the pair of first drive magnets to each other, and to a straight line connecting the pair of second drive magnets to each other.

The detection circuit part may include a pair of rotation detection magnets arranged symmetrically about the Z axis in the movable unit, and a pair of second magnetic sensors fixed to the fixed unit and fixed so as to be opposed to the pair of rotation detection magnets, respectively. The pair of second magnetic sensors may be configured to detect magnetic force changes caused by the rotations of the pair of rotation detection magnets, thereby calculating a rotation angle of the operation part.

The pair of rotation detection magnets may include magnets that are magnetized in two poles in directions parallel with a straight line passing through the spherical center and opposite to each other on a plane orthogonal to the Z axis.

The restriction surface of the detachment prevention member and the external shape surface of the movable unit may have a gap formed therebetween. The gap may be determined so that, even when the one of the recessed contact surface and the protruded spherical, surface of the movable unit is separated from the another one of the recessed contact surface and the protruded spherical surface of the fixed unit, the movable unit and the fixed unit return to the point- or line-contact state by the magnetic attraction force.

The input/output operation device may further include a switch member having a ring shape, which is arranged at an upper portion of the fixed unit so as to surround a periphery of the movable unit.

With the input/output operation device according to this disclosure, by installing the input/output operation part having two or three operation axes and enabling two- or three-dimensional operation directions on the steering wheel, thereby converting the coordinates in the operation direction of the input/output operation part in accordance with an operation rotation angle of the steering wheel, the operation direction can always be maintained constant with respect to absolute coordinates formed of a horizontal axis and a vertical axis orthogonal to the horizontal, axis at a neutral position of the steering wheel.

As a result, the operation direction of the input/output operation part can be fixed to, for example, a horizontal direction and a vertical direction regardless of the operation rotation angle of the steering wheel. Thus, determination and recognition of the operation direction of the input/output operation part can be extremely simplified for the driver during the rotation operation on the steering wheel, and a frequency of movement of the line of sight with respect to the input/output operation part can greatly be decreased.

Further, the spherical center of the protruded spherical surface provided on the fixed part and the center axis of the recessed contact surface having a conical shape, which is provided on the movable part so as to be in contact with the protruded spherical surface, are arranged on the extension of the center axis of the operation part including a surface that comes in contact with fingers, and the movable part divided into two portions is configured to be joined so as to surround the protruded spherical surface at the center. With this configuration, the input/output operation part can realise support of the center of gravity of the movable part on which the operation part is installed and greatly suppress mechanical resonance in a drive frequency region.

Further, a constant normal force is added by the magnetic attraction force that does not affect the rotation angle of the movable part in the pivot configuration constructed by the protruded spherical surface of the fixed part and the recessed contact surface of the movable part. With this configuration, friction load fluctuation with respect to the rotation angle can be decreased, thereby realizing satisfactory phase/gain characteristics in the drive frequency range.

Further, the detachment prevention restriction surface is provided on the fixed part via the predetermined gap for permitting the rotation of the movable part. With this configuration, the prevention of detachment of the movable part caused by disturbance and the like, for example, vibration and impact, which has hitherto been a serious problem specific to a support structure by the magnetic attraction force, can be positively realized while avoiding the increase in size of the device.

Further, a gap is formed, which has a distance at which the recessed contact surface can be moved to the protruded spherical surface side by the magnetic attraction force to restore the contact even under a state in which the recessed contact surface is disengaged from the protruded spherical surface by the distance of the gap. With this configuration, there can be provided such an extremely safe input/output operation device so as to immediately return to the original satisfactory support state even when the movable part momentarily detaches.

Further, the rotational inclination, drive means about the X axis and the Y axis and the rolling drive means are constructed by two pairs of drive magnets that are arranged on the circumference about the Z axis, are orthogonal to each other, and are fixed to the fixed part, two pairs of drive coils and magnetic yokes arranged on the fixed part so as to be opposed to the drive magnets, respectively, and the height position arranged in the Z axis direction is set to be approximately equal to the height position of the spherical center of the protruded spherical surface. With this configuration, the center of gravity drive for the movable part is realized, and the mechanical resonance can be greatly suppressed in the drive frequency region.

Further, projected areas of the magnetic yokes opposed to the drive magnets are set to be approximately equal to one another. With this configuration, when the rotational inclination angle and the rotation angle of the movable part are 0 degrees, the neutral, point of the movable part by magnetic springs of the magnetic yokes and the drive magnets can be maintained.

Further, the input/output operation part can realize a satisfactory frequency response characteristic and a high rotational inclination angle resolution. Thus, detection sensitivity for the operation on the movable unit by fingertips is very high, and flick input and swipe input often used on a portable terminal and character input can be detected.

A support configuration that is low in friction and is excellent in wear resistance can be realized by covering a surface layer portion of the recessed contact surface or the protruded spherical surface with a resin member.

A space of the pivot configuration constructed by the conical recessed contact surface and the protruded spherical surface to be loosely fit to the recessed contact surface is filled with a viscous member or a magnetic fluid. With this configuration, an amplitude enhancement factor (Q factor) caused by a magnetic spring effect of the magnetic attraction forces generated between the drive magnets installed in the movable part and the magnetic yokes arranged in the fixed part and the Q factor of mechanical natural vibration can be decreased, resulting in a satisfactory control characteristic.

As described above, the present invention can realize satisfactory input/output control of the operation part in the frequency range of a wide band up to approximately 200 Hz by arranging at the origin the pivot support system for enabling the large rotational inclination drive equal to or more than ±25 degrees about the X axis and the Y axis and the rolling drive equal to or more than ±5 degrees. As a result, there is provided an input/output operation device capable of realizing a three-axis multi high-speed operation on the operation part about the X, Y, and Z axes, and allowing the operator to feel a novel tactile/force sense.

Further, the drive two-dimensional coordinates of the operation part formed of the X axis and the Y axis are electrically constructed by coordinate output of the magnetic sensors, and thus the two-dimensional coordinates, which are a drive target, can be corrected so as to cancel the operation rotation angle of the steering wheel by detecting the operation rotation angle of the steering wheel.

In this way, the operation direction of the input/output operation part can be maintained constant in the horizontal and vertical directions independently of the operation rotation angle of the steering wheel. With this configuration, determination and recognition of the operation direction of the driver can be simplified, and the input/output operation part capable of realizing the tactile/force sense enables the driver to perform a touch operation without looking at a steering wheel.

As a result, there can be provided a safe and secure input/output operation device capable of suppressing the movement of the line of sight of the driver during traveling as much as possible.

Embodiment

A description is now given of a steering input/output operation device according to an embodiment of the present invention.

Figure 18:
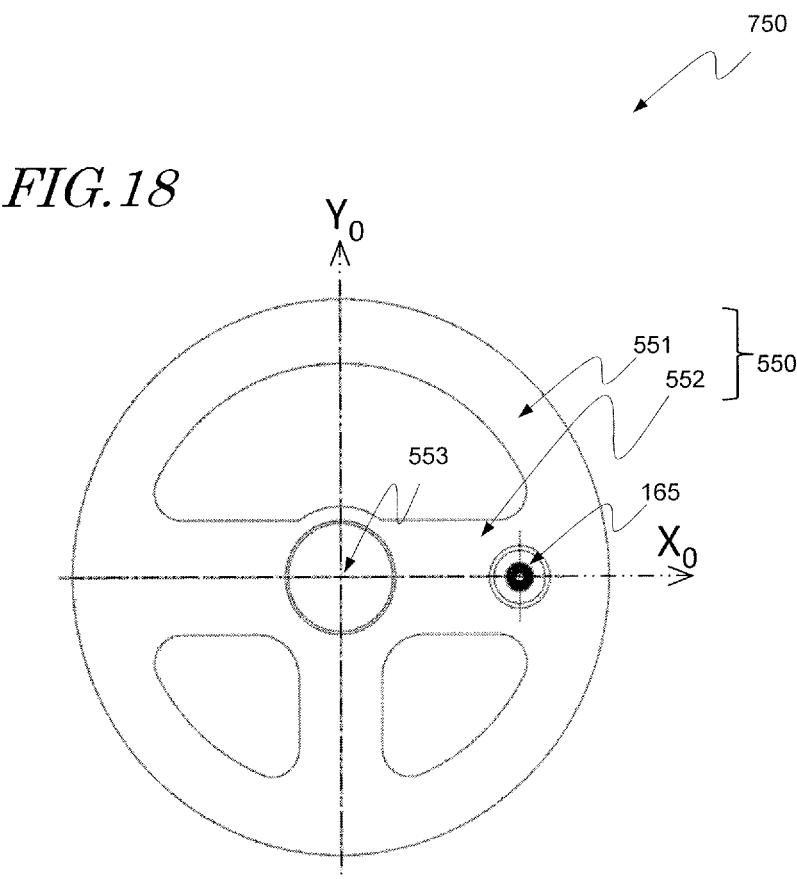
FIG. 18 is a diagram for illustrating a steering wheel on which the input/output operation device is installed.

FIG. 18 is a diagram for schematically illustrating an input/output operation device 750 (FIG. 16) according to this embodiment, which is installed on a steering wheel 550.

The steering wheel 550 is an example of a rotation body configured to rotate about a rotation shaft, and is a steering wheel of, for example, a vehicle. The steering wheel 550 includes a rim 551 and a hub 552. The hub 552 is connected to the rim 551, and includes a rotation shaft 553. A rotation of the steering wheel 550 is transmitted to a steering column or the like provided at a position of the rotation shaft 553 by a driver holding the rim 551 by his or her hands, and rotating the rim 551 about the rotation shaft 553. The rotation of the steering wheel 550 may be detected by a rotation sensor or the like provided on the rotation shaft 553.

The input/output operation device 750 includes an actuator 165 provided on the hub of the steering wheel 550. A detailed description is first given of the actuator 165.

Figure 2:
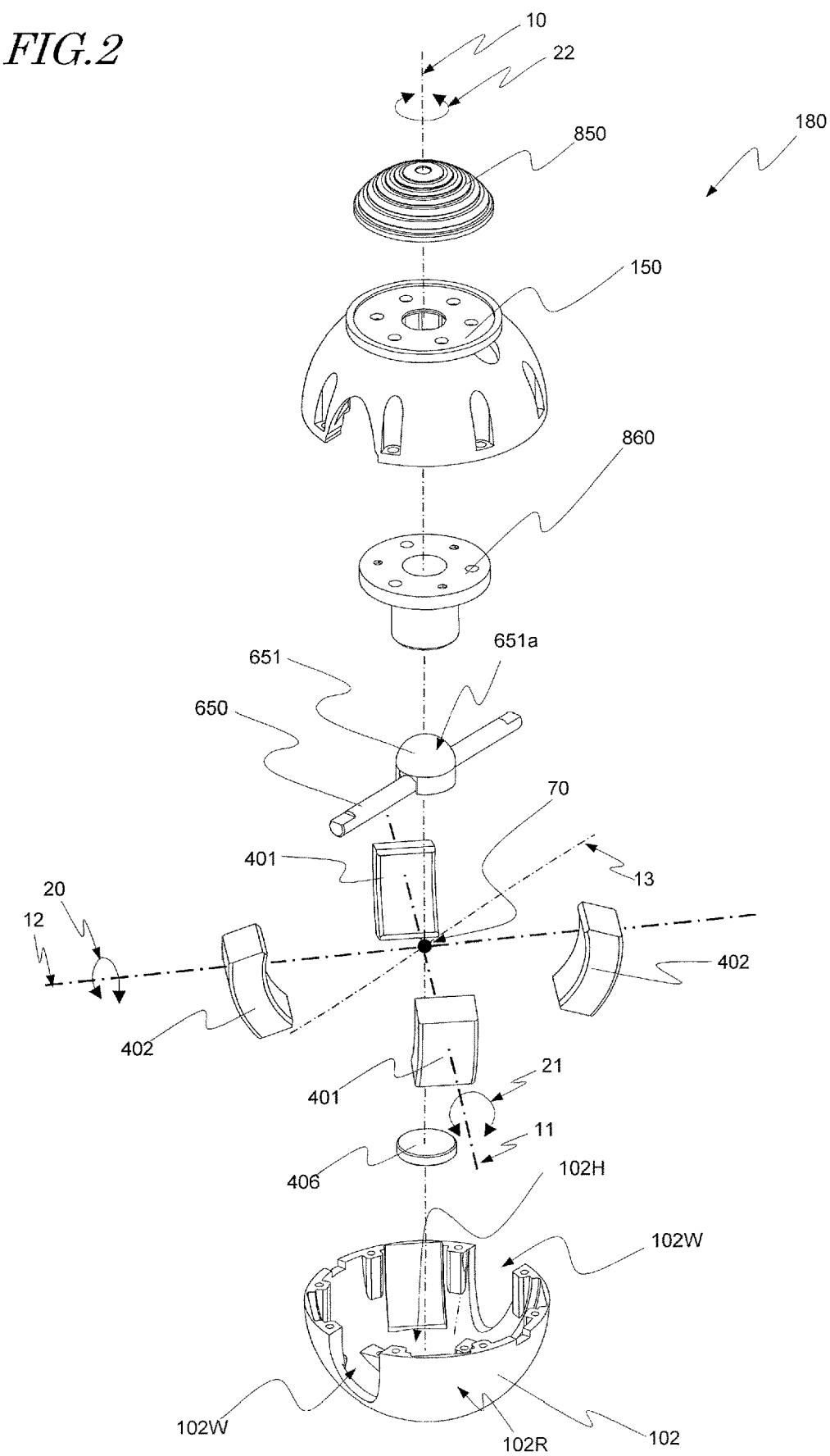
FIG. 2 is an exploded perspective view for illustrating a detailed configuration of a movable unit 180 of the actuator 165 according to an embodiment of the present invention.

FIG. 1 is an exploded perspective view of the actuator 165 in the input/output operation device 750 according to the embodiment of the present invention. FIG. 2 is an exploded perspective view of a movable unit 180 according to the embodiment of the present invention.

Figure 3A:
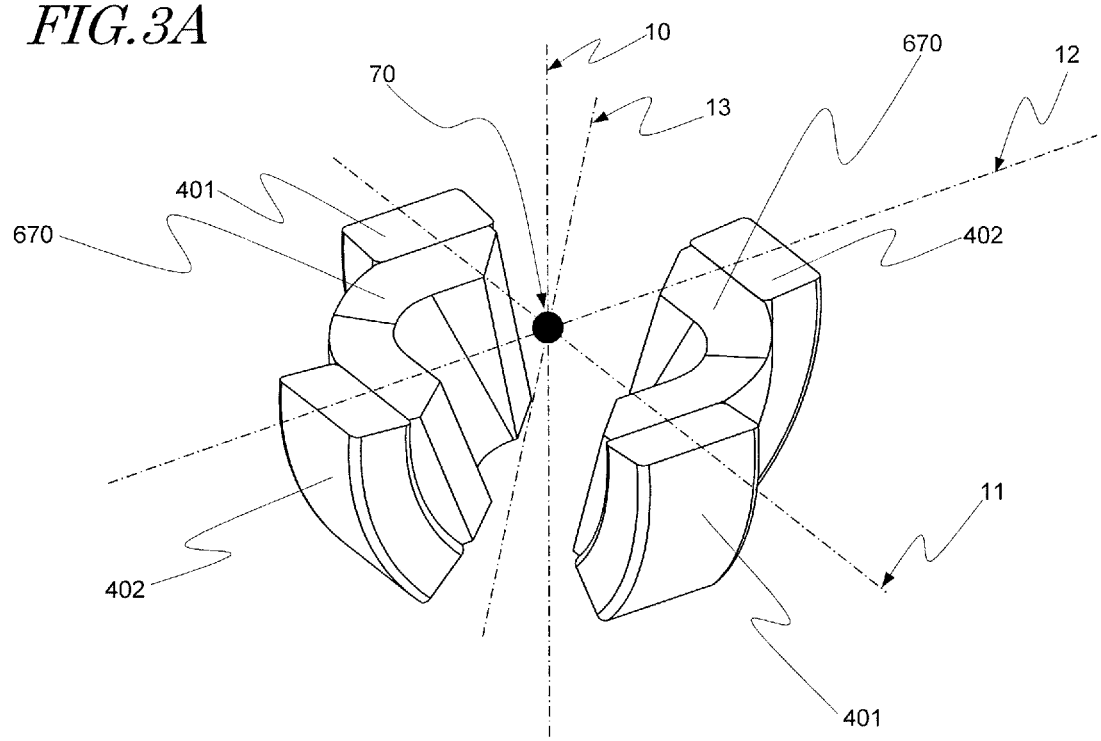
FIG. 3A is a perspective view for illustrating magnetic back yokes 670 of the movable unit 180 of the actuator 165 according to the embodiment of the present invention viewed from above.
Figure 3B:
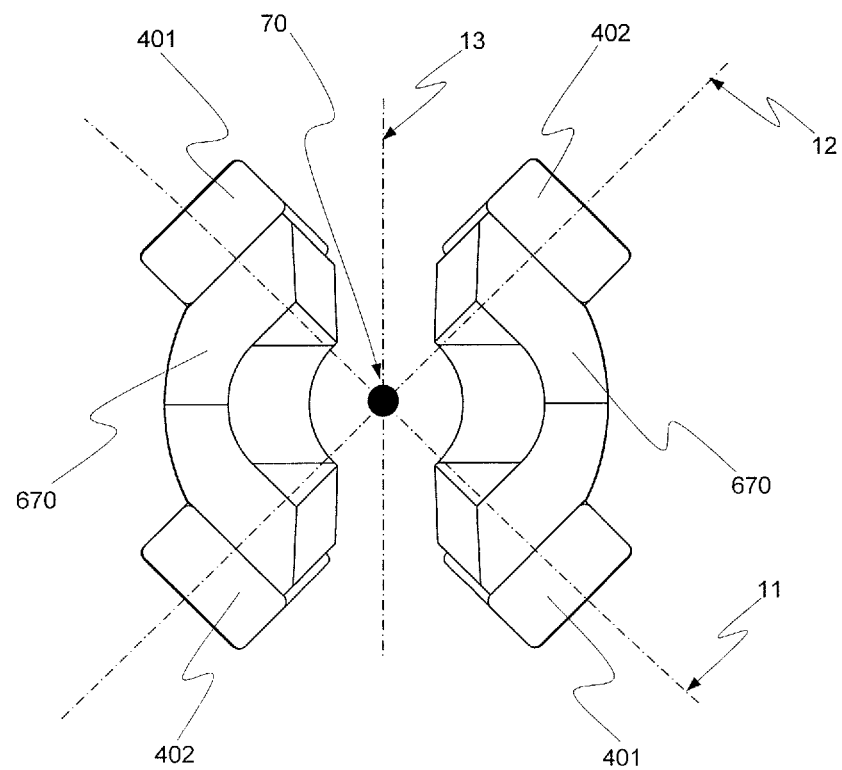
FIG. 3B is a plan view for illustrating the magnetic back yokes 670 of the movable unit 180 of the actuator 165 according to the embodiment of the present invention viewed from above in a Z axis 10 direction.
Figure 4A:
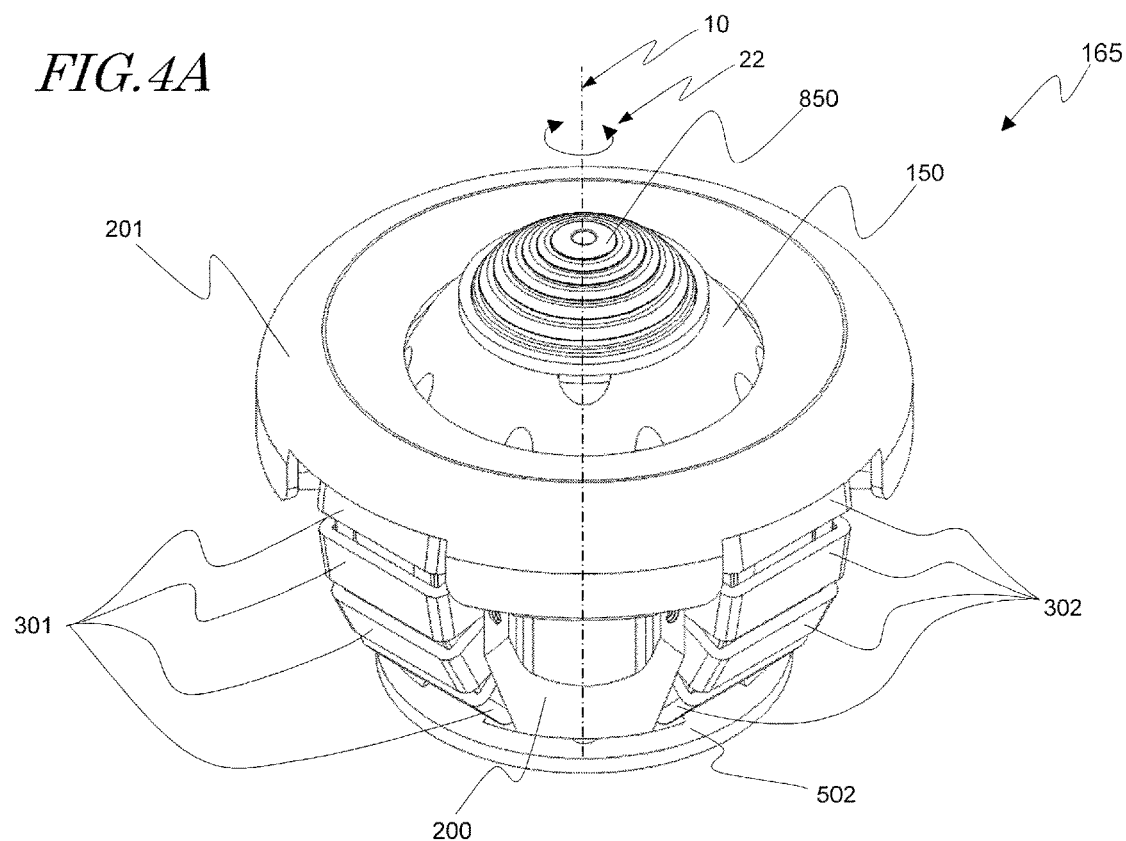
FIG. 4A is a perspective view for illustrating the actuator 165 according to the embodiment of the present invention viewed from above.
Figure 4B:
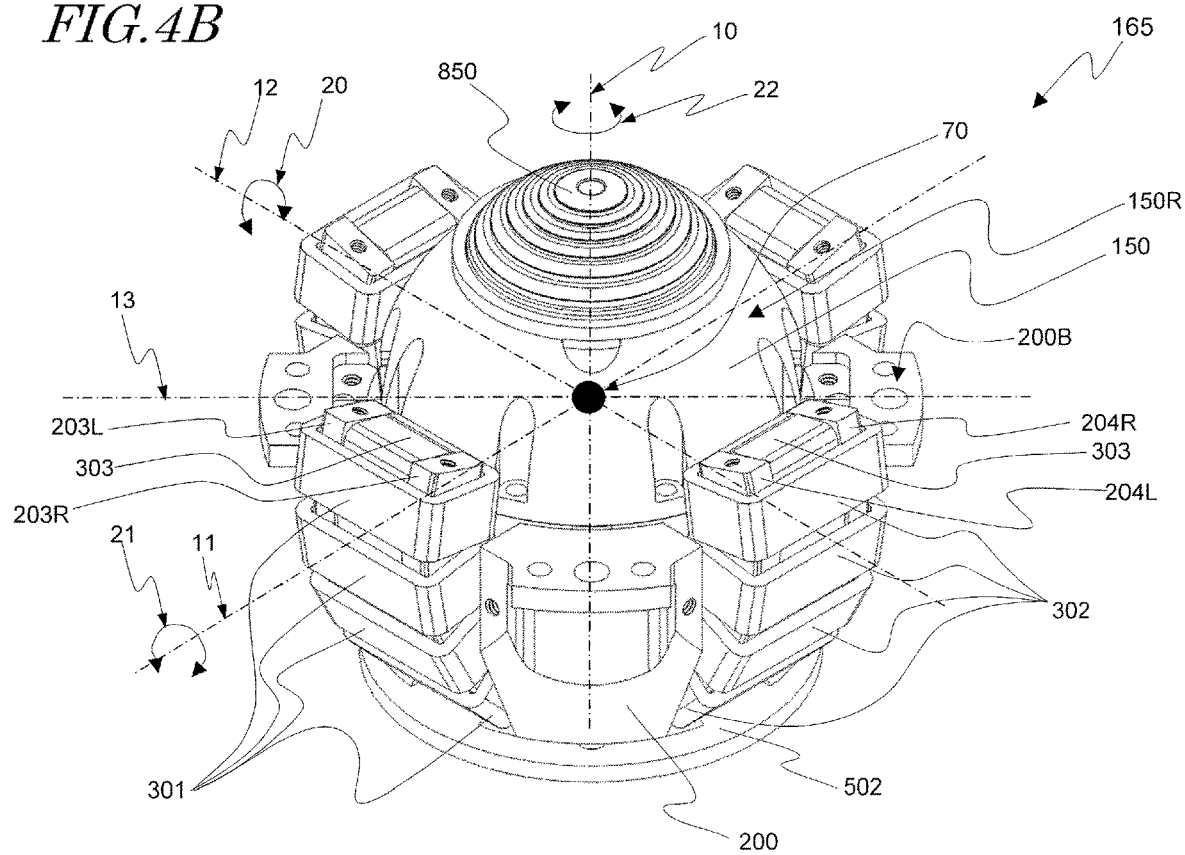
FIG. 4B is a perspective view for illustrating the actuator 165 according to the embodiment of the present invention viewed from above, and is a perspective view without a detachment prevention member 201.
Figure 4C:
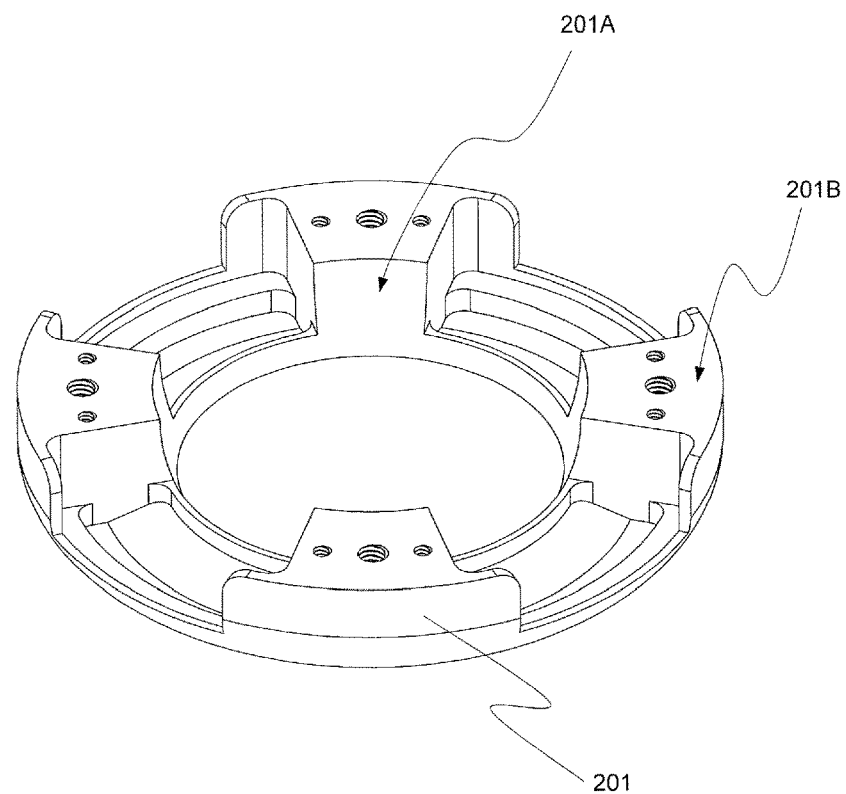
FIG. 4C is a perspective view for illustrating the detachment prevention member 201 of the actuator 165 according to the embodiment of the present invention viewed from above.
Figure 5A:
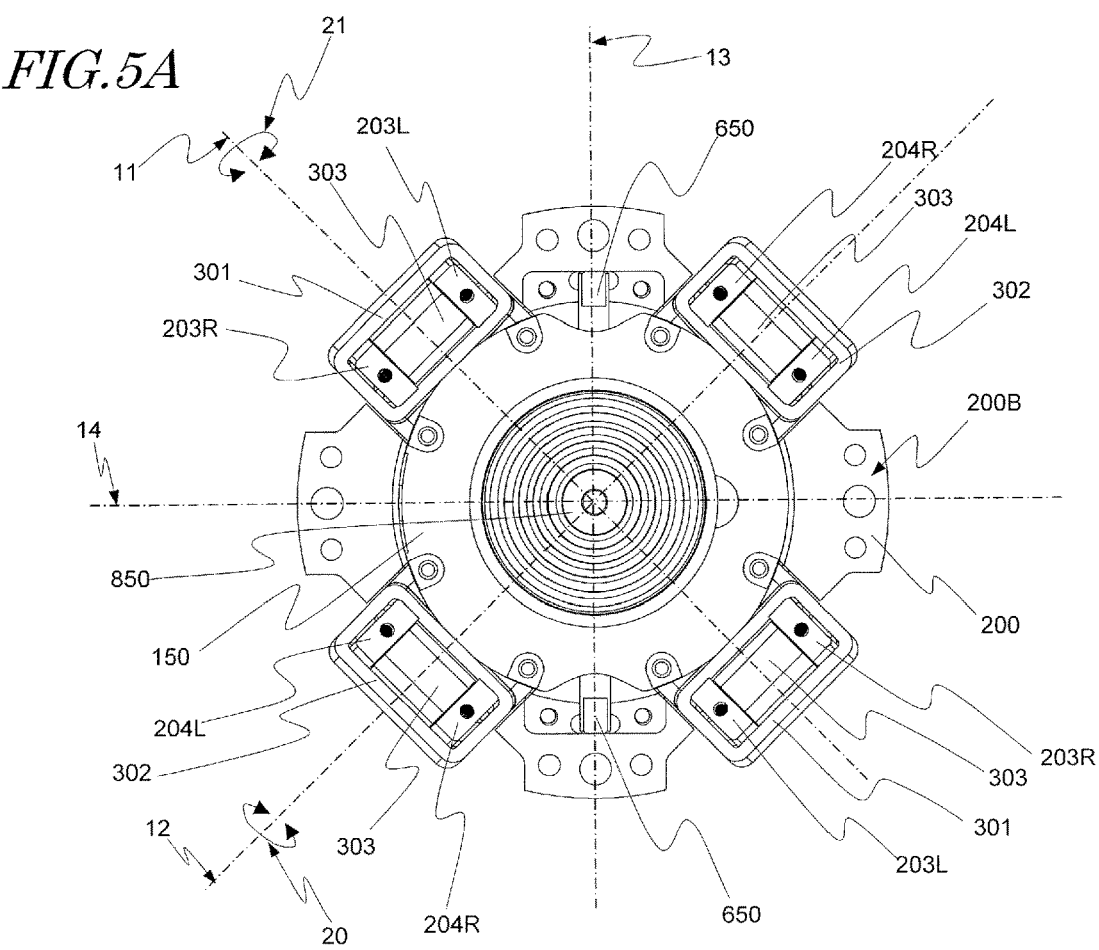
FIG. 5A is a top view for illustrating the actuator 165 according to the embodiment of the present invention viewed in the Z axis 10 direction.
Figure 5B:
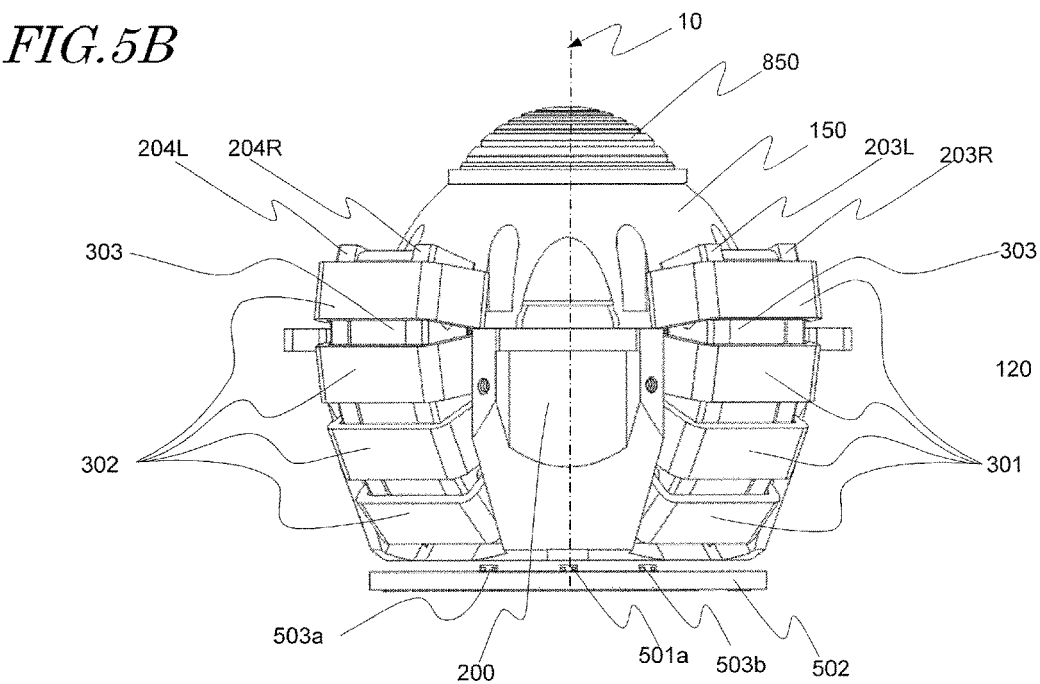
FIG. 5B is a plan view for illustrating the actuator 165 according to the embodiment of the present invention viewed in a straight line 13 direction.
Figure 6:
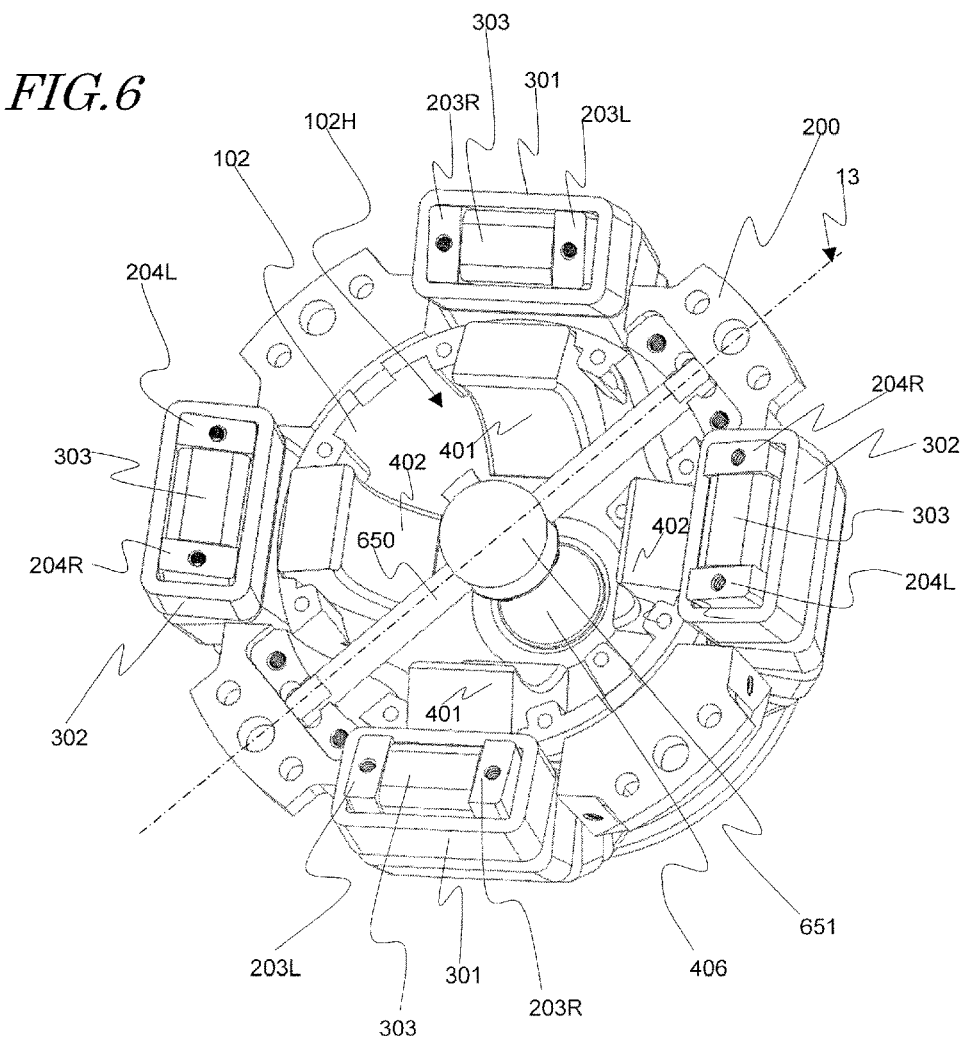
FIG. 6 is a perspective view for illustrating the actuator 165 without an operation part 850 and an upper movable part 150 of the actuator 165 according to the embodiment of the present invention viewed from above.
Figure 7:
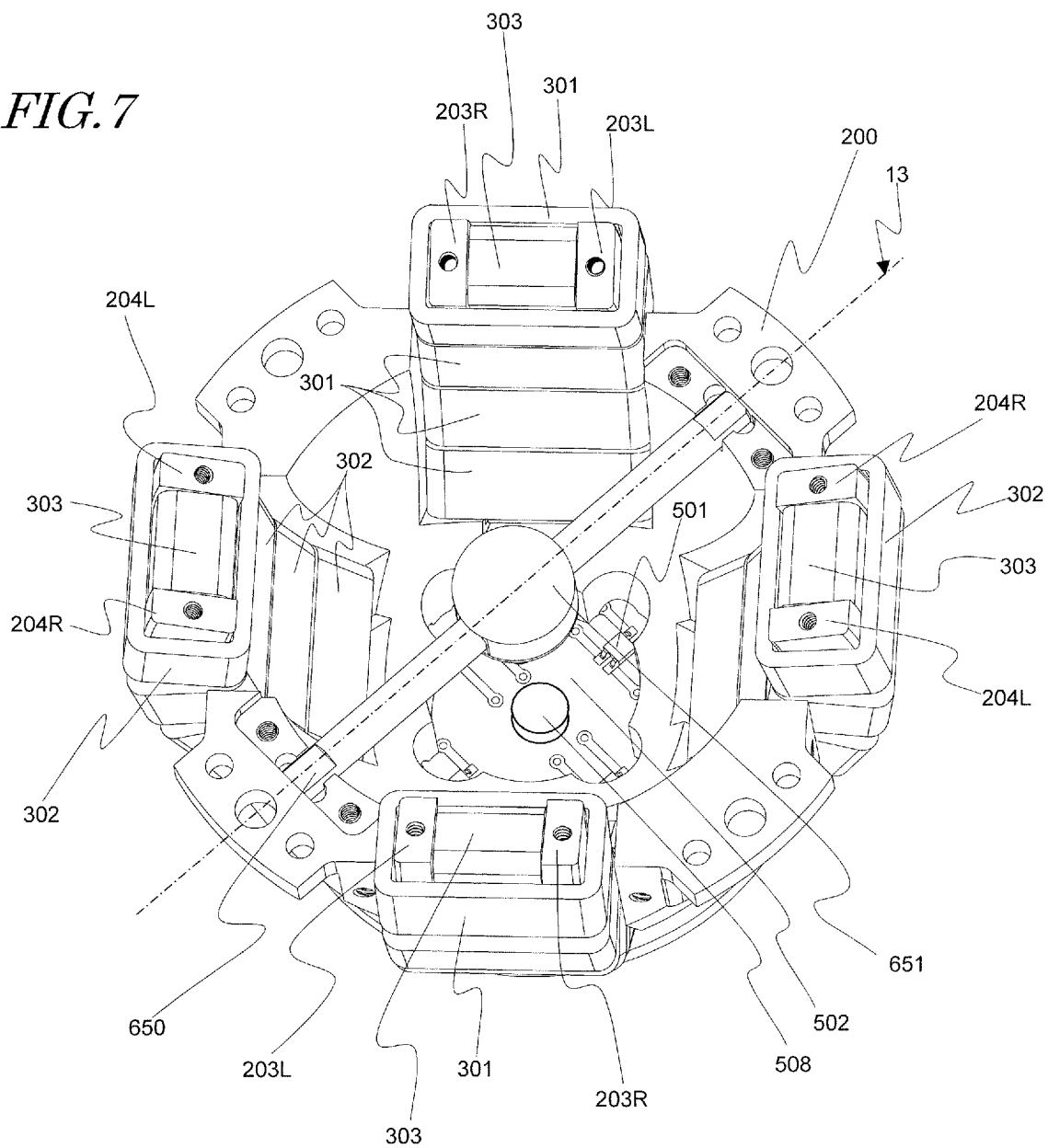
FIG. 7 is a perspective view for illustrating a fixed unit of the actuator 165 according to the embodiment of the present invention viewed from above.
Figure 8A:
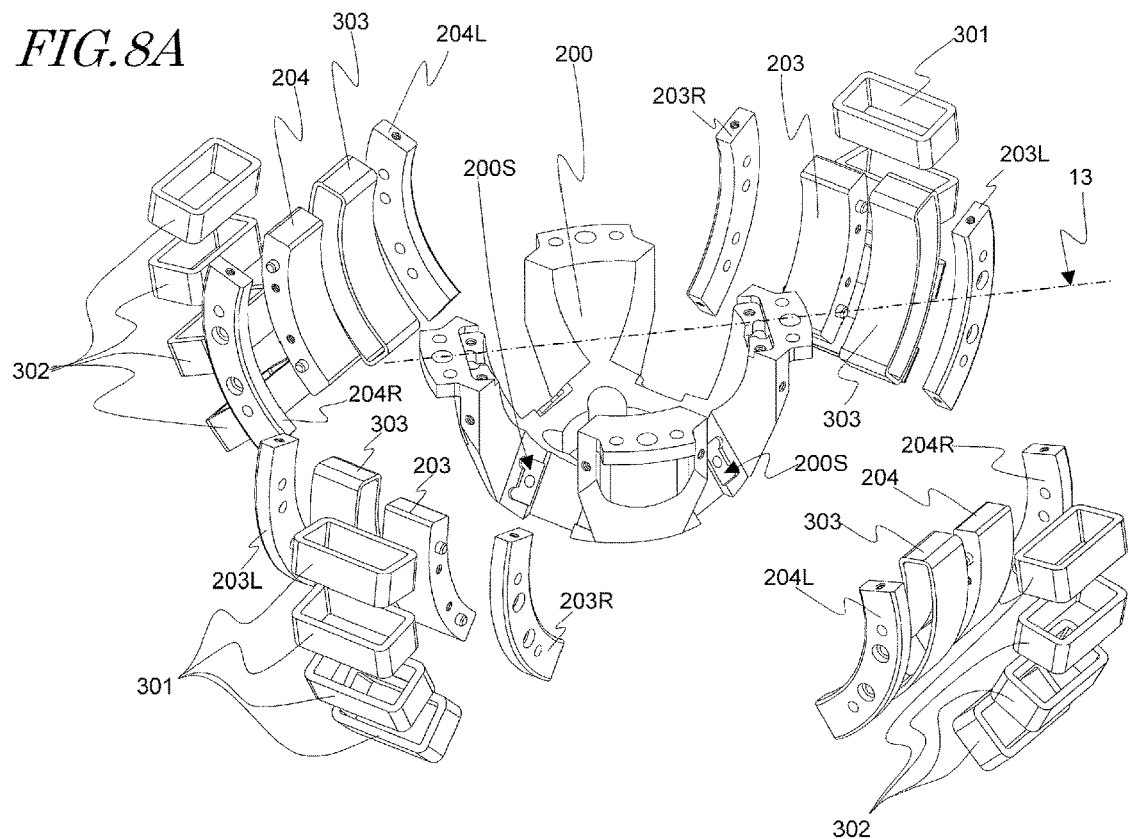
FIG. 8A is an exploded perspective view for illustrating a schematic configuration of the fixed unit of the actuator 165 according to the embodiment of the present invention.
Figure 8B:
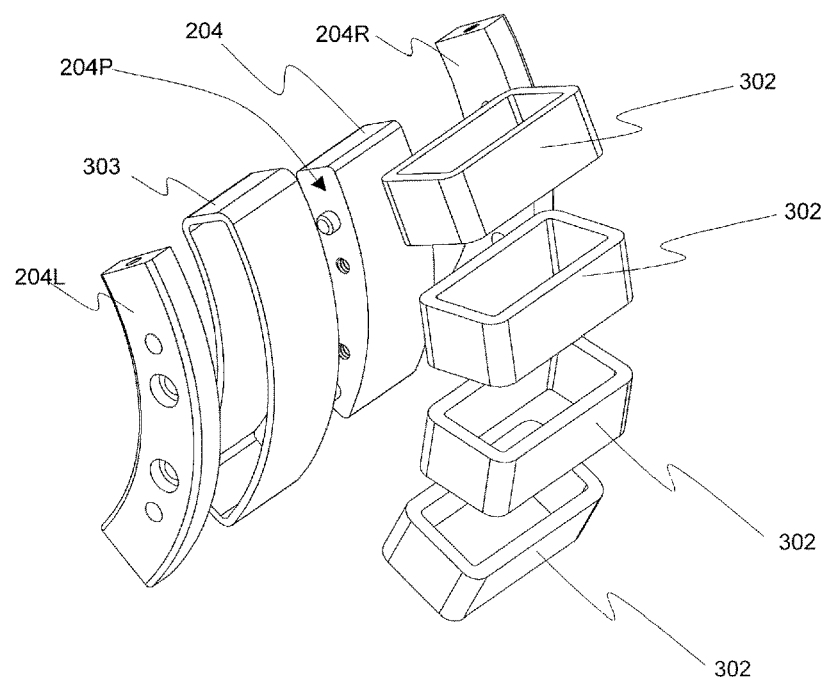
FIG. 8B is an exploded perspective view for illustrating a configuration of one drive means installed on the fixed unit of the actuator 165 according to the embodiment of the present invention.
Figure 9A:
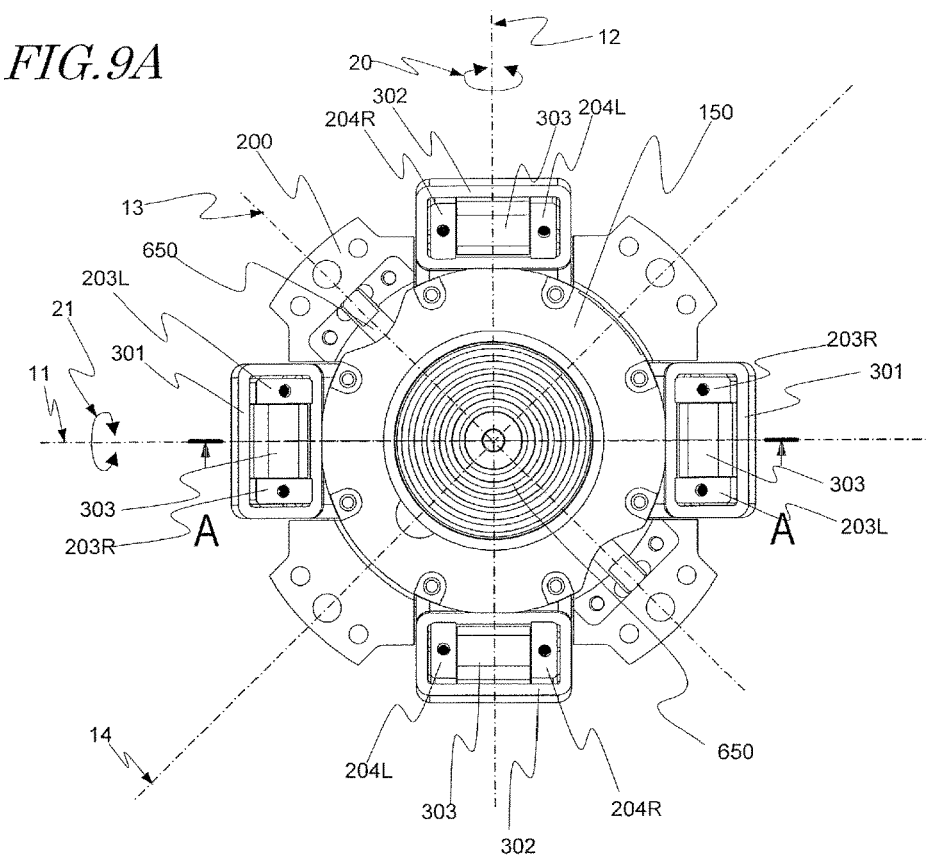
FIG. 9A is a top view for illustrating the actuator 165 according to the embodiment of the present invention viewed in the Z axis 10 direction.
Figure 9B:
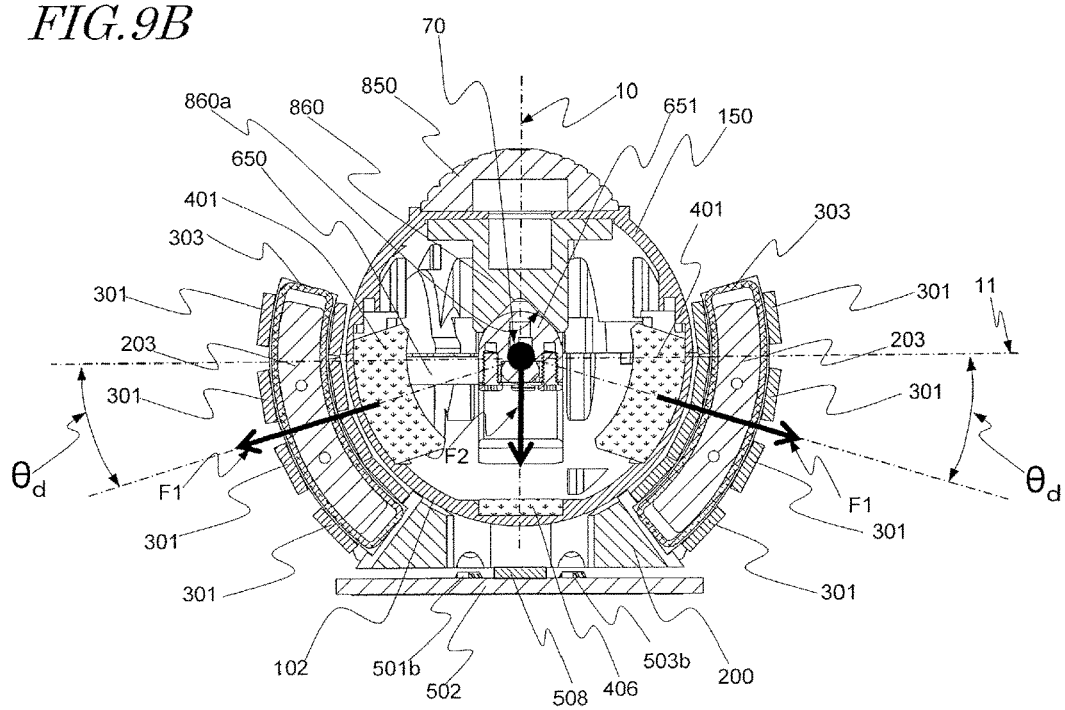
FIG. 9B is a cross sectional view taken on a plane containing the Z axis 10 and a rotation axis 11 of the actuator 165, for illustrating the actuator 165 according to the embodiment of the present invention.
Figure 10A:
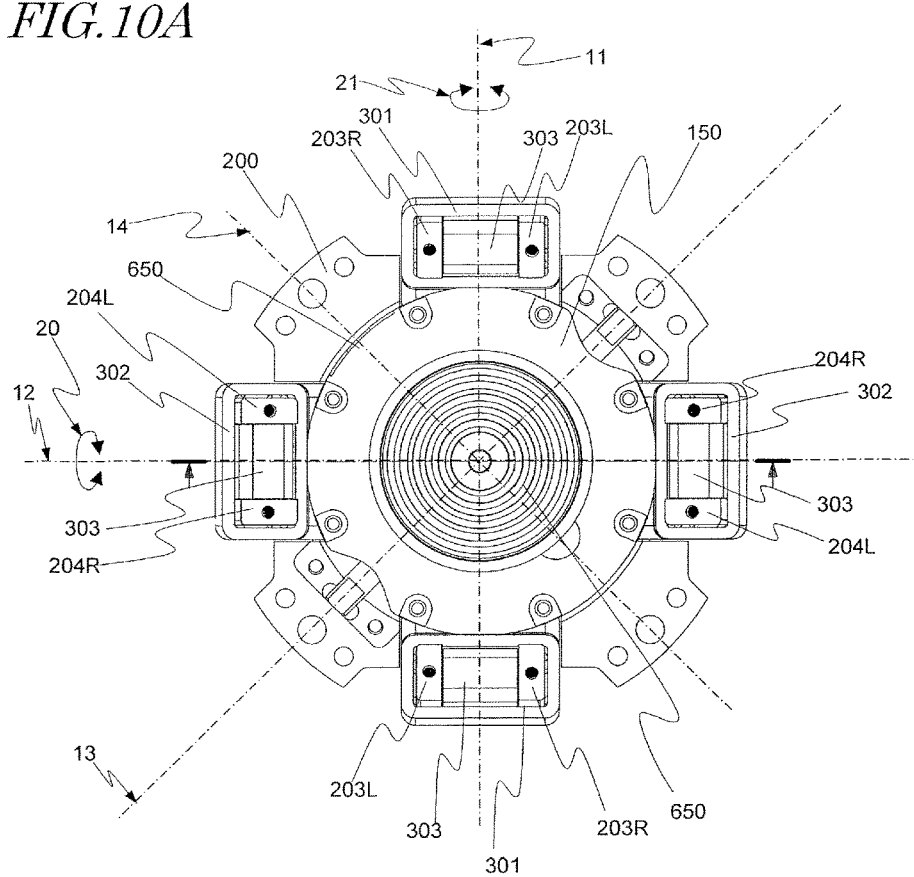
FIG. 10A is a top view for illustrating the actuator 165 according to the embodiment of the present invention viewed in the Z axis 10 direction.
Figure 10B:
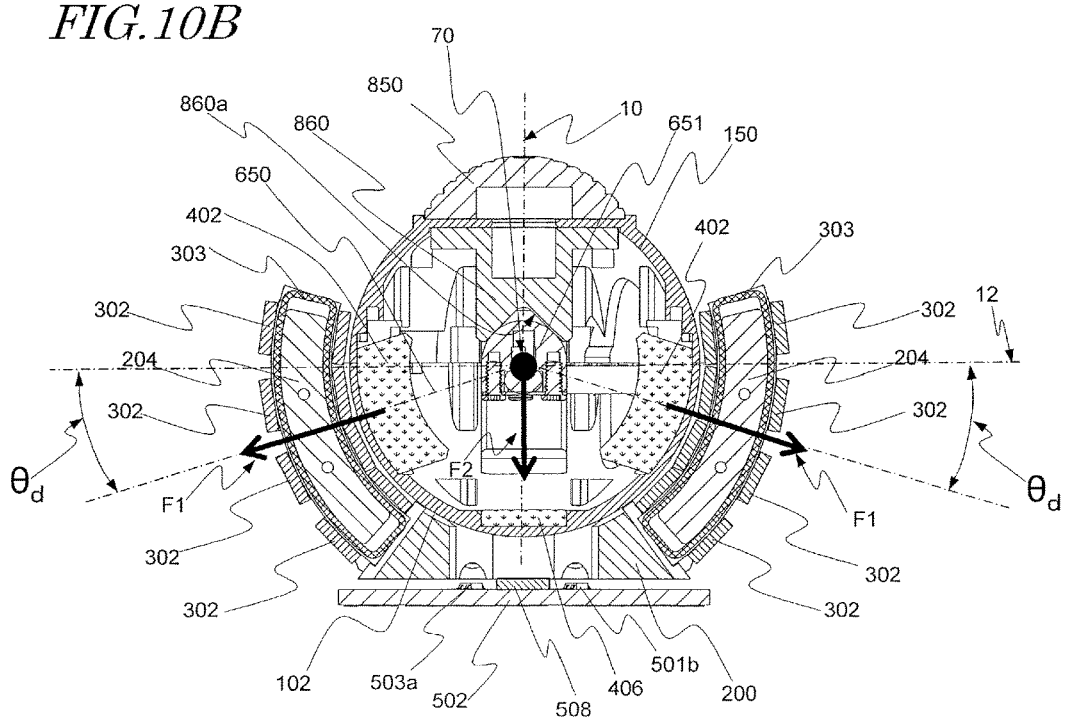
FIG. 10B is a cross sectional view taken on a plane containing the Z axis 10 and a rotation axis 12 of the actuator 165, for illustrating the actuator 165 according to the embodiment of the present invention.
Figure 11A:
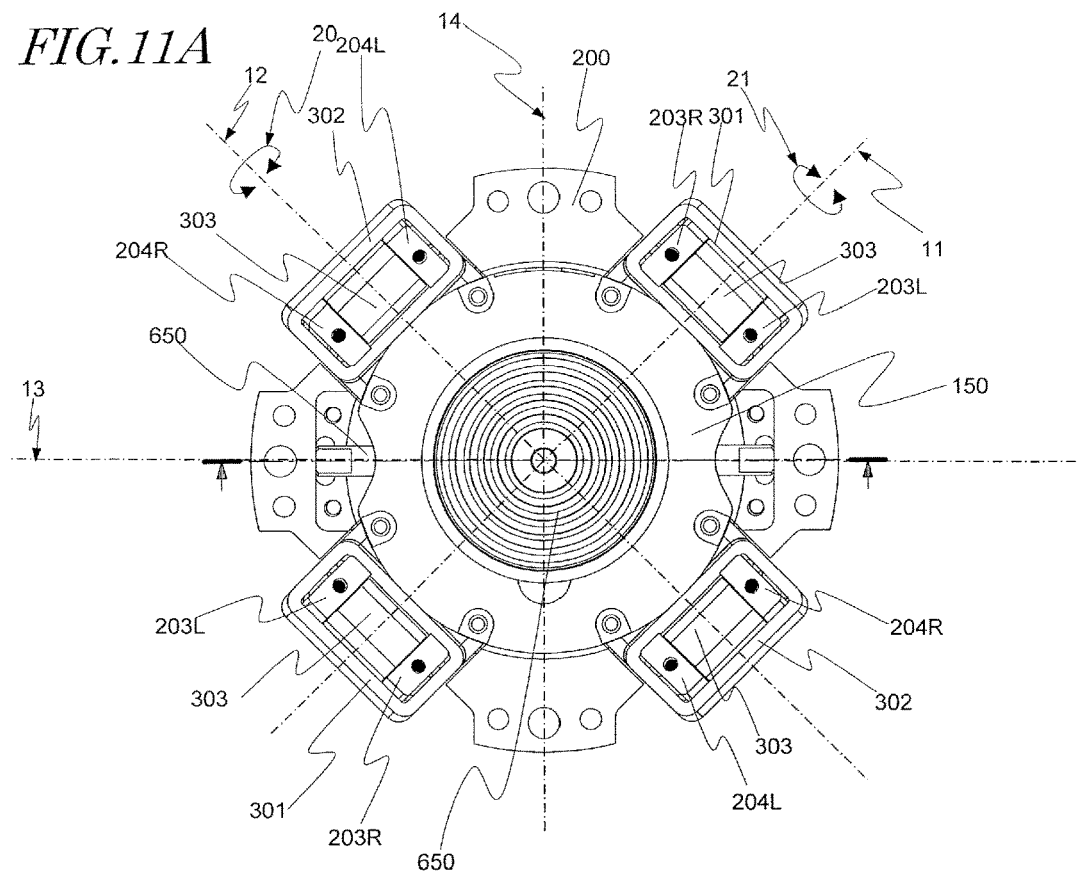
FIG. 11A is a top view for illustrating the actuator 165 according to the embodiment of the present invention viewed in the Z axis 10 direction.
Figure 11B:
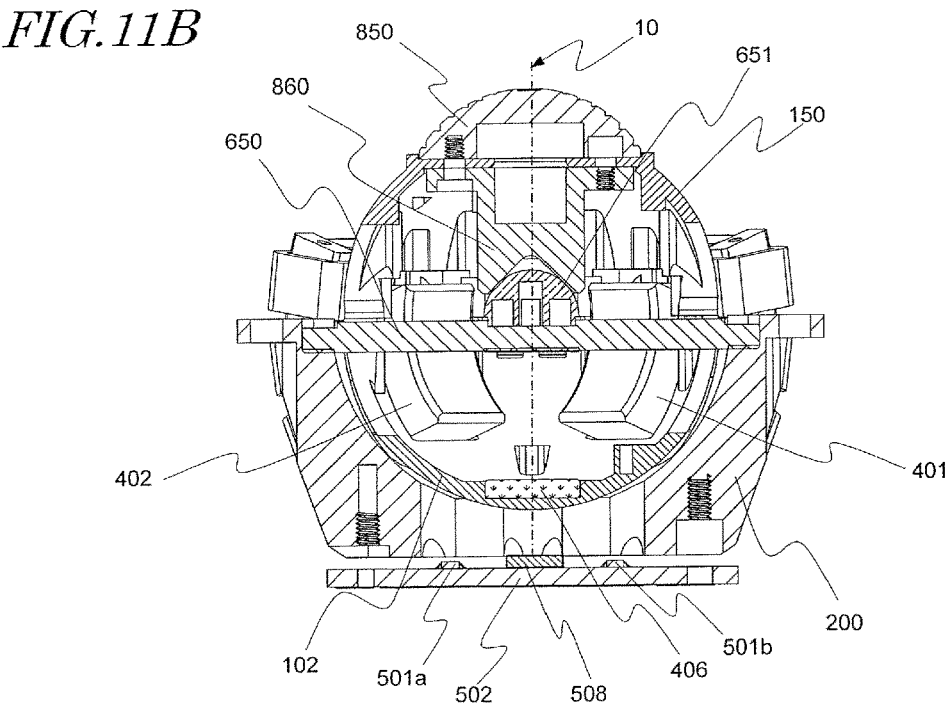
FIG. 11B is a cross sectional view taken on a plane containing the Z axis 10 and the straight line 13 of the actuator 165, for illustrating the actuator 165 according to the embodiment of the present invention.
Figures 13A, 13B:
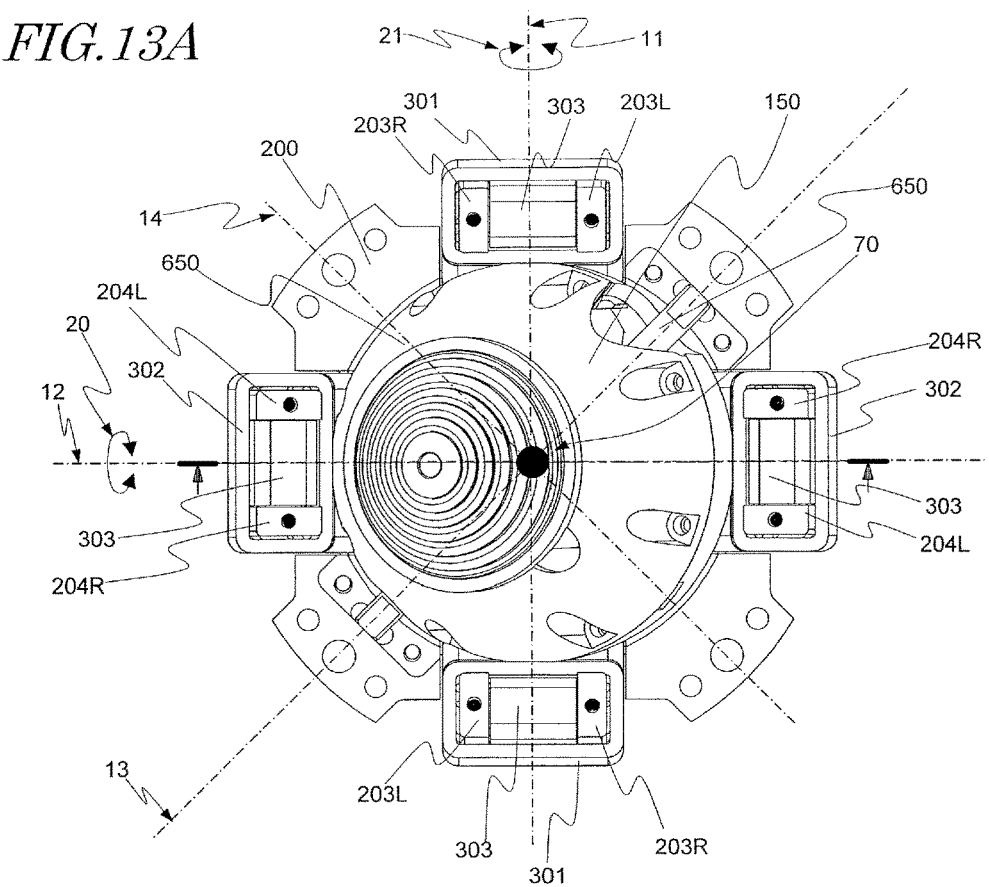
FIG. 13A is a top view for illustrating the actuator 165 according to the embodiment of the present invention viewed in the Z axis 10 direction without the detachment prevention member 201 under the state in which the actuator 165 is rotated at the composite angle θxy of the same angles in the rotation direction 20 and the rotation direction 21.
FIG. 13B is a cross sectional view taken on the plane containing the Z axis 10 and the straight line 13, for illustrating the actuator 165 according to the embodiment of the present invention without the detachment prevention member 201 under the state in which the actuator 165 is rotated at the composite angle θxy of the same angles in the rotation direction 20 and the rotation direction 21.
Figure 14A:
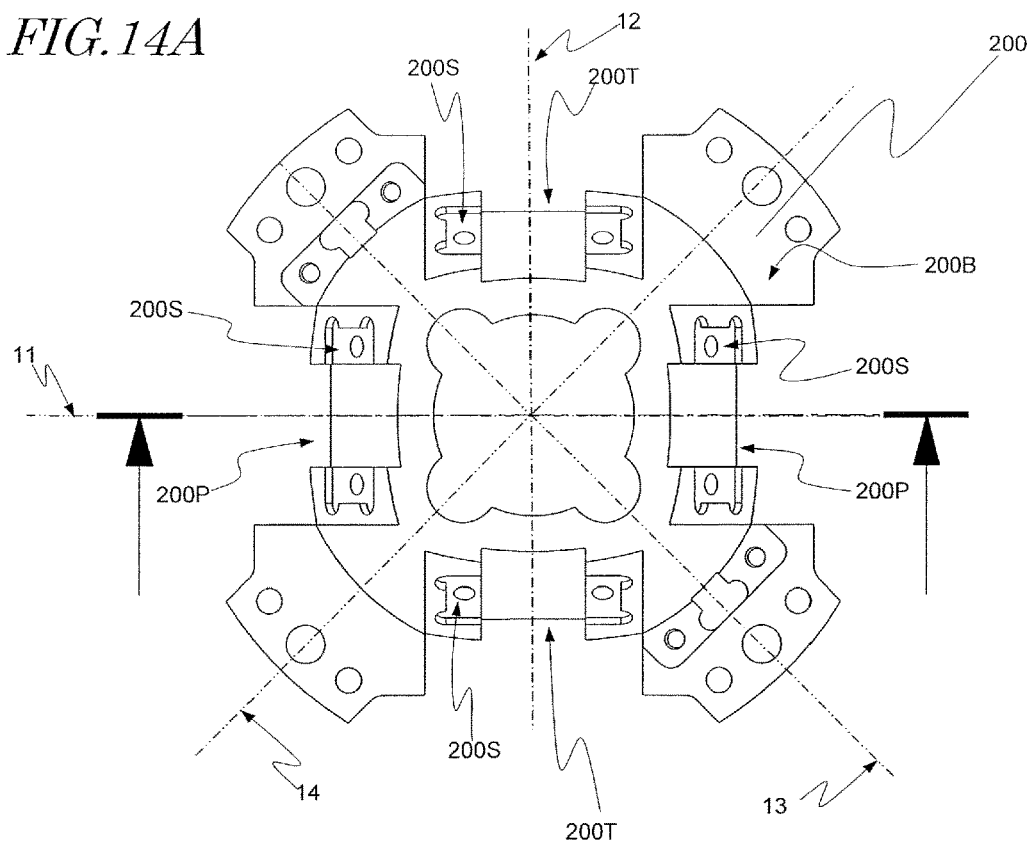
FIG. 14A is a top view for illustrating the fixed unit of the actuator 165 according to the embodiment of the present invention.
Figure 14B:
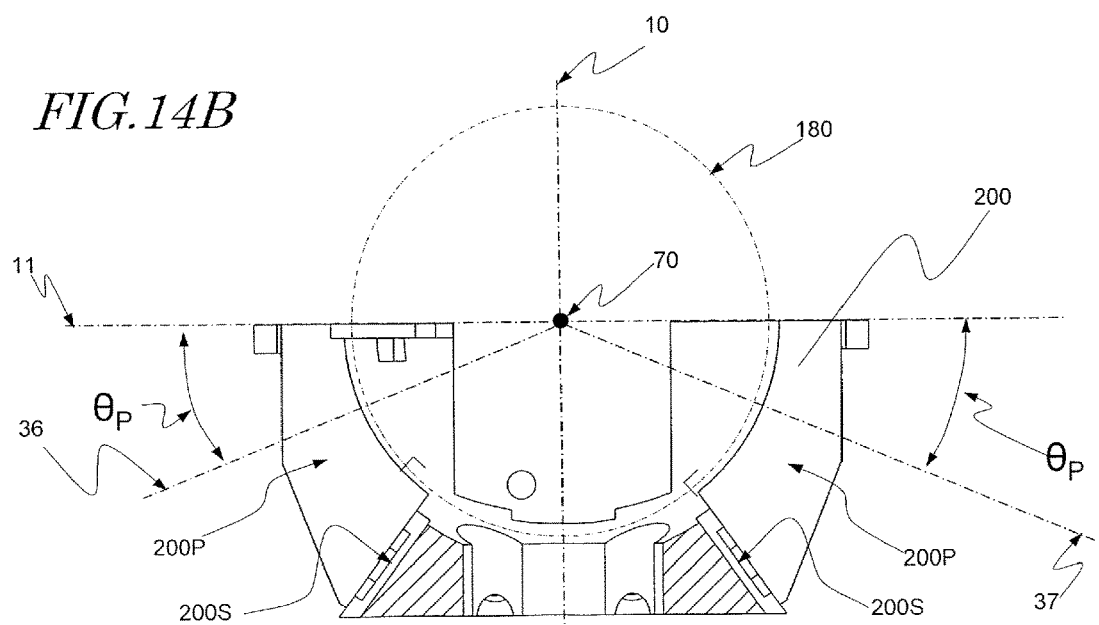
FIG. 14B is a cross sectional view taken on the plane containing the Z axis 10 and the Y axis direction rotation axis 11, for illustrating the fixed unit of the actuator 165 according to the embodiment of the present invention.
Figure 15:
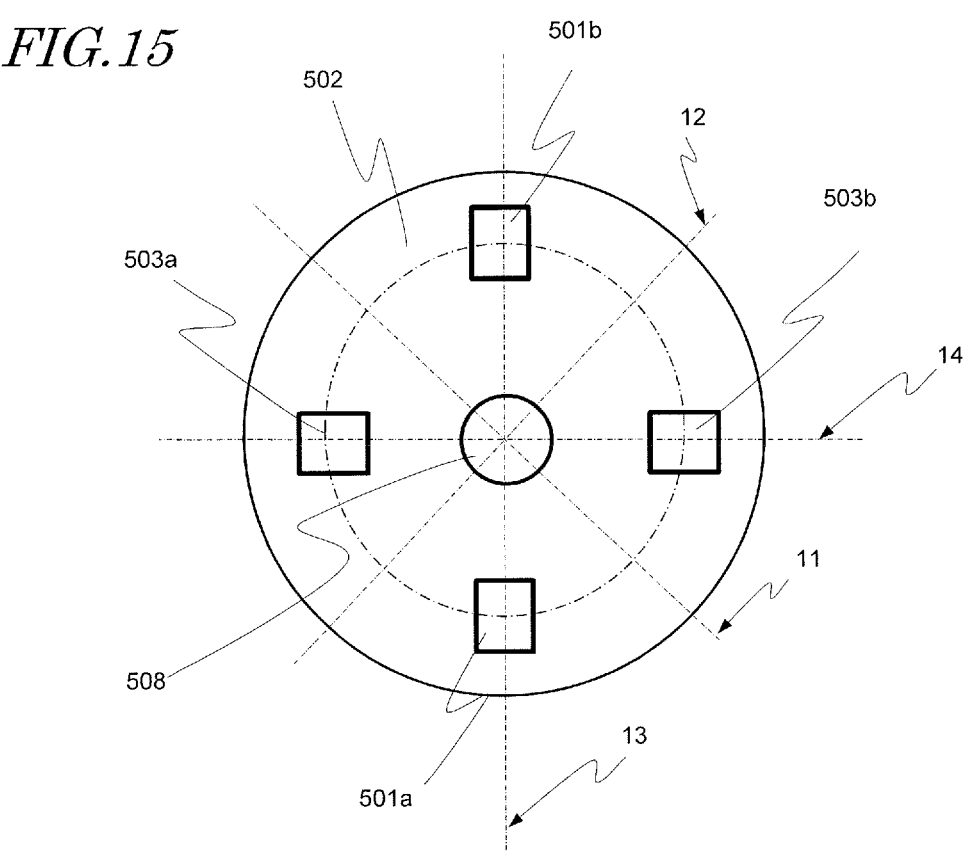
FIG. 15 is a top view for illustrating a sensor board 502 of the actuator 165 according to the embodiment of the present invention viewed from above in the Z axis 10 direction.
Figure 16:
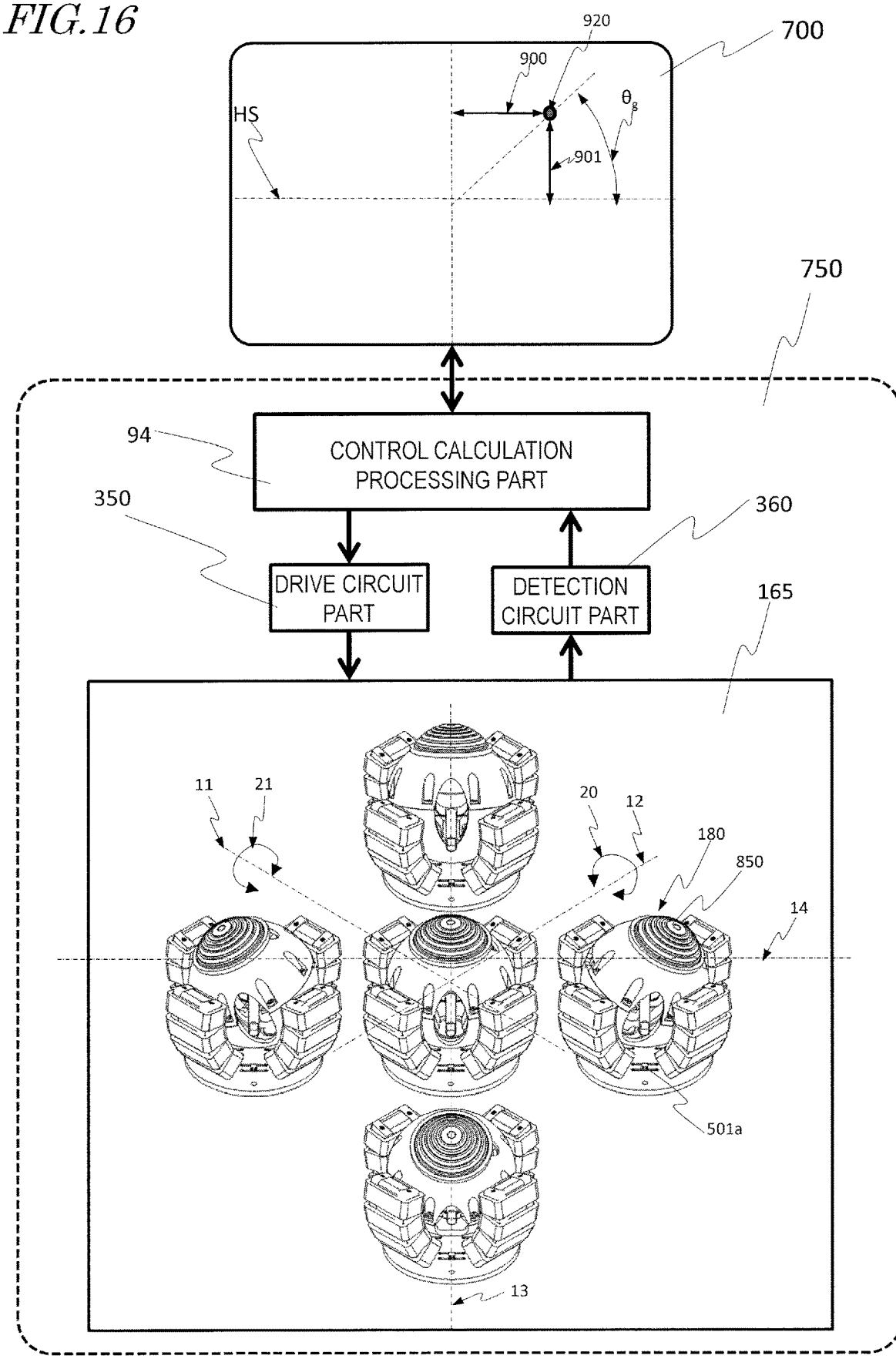
FIG. 16 is a configuration diagram for illustrating the entire input/output operation device 750 according to the embodiment of the present invention.
Figure 17:
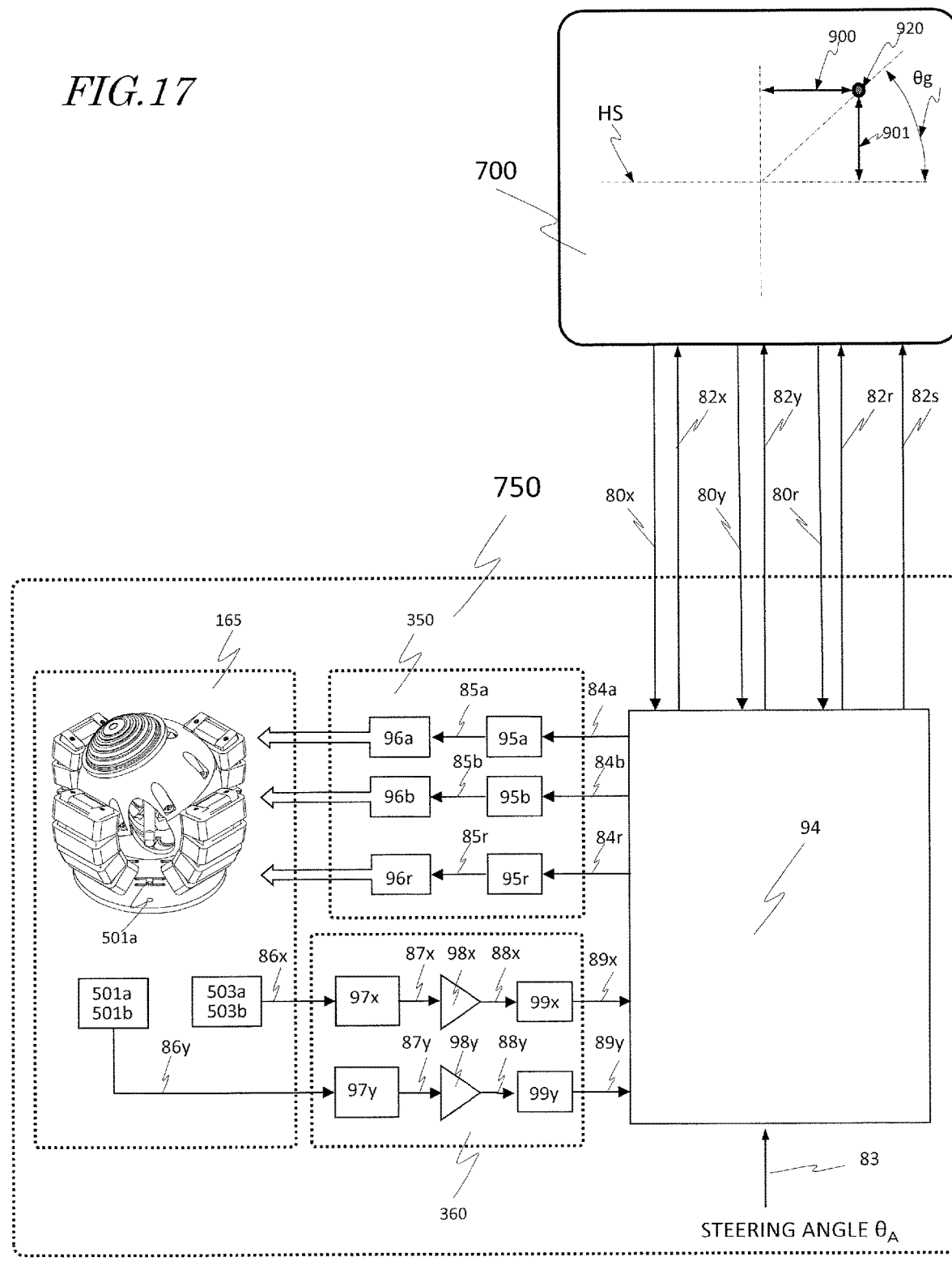
FIG. 17 is a detailed block diagram for illustrating the configuration of the input/output operation device 750 according to the embodiment of the present invention.

FIG. 3A and FIG. 3B are perspective views for illustrating magnetic back, yokes 670 of the movable unit 180. FIG. 4A is a perspective view for illustrating the actuator 165 viewed from obliquely above. FIG. 4B is a perspective view for illustrating the actuator 165 without a detachment prevention member 201, which is a part of the components, viewed from obliquely above. FIG. 4C is a perspective view for illustrating the detachment prevention member 201, which is a part of the components, viewed from obliquely above. FIG. 5A is a top view viewed in a Z axis 10 direction. FIG. 5B is a plan view viewed in a direction of a straight line 13 illustrated in FIG. 5A. FIG. 6 is a perspective view for illustrating the actuator 165 without, an operation part 850 and an upper movable part 150. FIG. 7 is a perspective view for illustrating a fixed unit viewed from above. FIG. 8A is an exploded perspective view for illustrating a schematic configuration of the fixed unit. FIG. 8B is an exploded perspective view for illustrating a configuration of one drive means installed on the fixed unit. FIG. 9A and FIG. 9B are a top view, and a cross sectional view taken on a plane containing the Z axis 10 and a rotation axis 11, respectively, for illustrating the actuator 165. FIG. 10A and FIG. 10B are a top view, and a cross sectional view taken on a plane containing the Z axis 10 and a rotation axis 12, respectively, for illustrating the actuator 165. FIG. 11A and FIG. 11B are a top view, and a cross sectional view taken on a plane containing the Z axis 10 and the straight line 13, respectively, for illustrating the actuator 165. FIG. 12 is a perspective view viewed from above under a state in which the actuator 165 is rotated at a composite angle θxy of the same angles in a rotation direction 20 and a rotation direction 21 without the detachment prevention member 201. FIG. 13A and FIG. 13B are a top view without the detachment prevention member 201, and a cross sectional view taken on a plane containing the Z axis 10 and a straight line 14 without the detachment prevention member 201 under the state in which the actuator 165 is rotated at the composite angle θxy of the same angles in the rotation direction 20 and the rotation direction 21 without the detachment prevention member 201, respectively, for illustrating the actuator 165. FIG. 14A and FIG. 14B are a top view, and a cross sectional view taken on the plane containing the Z axis 10 and the rotation axis 11, respectively, for illustrating the fixed unit. FIG. 15 is a top view for illustrating a sensor board 502 of the actuator 165 viewed from above in the Z axis 10 direction. FIG. 16 is an overall configuration diagram for illustrating the input/output operation device 750 according to the embodiment of the present invention. FIG. 17 is a detailed block diagram for illustrating the configuration of the input/output operation device 750 according to the embodiment of the present invention.

The actuator 165 of the input/output operation device 750 includes the operation part 850, the movable unit 180 on which the operation part 850 is installed, and the fixed unit for supporting the movable unit 180.

The movable unit 180 is configured to freely rotate with respect to the fixed unit independently of one another in a rotation direction 22 rotating about the Z axis 10, in the rotation direction 21 orthogonal to the Z axis 10 and rotating about the rotation axis (X axis) 11 passing through a spherical center 70, and in the rotation direction 20 orthogonal to the Z axis 10 and rotating about the rotation axis (Y axis) 12 passing through the spherical center 70. The rotation axis 11 and the rotation axis 12 are orthogonal to each other. Therefore, the actuator 165 includes drive parts for driving the movable unit 180 with respect to the fixed unit. Specifically, the drive parts include a first drive part and a second drive part for rotating (tilting) the movable unit 180 in the rotation direction 20 and the rotation direction 21, and a third drive part for rotating the operation part 850 in the rotation direction 22 with respect to the fixed unit. Each of the drive parts includes a combination of drive magnets, drive coils, and magnetic yokes. For example, the drive magnets are provided on the movable unit 180, and the drive coils and the magnet yokes are provided on the fixed unit.

The first drive part includes a pair of drive magnets 401, a pair of drive coils 301, and a pair of magnetic yokes 203 formed of a magnetic substance. Further, a pair of drive coils 303, which are the third drive part for rotational drive in the rotation direction 22 about the Z axis 10 described later, are wound inside the pair of drive coils 301. The drive magnets 401 and the magnetic yokes 203 have a partial circular tube shape having circumferential curved, surfaces about the spherical center 70 as two side surfaces.

The second drive part includes a pair of drive magnets 402, a pair of drive coils 302, and a pair of magnetic yokes 204 formed of a magnetic substance. Further, the pair of drive coils 303, which are the third drive part for the rotational drive in the rotation direction 22 about the Z axis 10 described later, are wound inside, the pair of drive coils 302. The drive magnets 402 and the magnetic yokes 204 also have a partial circular tube shape having circumferential curved surfaces about the spherical center 70 as two side surfaces.

A detailed description is now given of the drive of the movable unit 180 by the first, second, and third drive parts.

The actuator 165 includes detectors for detecting a rotation angle of the movable unit 180 on which the operation part 850 is installed, with respect to the fixed unit, and a rotation angle of the movable unit 180 about the Z axis 10. Specifically, the actuator 165 includes a first detection part for detecting a two-dimensional rotation (inclination) angle of the movable unit 180, that is, the rotation angles in the rotation direction 20 and the rotation direction 21 and a second detection part for detecting an inclination angle in the rotation direction 22. The second detection part is not illustrated, but is constructed by a pair of rotation detection magnets arranged on both ends of the movable unit 180 about the spherical center 70 in a plane orthogonal to the Z axis 10 and a pair of magnetic sensors arranged on a base 200 so as to be opposed to the rotation detection magnets. However, when the input/output operation device 750 needs only to detect the forward and backward rotation directions in the rotation direction 22 as in the embodiment of the present invention, the detection can be sufficiently carried out by the first detection part, and the second detection part is not necessary.

The first detection part is constructed by an inclination angle detection magnet 406 installed on a bottom portion of the movable unit 180, a pair of magnetic; sensors 501a and 501b, which are parallel with the straight line 13 that passes through the spherical center 70 and is orthogonal to the rotation axes 11 and 12 in a plane containing the rotation axes 11 and 12, and are arranged about the Z axis 10, and a pair of magnetic sensors 503a and 503b, which are parallel with the straight line 14 that passes through the spherical center 70 and is orthogonal to the straight line 13 in the plane containing the rotation axes 11 and 12, and are arranged about the Z axis 10. The magnetic sensors 501a and 501b, and 503a and 503b are mounted on the sensor board 502, and are fixed to the base 200 via coil springs 600 while being separated by a predetermined gap to the inclination angle detection magnet 406. A detailed description is given of the first detection part hereinafter.

The fixed unit includes the base 200. The base 200 includes a recessed portion to which at least a part of the movable unit 180 loosely fits. According to this embodiment, an inside surface of the recessed part is constructed by a recessed spherical surface 200A. The base 200 further includes opening parts 200P and 200T, and a contact surface 200B.

As illustrated in FIG. 1, the actuator 165 is configured to use the pair of magnetic yokes 203, the pair of magnetic yokes 204, the four drive coils 303 for winding the magnetic yokes 203 and 204, the pair of drive magnets 401, and the pair of drive magnets 402 in order to rotate the movable unit 180 in the rotation direction 22.

As illustrated in FIG. 1, FIG. 8A, and FIG. 8B, the drive coils 303 have such a cross winding structure wound on each of the pair of magnetic yokes 203 and the pair of magnetic yokes 204 so as to be internally laminated and cross a coil winding direction of each of the drive coils 301 and the drive coils 302, and is inserted into and fixed to each of the opening parts 200P and 200T of the base 200. Specifically, after the drive coil 303 is wound on each of the pair of magnetic yoke 203 and the pair of magnetic yokes 204, magnetic yoke holders 203L and 203R are fixed to both side surfaces of each of the pair of magnetic yokes 203, magnetic yoke holders 204L and 204R are fixed to both side surfaces of each of the pair of magnetic yokes 204, and then, the pair of drive coils 301 and the pair of drive coils 302 are wound over the entirety. Further, the drive parts are installed on the fixed unit by fixing bottom parts of the magnetic yoke holders 203L and 203R and the magnetic holders 204L and 204R to attachment surfaces 200S of the base 200.

Preferably, the fixed unit including the base 200 is formed by resin. More preferably, the fixed unit including the base 200 is uniformly constructed by the drive coils 301 and the drive coils 303 wound on the pair of magnetic yokes 203, and the drive coils 302 and the drive coils 303 wound on the pair of magnetic yokes 204. Moreover, it is preferred that the drive coils wound on those magnetic yokes not be exposed on an inside surface of the base 200, that is, the recessed spherical surface 200A.

The movable unit 180 includes the upper movable part 150 and a bottom movable part 102. The upper movable part 150 incorporating the operation part 850 is fixed to the bottom movable part 102. The operation part 850 is positioned on the Z axis 10 in the movable unit 180. The operation part 850 has a substantially protruded shape, and a center (most protruded portion) of the protruded shape matches the Z axis 10. A camera or a light emitting element is not installed on the movable unit 180.

The bottom movable part 102 has a jar shape including a pair of opening parts 102W. The bottom movable part 102 has a protruded spherical surface 102R as an exterior shape having the spherical center 70 as a spherical center.

The protruded spherical surface 102R covers an entire exterior of the bottom movable part 102. More specifically, the bottom movable part 102 includes the pair of opening parts 102W through, which a coupling rod 650 for coupling and fixing a protruded spherical surface part 651 having the spherical center 70, which is described later, as a spherical center to the base 200 can be inserted. The opening parts 102W are provided at such positions and in such a size on the bottom movable part 102 that the coupling rod 650 does not come in contact with the bottom movable part 102 when the movable unit 180 rotates in angle ranges set in advance about the Z axis 10, the rotation axis 11, and the rotation axis 12. Further, the opening portions 102W are used as a stopper in the rotation direction 22 for the movable unit 180. Thus, the surface of a portion other than the opening portions 102W constructs the protruded spherical surface 102R.

The spherical center 70 of a protruded spherical surface 651a and the protruded spherical surface 102R is located at the center of the bottom movable part 102, and is located at a bottom portion of the operation part 850.

The inclination angle detection magnet 406, the pair of drive magnets 401, and the pair of drive magnets 402 are provided in the movable unit 180. The installed detection magnet and the drive magnets are preferably arranged inside the bottom movable part 102 from an opening portion 102H so as not to expose from the protruded spherical surface 102R. The bottom movable part 102 is preferably formed of resin, and the bottom movable part 102, the inclination angle detection magnet 406, the pair of drive magnets 401, and the pair of drive magnets 402 are uniformly formed.

As illustrated in FIG. 3A and FIG. 3B, the drive part is positioned on the spherical center 70 side with respect to the drive magnets 401 and the drive magnets 402, and includes the pair of magnetic back yokes 670 provided in the movable unit 180. One of the magnetic back yokes 670 is configured to magnetically couple one of the drive magnets 401 and one of the drive magnets 402 to each other. Moreover, another one of the magnetic back yokes 670 is configured to magnetically couple another one of the drive magnets 401 and another one of the drive magnets 402 to each other.

As illustrated in FIG. 9B and FIG. 10B, the magnetic yokes 203 and the magnetic yokes 204 provided inside the base 200 are formed of a magnetic substance. Therefore, the drive magnets 401 and the drive magnets 402 provided inside the bottom movable part 102 so as to be opposed to each other are configured to function as attraction magnets, resulting in generation of magnetic attraction forces between the magnetic yokes and the drive magnets. Specifically, a magnetic attraction force F1 is generated between the magnetic yoke 203 and the drive magnet 401, and the magnetic attraction force F1 is generated between the magnetic yoke 204 and the drive magnet 402. Actually, a center line 18 of the magnetic yoke 203 and the drive magnet 401 and a center line 19 of the magnetic yoke 204 and the drive magnet 402 form a downward inclination angle θd with respect to the straight line 11 and the straight line 12, respectively. The inclination angle θd is preferably approximately from 15 degrees to 25 degrees.

The upper movable part 150 has a jar shape including an opening corresponding to the opening of the jar shape of the bottom movable part 102. The bottom movable part 102 has the protruded spherical surface 102R as the exterior shape having the spherical center 70 as the spherical center. Moreover, a recessed member 860 including a recessed contact surface 860a is provided inside the jar shape of the upper movable part 150. According to this embodiment, the recessed contact surface 860a is a conical surface. The recessed contact surface 860a is opposed to the bottom, movable part 102, and is in contact with the protruded spherical surface 651a of the protruded spherical surface part 651 of the fixed unit. When the recessed contact surface 860a is the conical surface, the recessed contact surface 860a is in line-contact with the protruded spherical surface 651a. As a result, the movable unit 180 is loosely fit to the fixed unit.

As illustrated in FIG. 9B, the magnetic attraction force F1 forms a normal force of the protruded spherical part 651 of the fixed unit against the recessed member 860. Moreover, the magnetic attraction forces F1 form a magnetic attraction force F2, which is a synthetic vector in the Z axis 10 direction. This balance of the forces is similar to a mechanical configuration in so-called "yajirobee (Japanese term meaning 'balancing toy')". Therefore, the movable unit 188 can rotate in the three-axis directions in a very stable manner. Specifically, the movable unit 180 is pivotally supported by the fixed unit in a vicinity of the spherical center 70. This support is extremely stable, and is small in friction resistance. Thus, an extremely excellent dynamic characteristic can be realized. In other words, the movable unit 180 can rotate in the rotation directions 22, 21, and 20 about the Z axis 10, the rotation axis 11, and the rotation axis 12.

In particular, the movable unit 180 has the spherical shape constructed by the upper movable part 150 and the bottom movable part 102, and thus the spherical center 70 can be caused to match both the center and the position of the center of gravity of the movable unit 180. Therefore, the movable unit 180 may rotate in the rotation direction 20, the rotation direction 21, and the rotation direction 22 at respective moments approximately equal to one another. As a result, under any state in which the movable unit 180 has been rotated in the rotation direction 20, the rotation direction 21, and the rotation direction 22, the movable unit 180 can always be further rotated at approximately the same drive force, and the movable unit 180 can thus always be driven at a high precision.

Moreover, the spherical canter 70, that is, the rotation center of the movable unit 180 and the center of gravity of the movable unit 180 match each other, and the moments of the rotation of the movable unit 180 in the rotation direction 20, the rotation direction 21, and the rotation direction 22 are thus extremely small. Therefore, the movable unit 180 can be maintained in a neutral state, and can be rotated in the rotation direction 20, the rotation direction 21, and the rotation direction 22 by a small drive force. Thus, power consumption by the actuator 185 can be decreased in the input/output operation device 750. In particular, drive currents required to maintain the movable unit 180 in the neutral state can be made almost zero.

As described above, according to this embodiment, the movable unit 180 on which the operation part 850 is installed is supported in the concentrated manner at the spherical center 70, which is the position of the center of gravity. Thus, a load caused by the friction can be decreased, and a mechanical resonance can greatly be suppressed in the drive frequency region.

Moreover, the drive magnets 401 and the drive magnets 402 have partial circumferential curved surfaces, and can thus generate the constant magnetic attraction force F2 regardless of the magnitude of the rotation angles. The normal force between the protruded spherical part 651 of the fixed unit and the recessed member 860 is thus constant. As a result, fluctuation in the friction load caused by the rotation angle can be suppressed, and an excellent phase/gain characteristics can be realized in the drive frequency range.

Moreover, when the protruded spherical part 651 or the recessed member 860 is formed by a resin member excellent in slide property, the friction between the recessed contact surface 860a and the protruded spherical surface 651a can further be decreased, resulting in the support structure excellent in wear resistance.

The actuator 165 preferably includes the detachment prevention member 201 for restricting the movement of the movable unit 180 so that the movable unit 180 does not detach from the fixed unit (FIG. 1, FIG. 4A and FIG. 4C). The detachment prevention member 201 includes a detachment prevention restriction surface 201A, and is configured to restrict the movement of the movable unit 180 by causing the upper movable part 150 of the movable unit 180 and the detachment prevention restriction surface 201A to abut against, each other when the movable unit 180 moves so as to separate from the fixed unit (FIG. 4A).

A predetermined gap (not shown) is formed between a protruded spherical surface 150R of the upper movable part 150 and the detachment prevention restriction surface 201A of the detachment prevention member 201 so that the upper movable part 150 can freely rotate across an entire movable range with respect to the spherical center 70.

The detachment prevention restriction surface 201A preferably includes a recessed partial spherical surface having a center matching the spherical center 70. The detachment prevention member 201 is fixed to contact surfaces 200B of the base 200. A gap is formed between the protruded spherical surface 150R and the detachment prevention restriction surface 201A under a state in which the recessed contact surface 860a of the recessed member 860 is in contact with the protruded spherical surface 651a of the protruded spherical surface part 651 of the fixed unit. This gap is set to have a distance over which the state in which the recessed contact surface 860a and the protruded spherical surface 651a are in contact with each other is recovered by the magnetic attraction forces F1 even when the recessed contact surface 860a is separated from the protruded spherical surface 651a. In other words, even under a state in which the movable unit 180 moves upward by a distance equal to the gap, and the detachment prevention restriction surface 201A and the protruded spherical surface 150R come in contact with each other, the movable unit 180 can return to the original state in which the recessed contact surface 860a and the protruded spherical surface 651a are in contact with each other by the magnetic attraction forces F1. As a result, according to this embodiment, there can be provided such an input/output operation device excellent in shock resistance as to immediately return to the original excellent support state by the magnetic attraction forces F1 even when the movable unit 180 is momentarily detached from a predetermined position.

A detailed description is now given of a structure for driving the movable unit 180 of the actuator 165.

As illustrated in FIG. 2, in the bottom movable part 102, the pair of drive magnets 401 are arranged symmetrically about the Z axis 10 so as to rotationally drive the movable unit 180 in the rotation direction 20, and the pair of drive magnets 402 are arranged symmetrically about the 2 axis 10 so as to rotationally drive the movable unit 180 in the rotation direction 21. When the components provided in the fixed unit are arranged "symmetrically about the Z axis 10", the Z axis 10 in a neutral state of the movable unit 180, that is, a state in which the movable unit 180 is not rotated with respect to the fixed unit, is considered as a reference.

The drive magnets 401 are magnetized in one pole so as to have a magnetic flux in the direction of the rotation axis 11. Similarly, the drive magnets 402 are magnetized in one pole so as to have a magnetic flux in the direction of the rotation axis 12.

As illustrated in FIG. 1, FIG. 9B, and FIG. 10B, and as described above, the pair of magnetic yokes 203 and the pair of magnetic yokes 204 are each arranged on the circumference of the base 200 about the Z axis 10 so as to be opposed to the pair of drive magnets 401 and the pair of drive magnets 402, respectively.

As illustrated in FIG. 1 and FIG. 8A, the drive coils 303 for winding the pair of magnetic yokes 203 are provided for the pair of magnetic yokes 203 arranged on the base 200 in the direction of the rotation axis 11, respectively. Further, the drive coil 301 divided into four portions is provided for the pair of magnetic yokes 203 outside each of the drive coils 303 so as to be orthogonal to the winding direction of the drive coils 303. The drive coil 301 is divided into four portions because the magnetic yoke 203 has the circumferential curved surface.

Similarly, the drive coils 303 for winding the pair of magnetic yokes 204 are provided for the pair of magnetic yokes 204 arranged in the direction of the rotation axis 12 orthogonal to the rotation axis 11, respectively. Further, the drive coil 302 is provided for the pair of magnetic yokes 204 outside each of the drive coils 303 so as to be orthogonal to the winding direction of the drive coil 303.

In other words, the drive parts for the rotation direction 20, the rotation direction 21, and the rotation direction 22 are independently arranged in a distributed manner on circumferences about the Z axis 10.

With this configuration, as illustrated in FIG. 9B and FIG. 10B, a magnetic gap between the magnetic yoke 203 and the drive magnet 401 and a magnetic gap between the magnetic yoke 204 and the drive magnet 402 can be evenly formed. Therefore, respective magnetic flux densities can evenly be increased, and drive efficiencies toward the rotation direction 20, the rotation direction 21, and the rotation direction 22 are greatly improved.

A description is now given of height positions of the respective drive parts in the Z axis 10 direction.

As illustrated in FIG. 14B, straight lines 36 and 37 are perpendicular to a center axis (not shown) of a circumferential curved surface passing through the spherical center 70 of the magnetic yokes 203 fixed to the base 200. Moreover, the straight lines 36 and 37 are perpendicular to a center axis (not shown) of a circumferential curved surface passing through the spherical center 70 of the drive magnets 401 of the movable unit in the neutral state. The straight lines 36 and 37 form a downward inclination angle θp equal to or less than 45 degrees with respect to the straight line 11. Although not shown, the magnetic yokes 204 and the drive magnets 402, which are fixed to the base 200, are similarly configured. In this way, the pairs of drive magnets 401 and 402 and the pairs of magnetic yokes 203 and 204 are configured as four petals about the Z axis 10 which are inclined by the downward inclination angle θp equal to or less than 45 degrees with respect to the horizontal surface containing the spherical center 70. Specifically, each of the pair of magnetic yokes 203 is sandwiched between the magnetic yoke holders 203L and 203R on both the side surfaces thereof, and as illustrated in FIG. 14A and FIG. 14B, the bottom portions of the magnetic yoke holders 203L and 203R are inserted into the opening portions 200P of the base 200. As a result, the magnetic yoke 203 is fixed to the attachment surface 200S.

Similarly, each of the pair of magnetic yokes 204 is sandwiched between the magnetic yoke holders 204L and 204R on both the side surfaces thereof, and the bottom portions of the magnetic yoke holders 204L and 204R are inserted into the opening portions 200T of the base 200. As a result, the magnetic yoke 204 is fixed to the attachment surface 200S.

As described above, the height of the fixed unit can be reduced, thereby realizing space saving and a low profile of the device, by setting the inclination angle θp to an angle equal to or less than 45 degrees. The rotation inclination angle θp and the rotation inclination angle θr are preferably from approximately 15 degrees to approximately 25 degrees, and are more preferably 20 degrees, for example.

The pair of drive magnets 401 receive a couple of electromagnetic forces by supplying currents to the pair of drive coils 301, and the bottom movable part 102, that is, the movable unit 180, is driven to rotate in the rotation direction 20 about the Y axis direction rotation axis 12. Similarly, the pair of drive magnets 402 receive a couple of magnetic forces by supplying currents to the pair of drive coils 302, and the movable unit 180 is driven to rotate in the rotation direction 21 about the X axis direction rotation axis 11.

Further, the movable unit 130 in which the operation part 850 is installed can be rotated two-dimensionally by supplying currents simultaneously to the drive coils 301 and the drive coils 302.

FIG. 12, FIG. 13A, and FIG. 13B are diagrams for illustrating a state of rotations by the same angles in the rotation direction 20 and the rotation direction 21 by supplying equivalent currents simultaneously to the drive coils 301 and the drive coils 302, resulting in a rotation by the composite angle θxy in a straight line 13 direction forming 45 degrees with respect to the rotation direction 20 and the rotation direction 21.

Moreover, the movable unit 180 receives magnetic forces in the same rotation direction by supplying the currents to the four drive coils 303, and the movable unit 180 is rotationally driven in the rotation direction 22 about the Z axis 10.

Further, when currents are supplied to the four drive coils 303 under the state in which the movable unit 180 is rotated by the composite angle θxy, the movable unit 180 is rotationally driven in a rotation direction 23 about a straight line 32.

As described above, this embodiment employs a moving magnet drive method in which the drive magnets 401 and the drive magnets 402 are provided in the movable unit 180. In this configuration, in general, there is such a conceivable problem that the weight of the movable unit 180 increases. However, this configuration eliminates necessity of suspension of drive wires to the movable unit 180.

Moreover, the center of gravity of the movable unit 180 and the rotation center point of the movable unit 180 match the spherical center 70, and thus, even when the weight is increased by installing the drive magnets, the moment of rotation of the movable unit 180 does not greatly increase.

Therefore, according to this embodiment, the advantage of the moving magnet drive method can be enjoyed while the problem of the increase in the weight is suppressed.

The rotation angle of the movable unit 180 in the rotation direction 22 about the Z axis 10 is restricted by the contact between the pair of opening portions 102W formed on the bottom movable part 102, and the coupling rod 650 fixed to the base 200. The coupling rod 650 is inserted into the pair of opening portions 102W, and thus the movable unit 180 rotates about the Z axis 10 without contact of the coupling rod 650 with walls for defining the opening portions 102W in a range of openings defined by the opening portions 102W. When the movable unit 180 starts to rotate beyond the range of the openings, the coupling rod 650 and the walls for defining the pair of opening portions 102W come in contact with each other, and the movable unit 180 cannot thus rotate any longer.

With the moving magnet drive method, there is such a great advantage that heat generated in the drive coils 301, the drive coils 302, and the drive coils 303 can be cooled by the base 200 via the magnetic yokes 203 and the magnetic yoke holders 203L and 203R and the magnetic yokes 204 and the magnetic yoke holders 204L and 204R. Further, such a point that the size and weight of the movable unit 180 can be decreased is advantageous for designing the rotation angles in the rotation direction 20 and the rotation direction 21 to be equal to or more than 20 degrees. In contrast, in a moving coil drive method, the size of the drive coils excessively increases, and the weight of the movable unit 180 may thus increase.

As described above, according to this embodiment, all of center axes of the operation part 850, the upper movable part 150, the bottom movable part 102, the inclination angle detection magnet 408 of the movable unit 180, the detachment prevention restriction surface 201A provided in the fixed unit, and the two pairs of the rotation drive parts provided in the base 200 pass through the spherical center 70, which is a support center as well as a drive center.

Thus, the center of gravity of the movable unit 180 matches the spherical center 70, and the movable unit 180 can be supported at the center of gravity. Further, the rotation drive about the three axes passing through the center of gravity and orthogonal to one another can be realized. Moreover, the movable unit 180 can be prevented from being detached.

The actuator 165 of the input/output operation device 750 may include a viscous member (not shown) in order to decrease an amplitude enhancement factor (Q factor) of the movable unit 180. In this case, as illustrated in FIG. 9B and FIG. 10B, the viscous member is provided between the recessed contact surface 860a of the recessed member 860 installed on the upper movable part 150 and the protruded spherical surface 651a of the protruded spherical surface part 651 of the fixed unit. As a result, it is possible to decrease the amplitude enhancement factor (Q factor) of a vibration caused by the magnetic spring effect of the magnetic attraction force fluctuation, which is generated with respect to the rotation angles in the rotation directions 20 and 21 and the rotation single in the rotation direction 22 between the drive magnets 401 and the drive magnets 402 provided in the movable unit 130 and the magnetic yokes 203 and the magnetic yokes 204 provided in the base 200, and to decrease the Q factor of a mechanical natural vibration. Thus, a satisfactory control characteristic can be obtained.

A description is now given of the detection of the rotation angle (inclination) of the movable unit 180.

As illustrated in FIG. 1, FIG. 2, FIG. 11A, FIG. 11B, and FIG. 15, the actuator 165 includes the detectors for detecting the rotation angles of the movable unit 180 in which the operation part 850 is installed and the rotation angle of the movable unit 180 about the Z axis 10 with respect to the fixed unit.

Specifically, the actuator 165 includes the first detection part for detecting the two-dimensional rotation angle of the movable unit 180, that is, the rotation angles thereof in the rotation direction 20 and the rotation direction 21 and the second detection part for detecting the rotation angle of the movable unit 180 in the rotation direction 22.

The second detection part is not shown, but is constructed by a pair of rotation detection magnets arranged on both ends of the movable unit 180 about the spherical center 70 in the plane orthogonal to the Z axis 10 and a pair of magnetic sensors arranged on the base 200 so as to be opposed to the rotation detection magnets.

However, when the input/output operation device 750 needs only to detect the forward and backward rotations in the rotation direction 22 as in the embodiment of the present invention, the detection can be sufficiently carried out by the first detection part, and the second detection part is not necessary.

The first detection part is constructed by the inclination angle detection magnet 406 installed in the bottom portion of the movable unit 180, the pair of magnetic sensors 501a and 501b, which are parallel with the straight line 13 that passes through the spherical center 70 and is orthogonal to the rotation axes 11 and 12 in the plane containing the rotation axes 11 and 12, and are arranged about the Z axis 10 and the pair of magnetic sensors 503a and 503b, which are parallel with the straight line 14 that passes through the spherical center 70 and is orthogonal to the straight line 13 in the plane containing the rotation axes 11 and 12, and are arranged about the Z axis 10.

As illustrated in FIG. 15, the magnetic sensors 501a and 501b, and 503a and 503b are mounted on the sensor board 502, and are fixed to the base 200 via the coil springs 600 while being separated by the predetermined gap to the inclination angle detection magnet 406.

A magnetic bias magnet 508 for applying a magnetic bias is fixed at a center position of the sensor board 502. As illustrated in FIG. 10B, the magnetic bias magnet 503 is opposed to the inclination angle detection magnet 406 on the Z axis when the movable unit 180 is neutral. This magnetic bias magnet 508 may decrease the influence of magnetic leakage caused by the pair of drive magnets 401 and the pair of drive magnets 402 when the movable unit 180 is tilted, by enhancing magnetic coupling formed by the magnetic bias magnet 508 and the inclination angle detection magnet 406 fixed to the movable unit 180. Further, the action of the magnetic spring of returning the movable unit 180 to the neutral position can be generated by using such an effect that the magnetic coupling of the magnetic bias magnet 508 and the inclination angle detection magnet 406 is maximized when the movable unit 180 is at the neutral position.

A detailed description is now given of the detection of the rotation angles of the movable unit 180 in the rotation direction 20 and the rotation direction 21 of the movable unit 180.

The sensor board 502 is fixed, to the base 200 by using adjustment screws (not shown) 601 via the coil springs 600 at three locations, and the relative inclination and distance between the inclination detection magnet 406 and the magnetic sensors 501a, 501b, 503a, and 503b are changed by rotating the three adjustment screws 601, respectively. As a result, inclination output signals of the magnetic sensors 501a and 501b, and the magnetic sensors 503a and 503b can optimally be adjusted.

As illustrated in FIG. 11B, FIG. 13A, and FIG. 13B, the magnetic sensors 501a and 501b are arranged in parallel with the straight line 13, and the magnetic sensors 503a and 503b are arranged in parallel with the straight line 14 in order to eliminate influence of magnetic fields generated, by the drive currents of the drive coils 301 and the drive coils 302.

The magnetic sensors 501a and 501b arranged in parallel with the straight line 13 are configured to compose and detect magnetic force changes of the inclination angle detection magnet 406 generated by the rotation operations of the movable unit 130 in the rotation direction 20 and the rotation direction 21 as a two-axis component, and further, the S/N of the detection signals is increased by differential detection of the detection output of the magnetic sensors 501a and 501b.

Moreover, the magnetic sensors 503a and 503b arranged in parallel with the straight line 14 are configured to compose and detect magnetic force changes of the inclination angle detection magnet 406 generated by the rotation operations of the movable unit 180 in the rotation direction 20 and the rotation direction 21 as a two-axis component, and further, the S/N of the detection signals is increased by differential direction of the detection output of the magnetic sensors 503a and 503b.

Further, as in this embodiment, when the input/output operation device 750 needs to detect only the forward/backward rotation in the rotation direction 22, the forward/backward rotation in the rotation direction 22 can be detected by differential detection between the magnetic sensors 501a and 503b and differential detection between the magnetic sensors 501b and 503a.

As described above, according to this embodiment, the movement of the inclination angle detection magnet 406 with respect to the rotation angle can be decreased by decreasing the gap between the inclination angle detection magnet 406 and the spherical center 70. Thus, an arrangement projection area of the magnetic sensors 501a and 501b and the magnetic sensors 503a and 503b can be decreased.

According to this embodiment, the detectors include the magnetic sensors 501a and 501b, the magnetic sensors 503a and 503b, and the inclination angle detection magnet 406, but the detectors may be constructed by other configurations. For example, the detectors may include, on the Z axis 10, an optical sensor provided, in the fixed unit, and an optical detection pattern provided at a position corresponding to the optical sensor on the outer surface (protruded spherical surface 102R) of the movable unit 180. Preferably, as illustrated in FIG. 9B, the optical sensor and the optical detection pattern are positioned on the Z axis 10. More specifically, the optical sensor is provided at the position of the magnetic bias magnet 508, and the optical detection pattern is provided in a region opposed to the magnetic bias magnet 508 on the protruded spherical surface 102R. The optical detection pattern rotates as a result of the rotation of the movable unit, and the light enters the optical sensor thus changes. The two-dimensional rotation angle can be calculated by the optical sensor detecting the change in the light.

Moreover, according to this embodiment, the movable unit 180 includes the recessed member 860 having the recessed contact surface 860a, and the fixed unit includes the protruded spherical surface part 651 having the protruded spherical surface 651a. However, the movable unit may have a protruded spherical surface, and the fixed unit may have a recessed contact surface. Also in this case, the movable unit can freely rotate about a spherical center of the protruded, spherical surface as the center with respect to the fixed unit. Moreover, according to this embodiment, the recessed contact surface 880a is the conical surface, but may be a pyramid surface, for example, a trigonal pyramid surface and a quadrangular pyramid surface. In this case, the recessed contact surface 860a and the protruded spherical surface 651a are in contact with each other at a plurality of points.

As described above, with the actuator 165 of the input/output operation device 750 according to this embodiment, the structure of pivotally supporting the movable unit at the spherical center is arranged on the Z axis of the operation part, and the two pairs of drive parts are arranged on the circumference about the spherical, center on the plane perpendicular to the Z axis and passing through the spherical center. As a result, the constant normal force can be applied by the magnetic attraction force hardly influenced by the rotation angle of the movable unit. Further, the structure for decreasing the friction load fluctuation depending on the rotation angle and supporting/driving the movable unit at the center of gravity is realized. Moreover, the mechanical resonance can greatly be suppressed in the drive frequency range.

Moreover, in order to prevent the detachment of the movable unit 180 due to disturbance and the like, for example, vibrations and impacts, which have hitherto been a serious problem specific to a support structure using the magnetic attraction force, the detachment prevention restriction surface is provided on the detachment prevention member provided on the fixed unit via the predetermined gap for permitting the rotation. As a result, the detachment of the movable unit can be positively prevented while avoiding the increase in size of the device.

Moreover, the position of the detachment prevention restriction surface is determined so that, even when the movable unit is detached up to a state in which the protruded spherical surface of the movable unit abuts against the detachment prevention restriction surface of the fixed unit, the protruded spherical part of the fixed unit and the recessed contact surface of the movable unit are again brought in point-contact with each other by the magnetic attraction force. Therefore, there can be provided an input/output operation device so extremely excellent in the shock resistance as to immediately return to the original satisfactory support state even when the movable unit momentarily detaches.

Moreover, the height position in the Z axis direction at which the drive part is arranged is at the height position rotated downward from the horizontal plane containing the spherical center. Therefore, the center of gravity of the movable unit can be driven at the spherical center, and the profile can be lowered.

Moreover, a support structure low in the friction and excellent in the wear resistance can be realized by forming the movable part and the base by resin materials or covering the surface portions of the protruded spherical part of the fixed unit and the recessed contact surface with resin materials.

Moreover, the amplitude enhancement factor (Q factor) of the vibration by the magnetic spring effect, which is caused by the magnetic attraction force fluctuation generated between the drive magnets provided in the movable unit and the magnetic yokes provided in the fixed unit, and the Q factor of the mechanical natural vibration can be decreased by filling a viscous member in the gap formed by the recessed contact surface of the upper movable part and the protruded spherical surface of the fixed unit. Thus, a satisfactory control characteristic can be obtained.

Thus, with the actuator of the input/output operation device according to this embodiment, for example, for an X axis and a Y axis orthogonal to each other, the movable unit can be rotated over a large angle equal to or more than ±20 degrees about the X axis and about the Y axis, and the movable unit can be rotated over a large angle equal to or more than ±5 degrees about a Z axis orthogonal to the X axis and the Y axis. Moreover, satisfactory vibration correction control can be realized in a frequency range in a wide band up to approximately 200 Hz. As a result, the rotation operations of the operation part about the X, Y, and Z axes is realized, and the compact and robust detachment prevention structure is provided. Thus, the actuator for the input/output operation device high in the shock resistance against shocks from the outside, for example, vibrations and a drop impact, is realized.

Referring to FIG. 16 and FIG. 17, a description is now given of an operation of the input/output operation device 750 including the above-mentioned actuator 165 according to the embodiment.

As illustrated in FIG. 16, the input/output operation device 750 according to the embodiment of the present invention includes the actuator 165, a drive circuit part 350, a detection circuit part 360, and a control calculation processing part 94. The input/output operation device 750 may further include a display calculation processing part 700 for displaying target position coordinates of the actuator 165.

The input/output operation device 750 is configured to carry out position control of causing the position of the operation part 850 of the actuator 165 with which the fingers are in touch to relatively match target position coordinates 920 displayed on the display calculation processing part 700. When the target position coordinates 920 successively change in the display calculation processing part 700, the drive circuit part 350 drives the actuator 165 so that the operation part 850 successively follows the position. FIG. 17 is a detailed block diagram for illustrating the control of the input/output operation device 750.

As illustrated in FIG. 17, the drive circuit part 350 includes drive circuits 96a, 96b, and 96r. The detection circuit part 360 includes amplification circuits 98x and 98y for the movable unit 180.

An x coordinate 900 and a y coordinate 901 of the target position coordinates 920 displayed on the display calculation processing part 700 specifically correspond to target rotation angles of the movable unit 180 in the rotation direction 20 and the rotation direction 21, respectively.

Moreover, as illustrated in FIG. 16, the rotation axis 11 and the rotation axis 12 of the actuator 165 are tilted by 45 degrees with respect to a horizontal reference HS in the display calculation processing part 700. This is because, as described above, the influence of the magnetic fields generated by the drive currents of the drive coils 301 and the drive coils 302 is eliminated by providing (in this embodiment, while shifting by 45 degrees), on the projection 501a and 501b and the magnetic sensors 503a and 503b in a region other than a projection region of the drive coils 301, the magnetic yokes 203, the magnetic yoke holders 203L and 203R, the drive coils 302, the magnetic yokes 204, and the magnetic yoke holders 204L and 204R. Thus, when the movable unit 180 is rotated about the straight line 13 in the straight line 14 direction (corresponding to the X axis direction in the display calculation processing part 700), which is the horizontal reference HS direction in the display calculation processing part 700, currents only need to be supplied to both the drive coils 301 and the drive coils 302. Moreover, when the movable unit 180 is rotated about the straight line 14 in the straight line direction 13, which is the direction vertical to the horizontal reference HS, currents only need to be supplied to both the drive coils 301 and the drive coils 302.

As a result, when the drive coils 301 and the drive coils 302 that are rotated by 45 degrees with respect to the x coordinate 900 and the y coordinate 901 of the target position coordinates 920 at θg=45° are driven in the display calculation processing part 700 illustrated in FIG. 16, the rotation angle of the movable unit 180 about the rotation axis 12 and the rotation axis 11 is a rotation angle of $1/\sqrt{2}$ times.

Referring to FIG. 17, a description is now given of an operation of position control drive for the movable unit 130, which is output from the display calculation processing part 700 to the actuator 165 via the control calculation processing part 94.

As illustrated, in FIG. 17, the x coordinate 900 and the y coordinate 901 of the target position coordinates 920 in the display calculation processing part 700 are output as digitized target position coordinate signals 80x and 80y, respectively, and the target position coordinate signals 80x and 80y are input to the control calculation processing part 94.

The control calculation processing part 94 is configured to generate target rotation angle signals 84a and 84b based, on the target position coordinate signals 80x and 80y received from the display calculation processing part 700 and rotation angle signals 88x and 88y received from the detection circuit part 360, thereby carrying out feedback control for the angles about the rotation axes 11 and 12. Specifically, first, the control calculation processing part 94 carries out processing of converting the target position coordinates to the rotation angle of the actuator 165. On this occasion, correction for the displacement of 45 degrees on the projection plane of the magnetic sensors 501a and 501b and the magnetic sensors 503a and 503b from the drive coils 301 and the drive coils 302 is also carried out. As a result, the target rotation angles in the rotation direction 20 and the rotation direction 21 corresponding to the x coordinate 900 and the y coordinate 901 are successively calculated.

The control calculation processing part 94 includes, for example, a CPU and a random access memory (RAM). The control calculation processing part 94 is configured to execute a computer program read into the RAM, thereby transmitting commands to other circuits in accordance with a procedure of the computer program. Each of the circuits that receives the command is configured to operate as described herein, thereby realizing functions of each of the circuits. The command from the control calculation processing part 94 is specifically transmitted to the display calculation processing part 700, the drive circuit part 350, and the detection circuit part 360. The procedure of the computer program is illustrated in a flowchart of the accompanying drawing.

The RAM into which the computer program is read, that is, the RAM storing the computer program, may be volatile or non-volatile. A volatile RAM is a RAM that cannot hold stored information without supply of electric power. For example, a dynamic random access memory (DRAM) is a typical volatile RAM. A non-volatile RAM is a RAM capable of holding information even without supply of electric power. Examples of the non-volatile RAM include a magneto-resistive RAM (MRAM), a resistive random access memory (ReRAM), and a ferroelectric random access memory (FeRRM). In this embodiment, it is preferred to adopt a non-volatile RAM.

Each of the volatile RAM and the non-volatile RAM is an example of a non-transitory computer-readable recording medium. Moreover, a magnetic recording medium, for example, a hard disk, and an optical recording medium, for example, an optical disc, are also examples of the non-transitory computer-readable recording medium. In other words, a computer program according to this disclosure may be recorded on a variety of non-transitory computer-readable media other than media (transitory media), such as air, that allow the computer program to propagate as a radio signal.

Moreover, the position displacement correction processing for the target position, carried out by the control calculation processing part 94 is position closed control (closed loop control) in which, the movable unit 180 of the actuator 165 is driven so as to suppress a position error in accordance with the target position, coordinate signals 80x and 80y of the x coordinate 900 and the y coordinate 901 output from the display calculation processing part 700. Thus, the control calculation processing part 94 is configured to successively output the target rotation angle signals 84a and 84b as optimal digital vibration correction amounts including frequency response characteristics, phase compensation, gain compensation of the actuator 165, and the like.

The target, rotation angle signals 84a and 84b are converted to analog signals by DA converters 95a and 95b, and are input as analog target rotation angle signals 85a and 85b to a drive circuit 96a about the rotation axis 11 and a drive circuit 96b about the rotation axis 12.

Meanwhile, in the actuator 165, a rotation angle signal 86y corresponding to the current rotation angle of the movable unit 180 with respect to the base 200, that is, the rotation direction 20, namely, the Y axis direction perpendicular to the HS of the display calculation processing part 700, is output from the magnetic sensors 501a and 501b for detecting the current direction of the operation part 850, and a rotation angle signal 86x corresponding to the rotation direction 21, namely, the HS direction of the display calculation processing part 700 is output from the magnetic sensors 503a and 503b. Noise components and DC drift components are removed from the rotation angle signals 86x and 86y by analog circuits 97x and 97y, resulting in rotation angle signals 87x and 87y. Further, the rotation angle signals 87x and 87y are amplified by the amplification circuits 98x and 98y, resulting in the rotation angle signals 88x and 88y having appropriate amplitudes, and digitized rotation angle signals 89x and 89y digitized by AD converters 99x and 99y are successively input to the control calculation processing part 94. The rotation angle signals 89x and 89y represent current directions of the operation part 850 as described above.

The position closed control described above is carried out by calculating, by the control calculation processing part 94, the difference (position error) between the target position coordinates 920 based on the target position coordinate signals 80x and 80y and the current position coordinates based on the rotation angle signals 89x and 89y of the movable unit 180, and successively outputting the target rotation angle signals 84a and 84b based on the position error anew.

More specifically, the control calculation processing part 94 carries out calculation of inversely converting the rotation angle signals 89x and 89y of the movable unit 180 to the position coordinate system displayed in the display calculation processing part 700, thereby generating feedback position coordinate signals 82x and 82y, which are the current position coordinates, and are the current directions of the operation part 850 of the movable unit 180. The control calculation processing part 94 further acquires differences between the feedback position coordinate signals 82x and 82y and the target position coordinate signals 80x and 80y, and generates the target rotation angle signals 84a and 84b based on the differences to output the target rotation angle signals 84a and 84b to the drive circuit part 350. The feedback position signals 82x and 82y may be output to the display calculation processing part 700 in order to show the current position of the operation part 850.

The drive circuits 96a and 96b rotationally drive the movable unit 180 of the actuator 165 by using the target angle signals 85a and 85b, simultaneously, the magnetic sensors 501a and 501b, and 503a and 503b detect the rotation angles of the movable unit 180 to output the rotation angle signals 86x and 86y. The above-mentioned processing is applied to the rotation angle signals 86x and 86y, and the rotation angle signals 89x and 89y are fed back to the control calculation processing part 94.

Thus, the drive signals for driving the drive coils 301 and the drive coils 302 are output to the drive circuits 96a and 96b based on the target position coordinate signals 80x and 80y of the display calculation processing part 700, the target rotation angle signals 83a and 85b, and the rotation angle signals 89x and 89y of the movable unit 180. As a result, the feedback control for the angle position is carried out for the target position coordinates 920 in the input/output operation device 750, and the movable unit 180 of the actuator 165 is driven so that the feedback position coordinate signals 82x and 82y are equal to the target position coordinate signals 80x and 80y. As a result of this procedure of drive control, the position tracking control of the operation part 850 of the movable unit 180 is carried out, and a satisfactory tactile/force sense operation can be realized.

Referring to FIG. 17, a description is now given of drive control operation in the rotation direction 22, which is output from the display calculation processing part 700 to the actuator 165.

The movable unit 180 is also driven in the rotation direction 22 about the Z axis 10. This operation is mainly a vibration of the movable unit 180 by a drive signal, for example, a sinusoidal wave, a square wave, a pulse wave, and a triangular wave. According to this embodiment, this operation is carried out based on open control.

The control calculation processing part 94 is configured to generate a drive signal 84r having a predetermined drive waveform pattern based on a selection signal 80r received from, the display calculation processing part 700, thereby driving the movable unit 180 to vibrate about the Z axis 10. Therefore, the control calculation processing part 94 stores various drive waveforms for providing predetermined vibration modes. The drive waveform patterns include a drive waveform pattern that is considered to be appropriate for presenting a tactile operation function, and has a high frequency characteristic represented as a stick/slip feeling and a click feeling.

The display calculation processing part 700 is configured to output the selection signal 80r for selecting the drive waveform pattern to the control calculation processing part 94. The control calculation processing part 94 is configured to select the predetermined drive waveform pattern based on the selection signal 80r, and output the digitized drive signal 84r to a DA converter 95r. An analogized drive signal 85r is input to a drive circuit 96r for the rotation direction 22. As a result, the movable unit 180 is driven to vibrate in the rotation direction 22, thereby providing a vibration feeling to the fingertip of the operator, or a tactile feeling of stimulating Pacinian corpuscles inside the fingertip via the operation part 850.

The vibration of the movable unit 180 in the rotation direction 22 is formed of, for example, a repetition of a motion of a rotation toward the right direction by a predetermined angle about the Z axis 10 and an inverse rotation toward the left direction by a predetermined angle when the movable unit 180 is viewed from above.

Moreover, the movable unit 180 may be driven in the rotation direction 22 by a drive signal including a frequency component in an audible range in addition to the vibration drive. As a result, the movable unit 180 vibrates at a frequency in the audible range, and a sound can be output from the actuator 165.

As described above, the input/output operation device according to this embodiment, which has the configuration in which the operation part 850 of the movable unit 180 is two-dimensionally controlled in the angles about the rotation axes 11 and 12 and driven to vibrate in the rotation direction 22, can be used as the human-machine interface (HMI) used in various fields.

Referring to FIG. 17, a description is now given of an operation of detecting the rotation angles of the movable unit 180, which are output from the actuator 165 to the display calculation processing part 700 via the control calculation processing part 94.

Due to the configuration of the actuator 165, when the movable unit 180 is two-dimensionally rotated about the rotation axes 11 and 12 by the fingertip via the operation part 850, the magnetic sensors 501a and 501b and the magnetic sensors 503a and 503b function as sensors for detecting the rotation angles about the rotation axes 11 and 12 of the movable unit 180.

Further, the actuator 165 has a satisfactory frequency response characteristic and a high rotation angle resolution, and hence the operation detection sensitivity of the movable unit 180 for the fingertip is very high. Thus, the actuator 165 can detect the flick input, the swipe input, and a character input often used on a portable terminal.

The rotation, angle signal 86y in the rotation direction 20, that is, corresponding to the y axis direction perpendicular to HS of the display calculation processing part 700, is output from the magnetic sensors 501a and 501b, and the rotation angle signal 86x in the rotation direction 21, that is, corresponding to the HS direction, which is the horizontal direction, of the display calculation processing part 700, is output from the magnetic sensors 503a and 503b.

Noise components and DC drift components are removed from the rotation angle signals 86x and 86y by the analog circuits 97x and 97y, resulting in the rotation angle signals 87x and 87y. Further, the rotation angle signals 88x and 88y having the appropriate output values are acquired by the amplification circuits 98x and 98y, and the rotation angle signals 89x and 89y digitized via the AD converters 99x and 99y are successively input to the control calculation processing part 94. The control calculation processing part 94 stores various input detection waveform patterns including special input pattern modes, for example, the flick input and the swipe input, and is configured to select, by comparison and detection, which input pattern mode the rotation angle signals 89x and 89y, which are the input waveforms, correspond to, and output the selected, input pattern mode as a selection signal 82s to the display calculation processing part 700.

A description is now given of an operation of rotation detection in the rotation direction 22 of the movable unit 180. According to this embodiment, a magnetic sensor dedicated for the rotation detection is not provided. However, as described above, when the movable unit 180 is rotated in the rotation direction 20 and the rotation direction 21 as well as rotated in the rotation direction 22, whether the movable unit 180 is operated rightward or leftward in the rotation direction 22 can be detected from a relative output difference between the rotation angle signals 89x and 89y.

As a result, the operation part 850 installed in the movable unit 180 can be moved to rotate in the rotation direction 20 and the rotation direction 21 while being turned rightward or leftward, and thus alternative input for a pinch input for zooming in/out a screen and scroll input, which is often used on a portable terminal, can be detected. For example, the control calculation processing part 94 may detect the difference between the rotation angle signals 89x and 89y, and output the result to the display calculation processing part 700 as a rotation direction difference detection signal 82r.

Figure 19A:
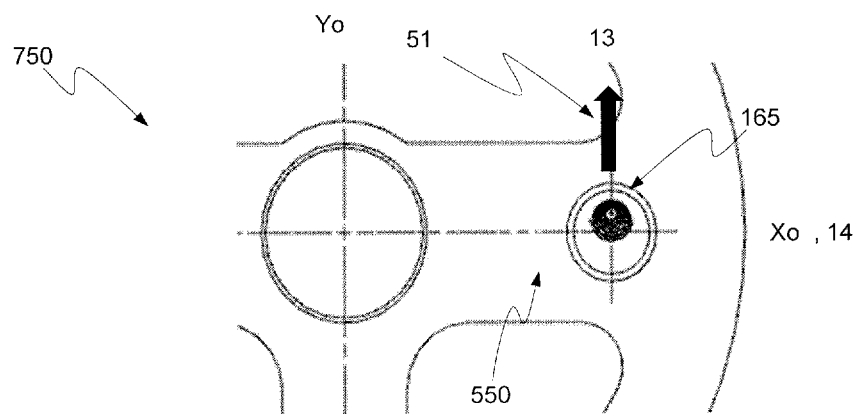
FIG. 19A is a diagram for illustrating an operation direction of the operation part of the actuator when the steering wheel is at a neutral position.
Figure 19B:
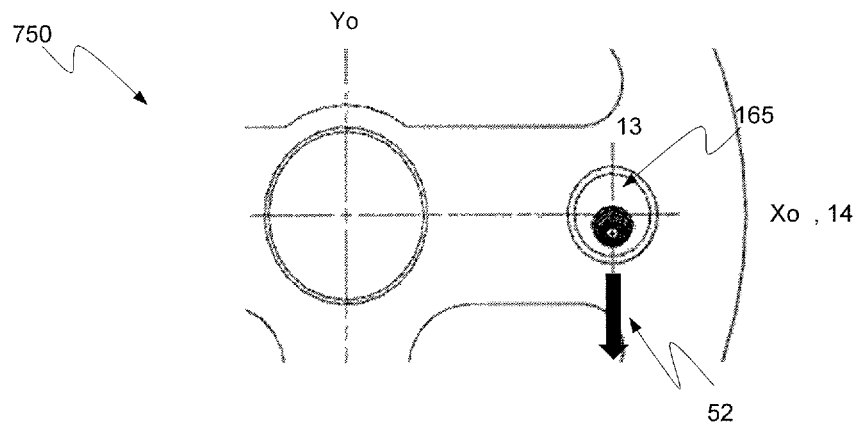
FIG. 19B is a diagram for illustrating an operation direction of the operation part of the actuator when the steering wheel is at the neutral position.
Figure 19C:
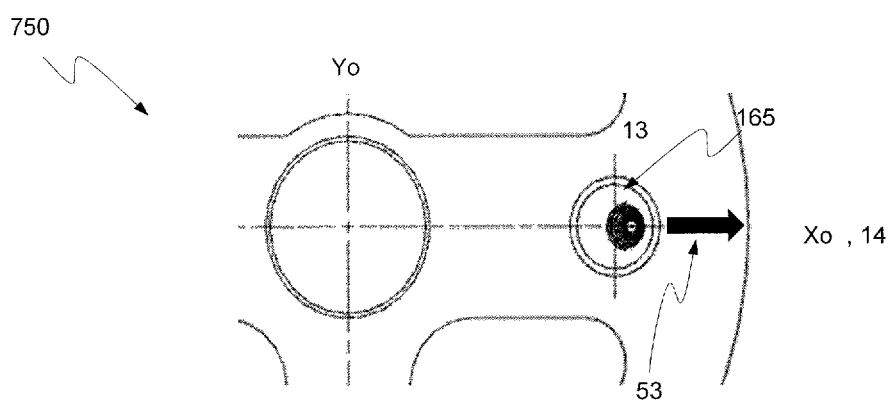
FIG. 19C is a diagram for illustrating an operation direction of the operation part of the actuator when the steering wheel is at the neutral position.
Figure 19D:
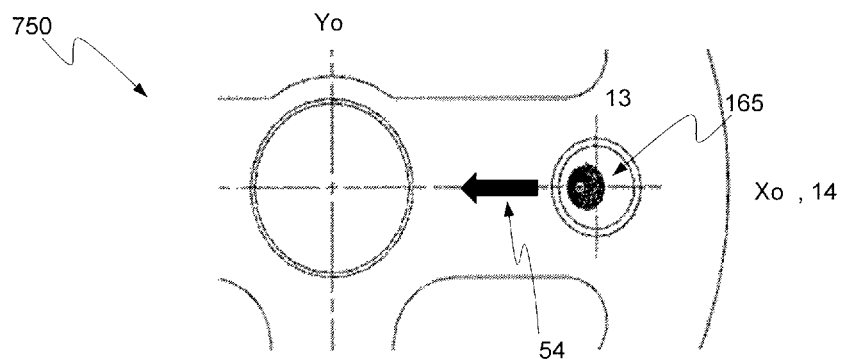
FIG. 19D is a diagram for illustrating an operation direction of the operation part of the actuator when the steering wheel is at the neutral position.
Figure 29A:
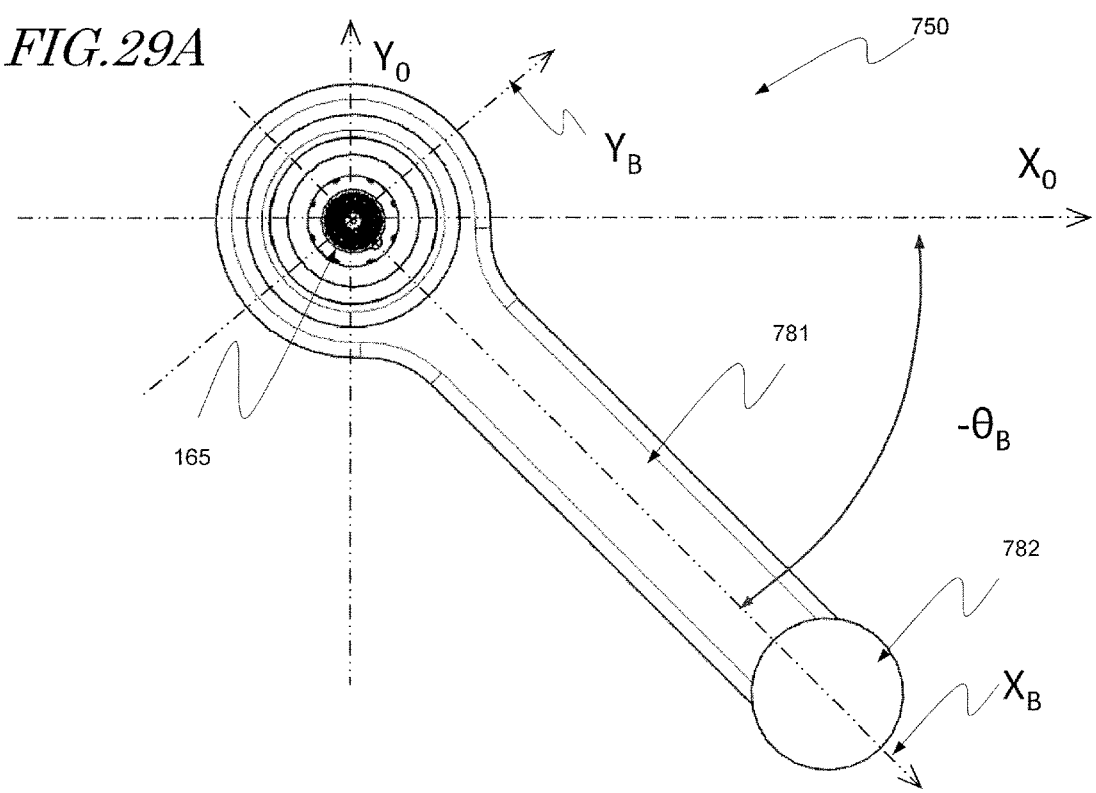
FIG. 29A is a diagram for illustrating an operation direction when the coordinate conversion for the actuator 165 is carried out under a state in which the rotation operation lever 780 is rotated by the operation rotation angle −θB about the Z0 axis in the input/output operation device 750 according to the second embodiment of the present invention.
Figure 29B:
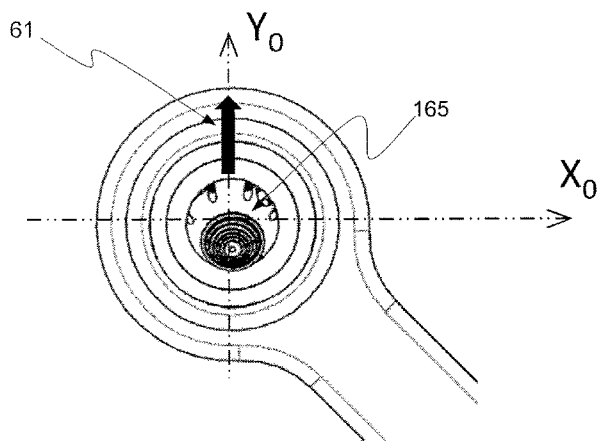
FIG. 29B is a diagram for illustrating an operation direction when the coordinate conversion for the actuator 165 is carried out under the state in which the rotation operation lever 780 is rotated by the operation rotation angle −θB about the Z0 axis in the input/output operation device 750 according to the second embodiment of the present invention.
Figure 29C:
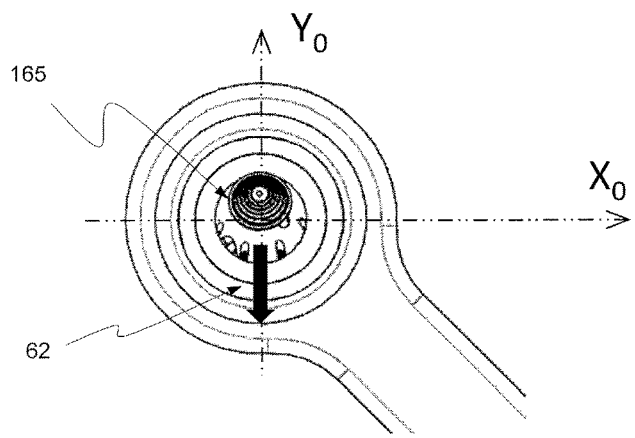
FIG. 29C is a diagram for illustrating an operation direction when the coordinate conversion for the actuator 165 is carried out under the state in which the rotation operation lever 780 is rotated by the operation rotation angle −θB about the Z0 axis in the input/output operation device 750 according to the second embodiment of the present invention.
Figure 29D:
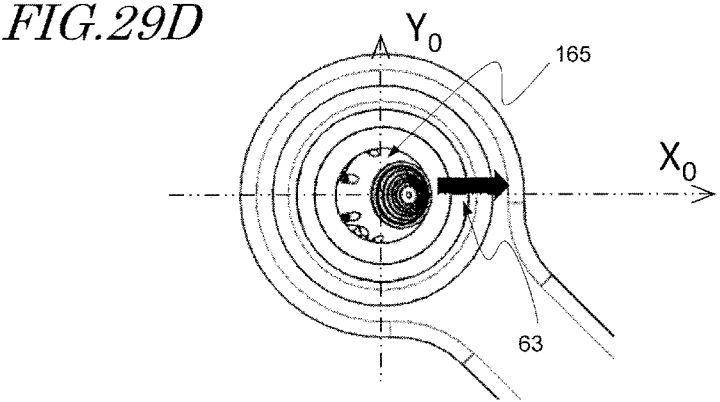
FIG. 29D is a diagram for illustrating an operation direction when the coordinate conversion for the actuator 165 is carried out under the state in which the rotation operation lever 780 is rotated by the operation rotation angle −θB about the Z0 axis in the input/output operation device 750 according to the second embodiment of the present invention.
Figure 29E:
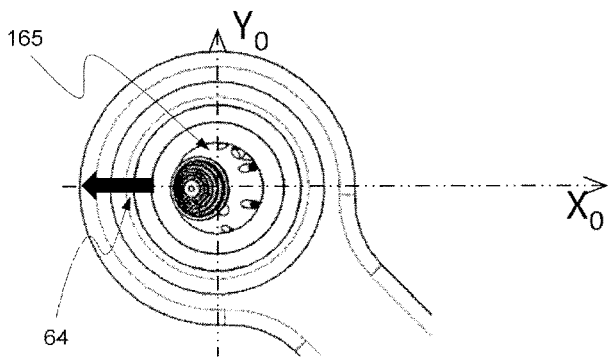
FIG. 29E is a diagram for illustrating an operation direction when the coordinate conversion for the actuator 165 is carried out under the state in which the rotation operation lever 780 is rotated by the operation rotation angle −θB about the Z0 axis in the input/output operation device 750 according to the second embodiment of the present invention.

A description is now given of control carried out when the actuator 165 is installed on the steering wheel 550. As illustrated in FIG. 19A to FIG. 19D, when the rotation angle of the steering wheel 550 is at a neutral position (0 degrees), the straight line 14 and the straight line 13 of the actuator installed on the steering wheel 550 match a horizontal direction Xo and a vertical direction Yo for a vehicle in which the steering wheel 550 is installed and a driver operating the steering wheel. Therefore, the coordinates of the display calculation processing part 700 described above and the coordinates of the actuator 165 match each other, and as described with reference to FIG. 16 and FIG. 17, the target position can be set, and the feedback control can be carried out. In other words, a target position or a target direction in the coordinate system of the display calculation processing part 700 stationary in the vehicle in which the steering wheel 550 is installed match a target position or a target direction in the coordinates of the actuator 165. As illustrated in FIG. 19A and FIG. 29B, an operation in a upward direction 51 and an operation in a downward direction 52 in the vertical direction of the operation part 850 installed on the movable unit 180 of the actuator 165 match the upward direction and the downward direction in the Y axis direction in the coordinates of the display calculation processing part 700. Similarly, as illustrated in FIG. 19C and FIG. 19D, an operation in a rightward direction 53 and an operation in a leftward direction 54 in the horizontal direction of the operation part 850 installed on the movable unit 180 of the actuator 165 match the rightward direction and the leftward direction in the X axis direction in the coordinates of the display calculation processing part 700.

Figure 20A:
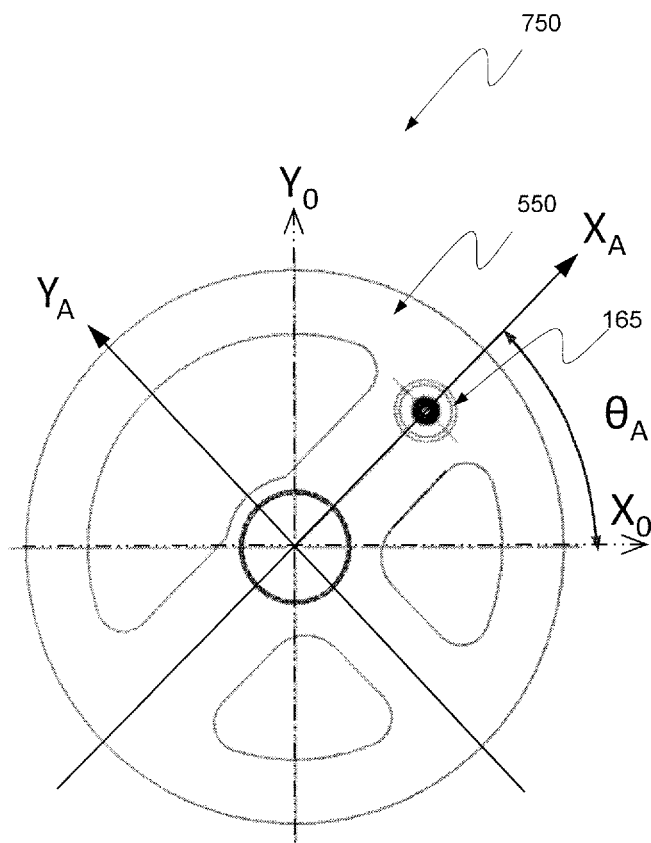
FIG. 20A is a diagram for illustrating a state in which the steering wheel is rotated by θA.
Figure 20B:
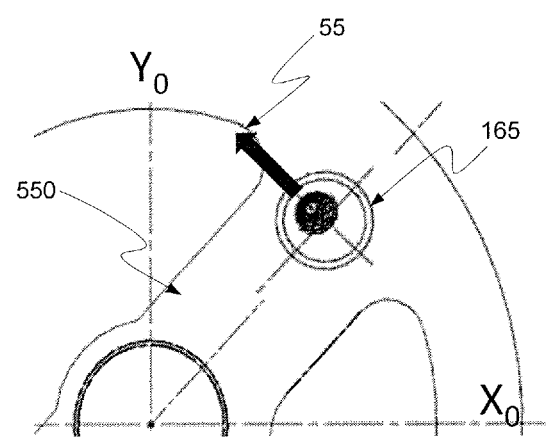
FIG. 20B is a diagram for illustrating an operation direction of the operation part of the actuator when the steering wheel is rotated by θA.
Figure 20C:
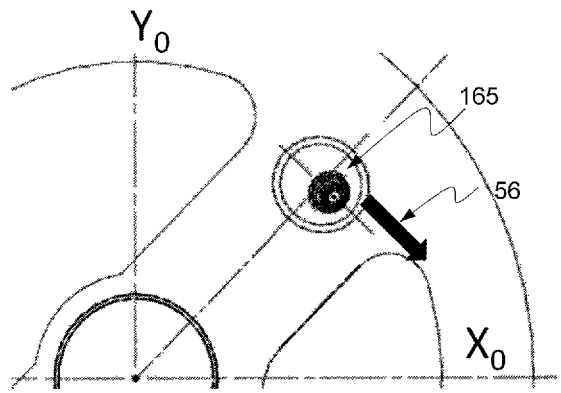
FIG. 20C is a diagram for illustrating an operation direction of the operation part of the actuator when the steering wheel is rotated by θA.
Figure 20D:
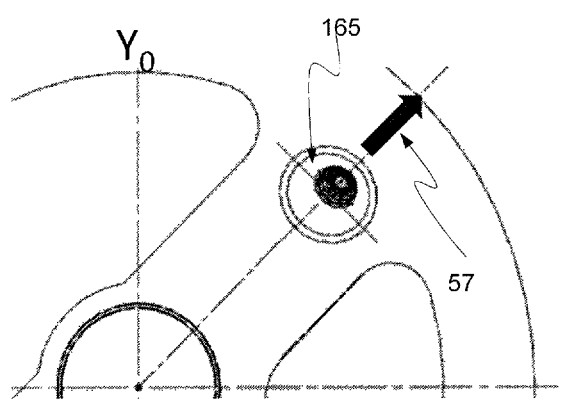
FIG. 20D is a diagram for illustrating an operation direction of the operation part of the actuator when the steering wheel is rotated by θA.
Figure 20E:
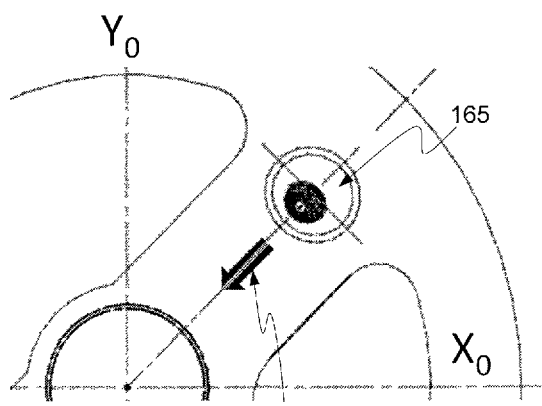
FIG. 20E is a diagram for illustrating an operation direction of the operation part of the actuator when the steering wheel is rotated by θA.

However, as illustrated in FIG. 20A, when the steering wheel 550 is rotated, the straight line 14 and the straight line 13 of the actuator 165 do not match the horizontal direction Xo and the vertical direction Yo. As illustrated in FIG. 20B to FIG. 20E, operation directions 55 and 56 along the vertical direction of the actuator 165 and operation directions 57 and 58 are different from the horizontal direction Xo and the vertical direction Yo of the vehicle on which the steering 550 is installed.

Therefore, as illustrated in FIG. 19A to FIG. 19D, when a target direction is defined in the coordinate system of the display calculation processing part 700 so as to move the operation part 850 in the horizontal direction or the vertical direction (the direction of the straight line 14 or the straight line 13) while a state in which the rotation angle of the steering wheel 550 is 0 is set as a reference, the driver or the like is required to carry out an operation in a direction (the operation direction 55 or 56 or the operation direction 57 or 58) different from the horizontal direction or the vertical direction displayed on the display calculation processing part 700.

According to this embodiment, in order to solve this mismatch, the coordinates in the actuator 185 are converted depending on the rotation angle of the steering wheel so that the coordinates match the coordinates of the display calculation processing part 700, which is the stationary coordinate system.

Figure 21A:
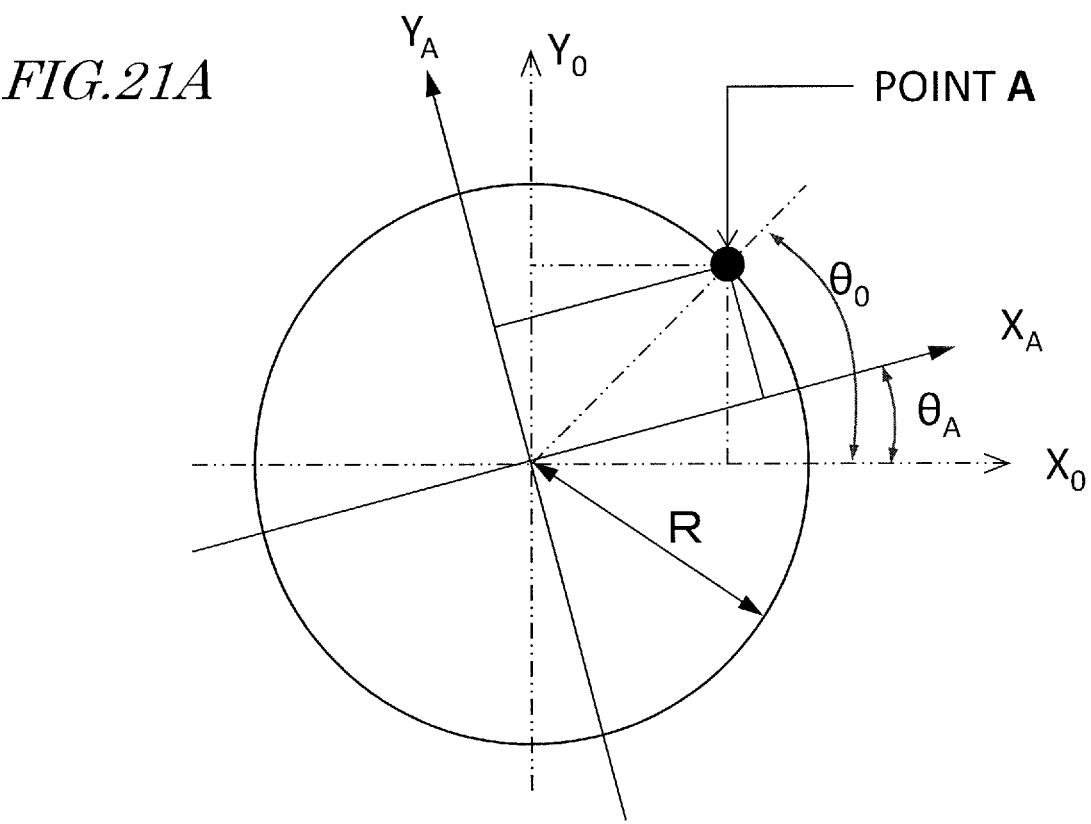
FIG. 21A is a diagram for illustrating details of coordinate conversion in the input/output operation device 750 according to the embodiment of the present invention.

Referring to FIG. 21A, a description is now given of the coordinate conversion of the actuator 165 when the steering wheel 550 is rotated.

When the target position displayed on the display calculation processing part 700 is a point A in the coordinate system (Xo-Yo coordinate system) formed of the horizontal direction $X_0$ of the vehicle and the vertical direction $Y_0$ thereof orthogonal to the horizontal direction $X_0$ when the steering 550 is at the neutral position, the coordinates of the point A are acquired as (R cos $\theta_0$, R sin $\theta_0$) where R is a radius from the rotation center.

Figure 22A:
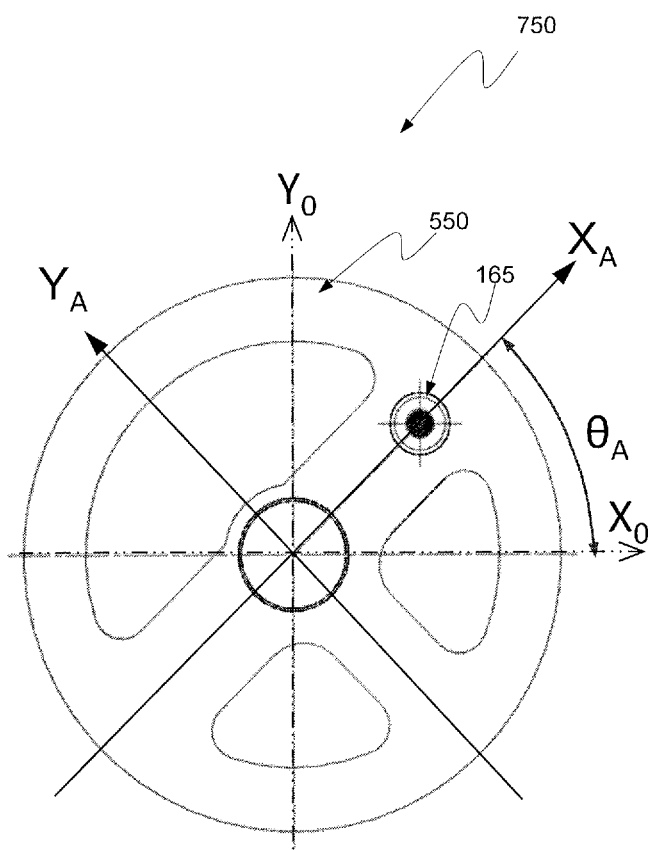
FIG. 22A is a diagram for illustrating an operation direction when the coordinate conversion for the actuator 165 is carried out under a state in which a steering wheel 550 is rotated by the operation rotation angle θA in the input/output operation device 750 according to the embodiment of the present invention.
Figure 22B:
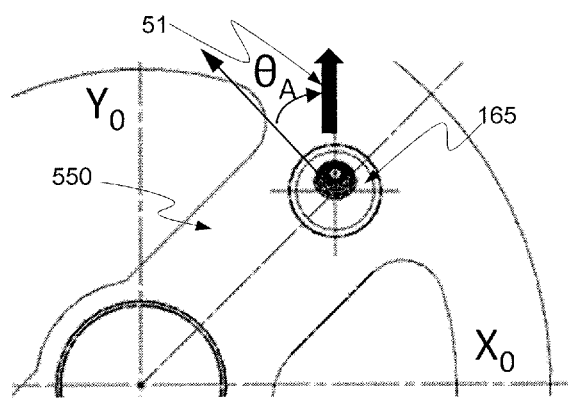
FIG. 22B is a diagram for illustrating an operation direction when the coordinate conversion for the actuator 165 is carried out under the state in which the steering wheel 550 is rotated by the operation rotation angle θA in the input/output operation device 750 according to the embodiment of the present invention.
Figure 22C:
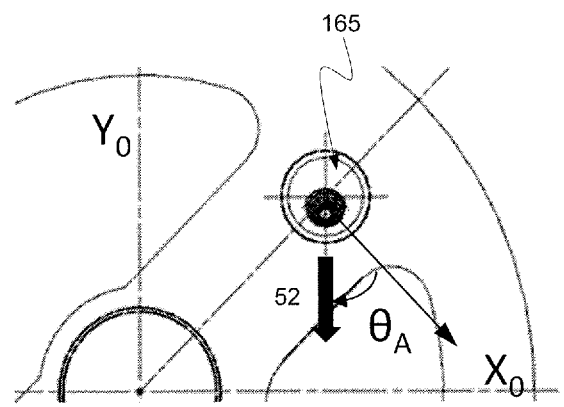
FIG. 22C is a diagram for illustrating an operation direction when the coordinate conversion for the actuator 165 is carried out under the state in which the steering wheel 550 is rotated by the operation rotation angle θA in the input/output operation device 750 according to the embodiment of the present invention.
Figure 22D:
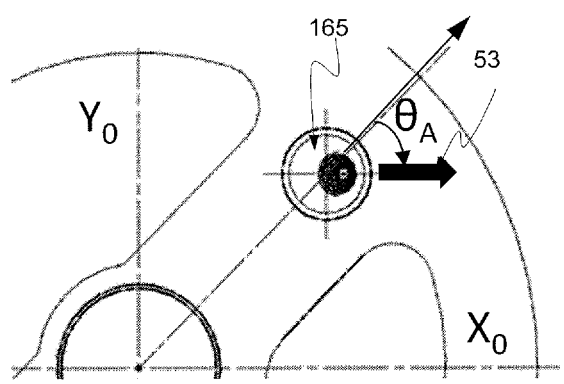
FIG. 22D is a diagram for illustrating an operation direction when the coordinate conversion for the actuator 165 is carried out under the state in which the steering wheel 550 is rotated by the operation rotation angle θA in the input/output operation device 750 according to the embodiment of the present invention.
Figure 22E:
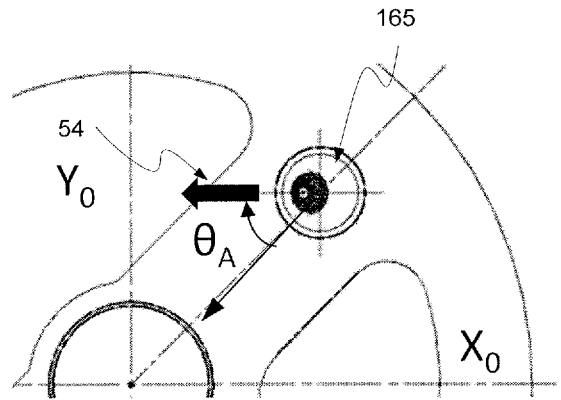
FIG. 22E is a diagram for illustrating an operation direction when the coordinate conversion for the actuator 165 is carried out under the state in which the steering wheel 550 is rotated by the operation rotation angle θA in the input/output operation device 750 according to the embodiment of the present invention.

As illustrated in FIG. 22A, when the steering wheel 550 is rotated leftward by $\theta_A$, the coordinates ($X_A$-$Y_A$ coordinate system) of the actuator 165 rotate leftward by Thus, the coordinates of the point A displayed on the display calculation processing device 700 are converted to (R cos($\theta_0$−$\theta_A$), R sin ($\theta_0$−$\theta_A$)). In other words, $\theta_A$ is subtracted from $\theta_0$ to convert the Xo-Yo coordinate system to the $X_A$-$Y_A$ coordinate system. For example, as illustrated in FIG. 22B to FIG. 22E, when the operation part 850 of the actuator 165 is driven in the horizontal direction Xo and the vertical direction Yo in the coordinates of the display calculation processing part 700, and the operation part 850 is driven (in the operation directions 51 to 54) at angles acquired by respectively subtracting $\theta_A$ in the coordinates of the actuator 165, the coordinates in the actuator 165 match the coordinate system of the display calculation processing part 700, that is, the horizontal direction Xo and the vertical direction Yo for the vehicle in which the steering wheel 550 is installed, and the driver operating the steering wheel. Conversely, when the coordinates ($X_A$-$Y_A$ coordinate system) of the actuator 165 are converted to the coordinates (Xo-Yo coordinate system) of the display calculation processing part 700, $\theta_A$ only needs to be added to $\theta_0$.

Figure 23A:
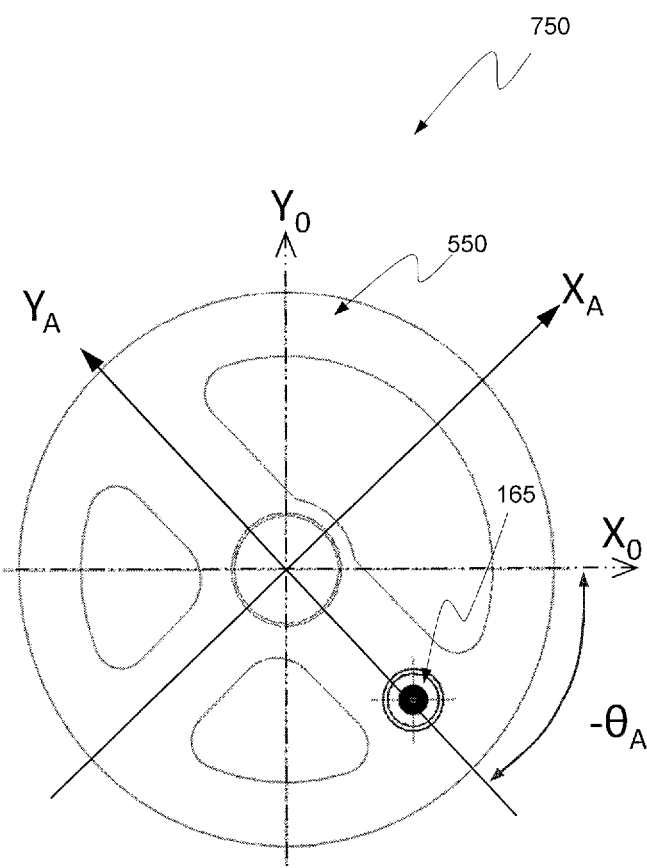
FIG. 23A is a diagram for illustrating an operation direction when the coordinate conversion for the actuator 165 is carried out under a state in which the steering wheel 550 is rotated by an operation rotation angle −θA in the input/output operation device 750 according to the embodiment of the present invention.
Figure 23B:
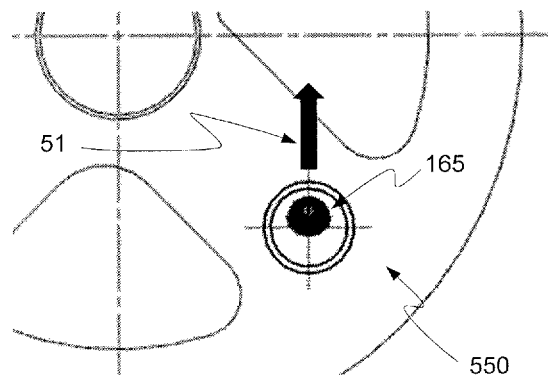
FIG. 23B is a diagram for illustrating an operation direction when the coordinate conversion for the actuator 165 is carried out under the state in which the steering wheel 550 is rotated by the operation rotation angle −θA in the input/output operation device 750 according to the embodiment of the present invention.
Figure 23C:
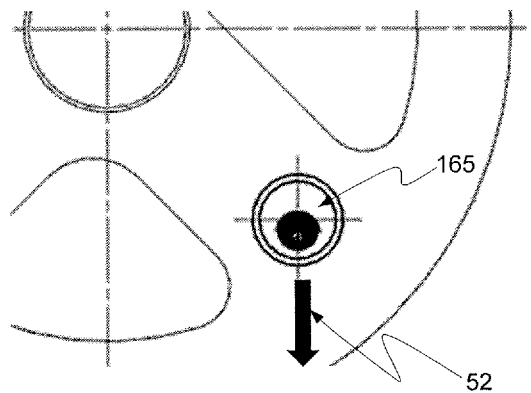
FIG. 23C is a diagram for illustrating an operation direction when the coordinate conversion for the actuator 165 is carried out under the state in which the steering wheel 550 is rotated by the operation rotation angle −θA in the input/output operation device 750 according to the embodiment of the present invention.
Figure 23D:
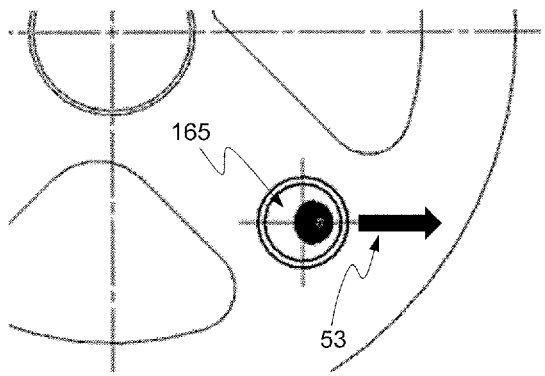
FIG. 23D is a diagram for illustrating an operation direction when the coordinate conversion for the actuator 165 is carried out under the state in which the steering wheel 550 is rotated by the operation rotation angle −θA in the input/output operation device 750 according to the embodiment of the present invention.
Figure 23E:
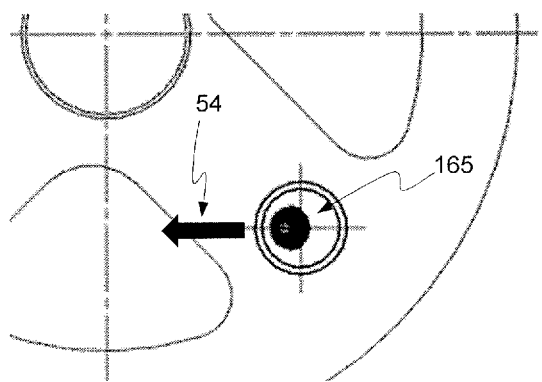
FIG. 23E is a diagram for illustrating an operation direction when the coordinate conversion for the actuator 165 is carried out under the state in which the steering wheel 550 is rotated by the operation rotation angle −θA in the input/output operation device 750 according to the embodiment of the present invention.

As illustrated in FIG. 23A, when the steering wheel 550 is rotated rightward by $\theta_A$, the coordinates ($X_A$-$Y_A$ coordinate system) of the actuator 165 rotate rightward by $\theta_A$. Thus, the coordinates of the point A displayed on the display calculation processing device 700 are converted to (R cos ($\theta_0$+$\theta_A$), R sin($\theta_0$+$\theta_A$)). In other words, $\theta_A$ is added to $\theta_0$ to convert the Xo-Yo coordinate system to the $X_A$-$Y_A$ coordinate system. For example, as illustrated in FIG. 23B to FIG. 23E, when the operation part 850 of the actuator 165 is driven in the horizontal direction Xo and the vertical direction Yo in the coordinate of the display calculation processing part 700, and the operation part 850 is driven (in the operation directions 51 to 54) at angles acquired by respectively adding $\theta_A$ in the coordinates of the actuator 165, the coordinates in the actuator 165 match the coordinate system of the display calculation processing part 700, that is, the horizontal direction Xo and the vertical direction Yo for the vehicle in which the steering wheel 550 is installed, and the driver operating the steering wheel. When the coordinates ($X_A$-$Y_A$ coordinate system) of the actuator 165 are converted to the coordinates (Xo-Yo coordinate system) of the display calculation processing part 700, $\theta_A$ is subtracted from $\theta_0$.

As illustrated in FIG. 17, those coordinate conversions are realized by the control calculation processing part 94 receiving a signal 83 relating to the rotation angle $\theta_A$ of the steering wheel 550 from a rotation sensor or the like provided on the rotation shaft of the steering wheel 550, and applying the above-mentioned calculation to the rotation angle signals 89x and 89y and the target position coordinate signals 80x and 80y of the movable unit 180.

Figure 21B:
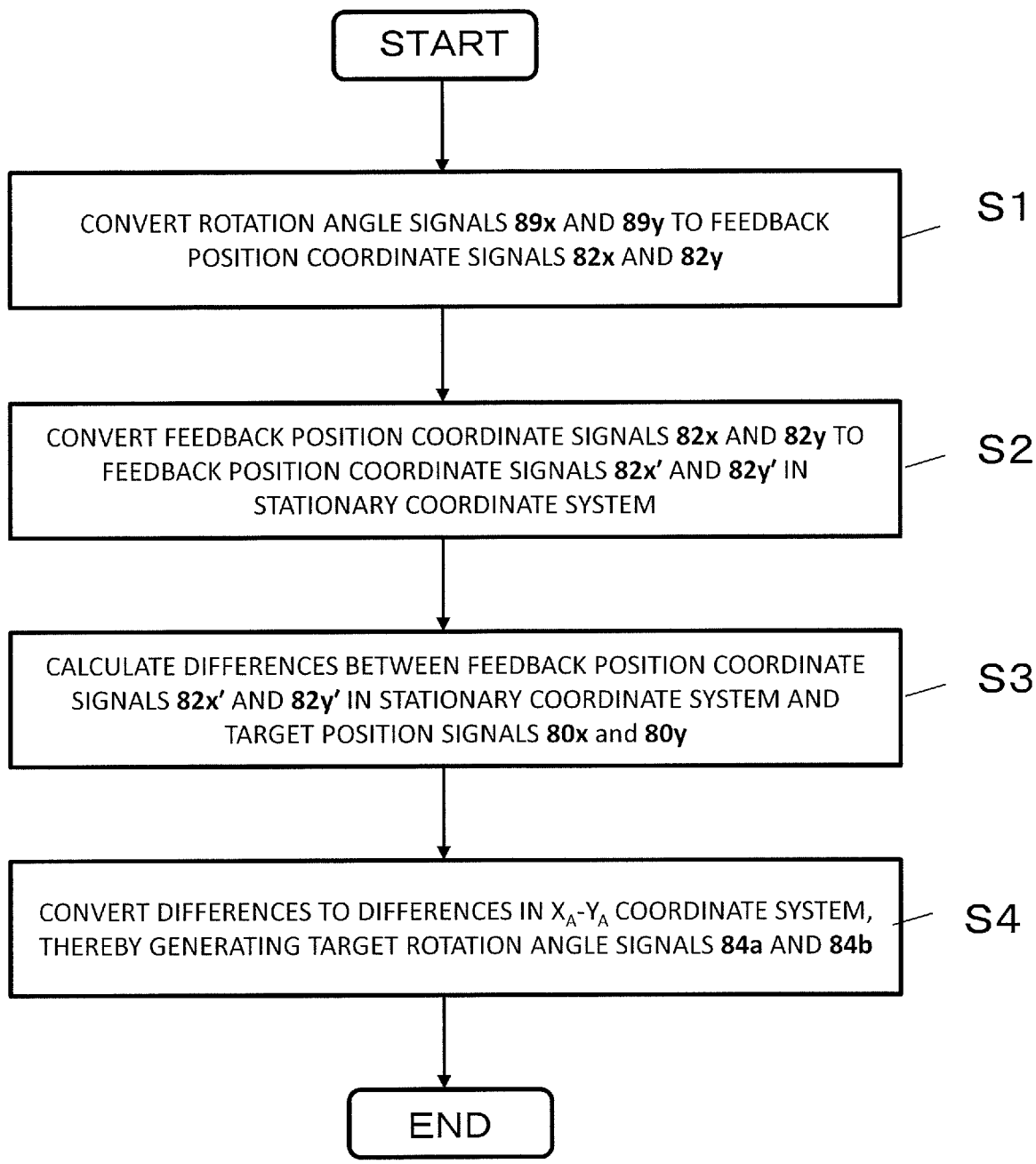
FIG. 21B is a flowchart for illustrating an example of processing in a control calculation processing part.

Specifically, as illustrated in FIG. 21B, the control calculation processing part 94 inversely converts the rotation angle signals 89x and 89y of the movable unit 180 so as to generate the feedback position coordinate signals 82x and 82y converted to the $X_A$-$Y_A$ coordinate system (S1). Those feedback position coordinate signals 82x and 82Y are angles depending on the rotation angle $\theta_A$ of the steering wheel 550. Thus, the feedback position coordinate signals 82x and 82y in coordinate signals 82x' and 82y' in the Xo-Yo coordinate system, which is the stationary coordinate system of the display calculation processing part 700, by using the rotation angle $\theta_A$ of the steering wheel 550 to subtract $\theta_A$ from $\theta_0$ (S2).

The control calculation processing part 94 calculates differences between the feedback position coordinate signals 82x' and 82y' and the target position coordinate signals 80x and 80y in the Xo-Yo coordinate system (S3). The acquired signals of the differences are signals in the Xo-Yo coordinate system, and thus the signals are converted to signals in the $X_A$-$Y_A$ coordinate system by adding the rotation angle $\theta_A$, thereby acquiring the target rotation angle signals 84a and 84b (S4). The target rotation angle signals 84a and 84b are output to the drive circuit part 350.

The control calculation processing part 94 uses the Xo-Yo coordinate system, which is the stationary coordinate system with respect to 0 degrees, which is the reference rotation angle of the steering wheel 550, to carry out the control of driving the operation part 850 provided on the movable unit 180 of the actuator by carrying out this signal processing even when the steering wheel 550 is held at a different rotation angle $\theta_A$.

As a result, for example, when the target direction displayed on the display calculation processing part 700 is the vertical direction or the horizontal direction, and the steering wheel 550 is sit any rotation angle, correct input 165 toward the direction displayed on the display calculation processing part 700. Moreover, when the steering wheel 550 is at any rotation, angle, the operation part of the actuator 165 can be driven toward the target direction displayed on the display calculation processing part 700.

Figure 24:
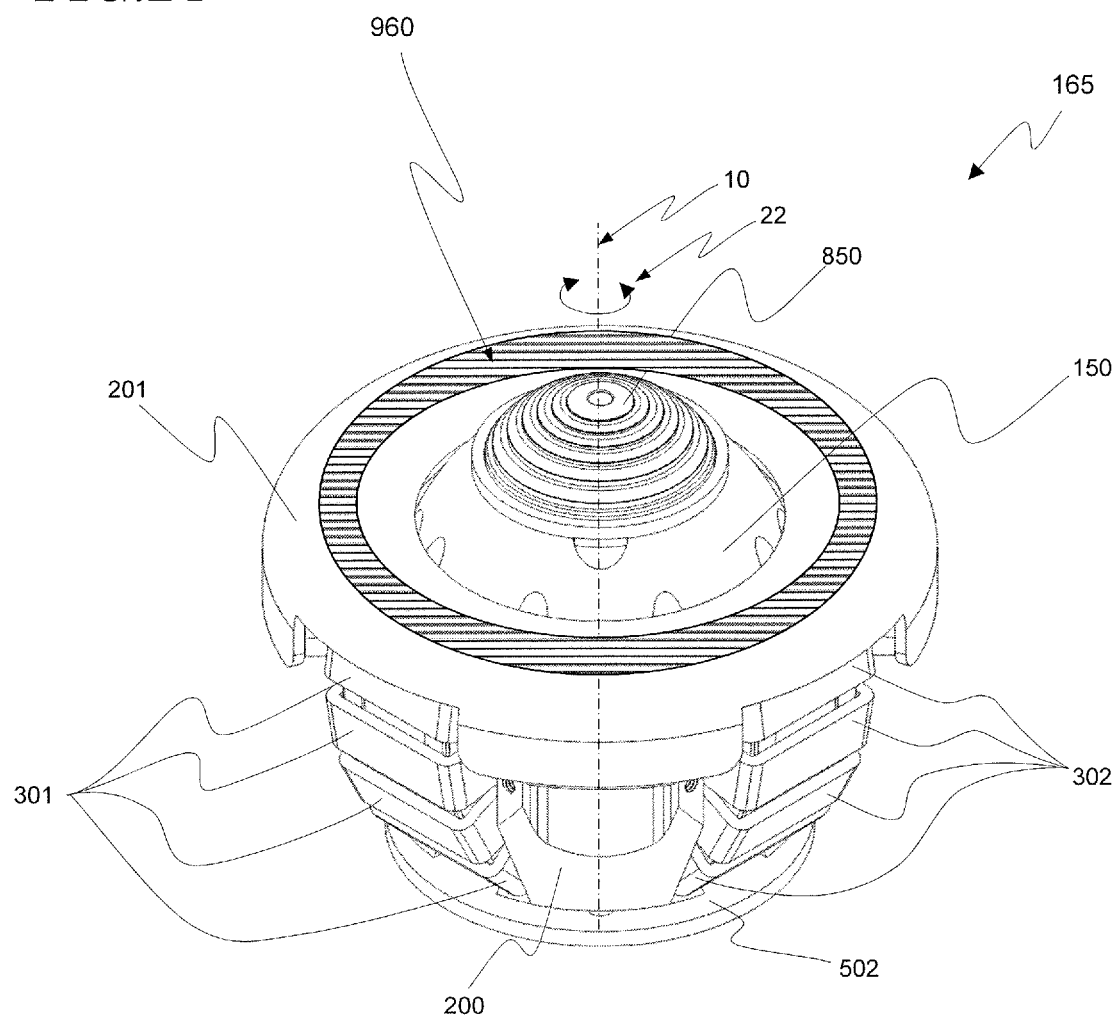
FIG. 24 is a diagram for illustrating a switch part 960 of the input/output operation device 750 according to the embodiment of the present invention.

Further, as illustrated in FIG. 24, a switch part 960 having a ring shape may be provided on a top of the detachment prevention member 201 of the fixed unit around the operation part 850 and the upper movable part 150. As a result, a switch operation for determination or selection can be carried, out independently of the direction at any rotation position of the steering wheel 550.

A description has been given of the case in which the operation direction of the actuator 165 is held constant so as to be parallel with the horizontal direction $X_0$ and the vertical direction $Y_0$, but it should be understood that the operation direction can be held constant at a specified certain angle.

Even when the steering wheel 550 has been rotated in this way, the operation direction of the actuator 165 of the input/output operation device 750 is held constant in the horizontal direction and the vertical direction, which are the $X_O$-$Y_O$ absolute coordinates, and the determination/recognition of the operation is thus extremely simplified. As a result, safety and security of the HMI is realized by suppressing the movement of the line of sight of the driver, and additionally enabling a touch operation without looking at a steering wheel through the tactile/force determination/selection independently of the direction even during traveling particularly while the steering wheel is rotated.

Second Embodiment

Figure 25:
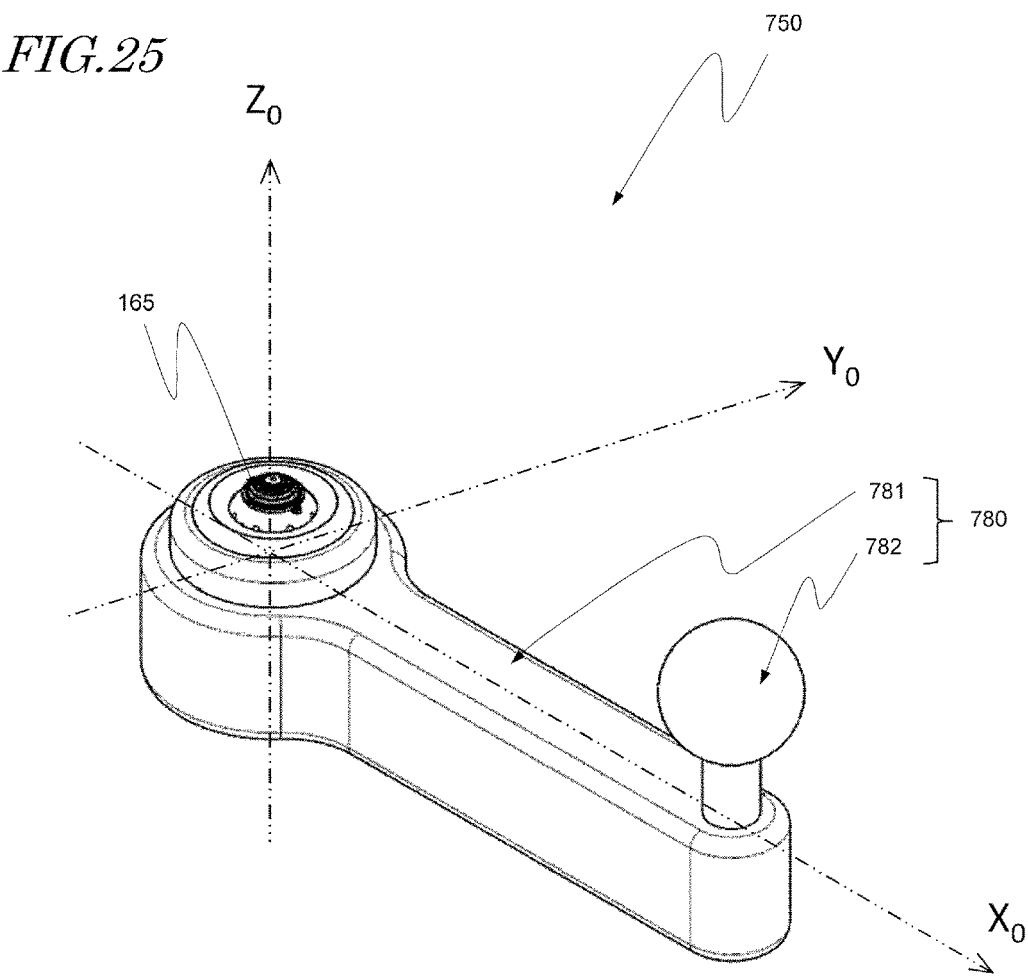
FIG. 25 is a perspective view for illustrating a schematic configuration of the actuator 165 installed on a rotation operation lever 780 in the input/output operation device 750 according to a second embodiment of the present invention.
Figure 26A:
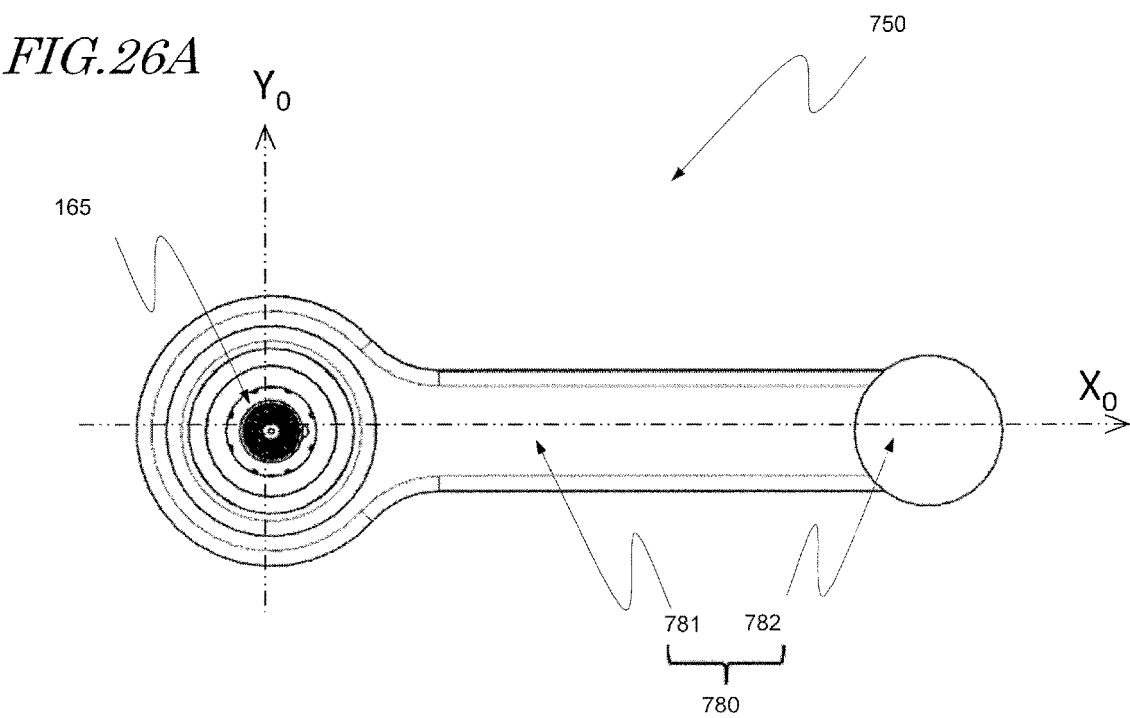
FIG. 26A is a top view for illustrating the actuator 165 installed on the rotation operation lever 780 according to the second embodiment of the present invention viewed from above in a Z0 axis.
Figure 26B:
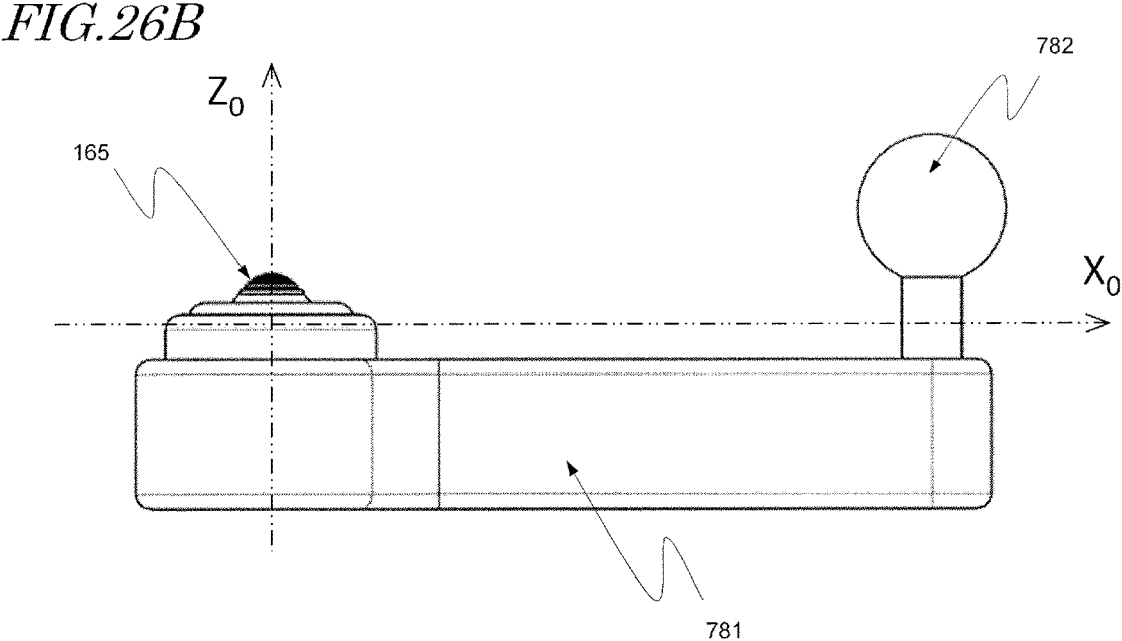
FIG. 26B is a plan view for illustrating the actuator 165 installed on the rotation operation lever 780 according to the second embodiment of the present invention viewed from above in a Y0 axis.

A description is given of an input/output operation device according to a second embodiment of the present invention. As illustrated in FIG. 25, the input/output operation device 750 according to this embodiment includes the actuator 165 and a rotation operation lever 780. As illustrated in FIG. 25, FIG. 26A, and FIG. 26B, the rotation operation lever 780 is configured to rotate in a plane containing the Xo axis and the Yo axis about the Zo axis. The rotation operation lever 780 is constructed by a rotation lever part 781 on which the actuator 165 is installed on the Zo axis and an operation part 782 fixed to or rotationally supported at an end of the rotation lever part 781. The rotation operation lever 780 is another example of the rotation body configured to rotate about the rotation axis.

For example, the operator grips the operation part 782 and rotates the operation part 782 about the $Z_O$ axis by the right hand, and simultaneously operates the operation part 850 of the actuator 165 by the left hand.

As illustrated in FIG. 27A to FIG. 27E, when the rotation angle of the rotation operation lever 780 is at a neutral position (0 degrees), the straight line 14 and the straight line 13 of the actuator 165 installed on the rotation operation lever 780 match the Xo axis and the Yo axis for the operator operating a vehicle in which the rotation operation lever 780 is installed. Therefore, the coordinates of the display calculation processing part 700 and the coordinates of the actuator 165 match each other, and as described with reference to FIG. 16 and FIG. 17, the target position can be set, and the feedback control can be carried out. In other words, a target position or a target direction in the coordinate system of the display calculation processing part 700 stationary in the vehicle in which the rotation operation lever 780 is installed match a target position or a target direction in the coordinate of the actuator 165.

Figure 27A:
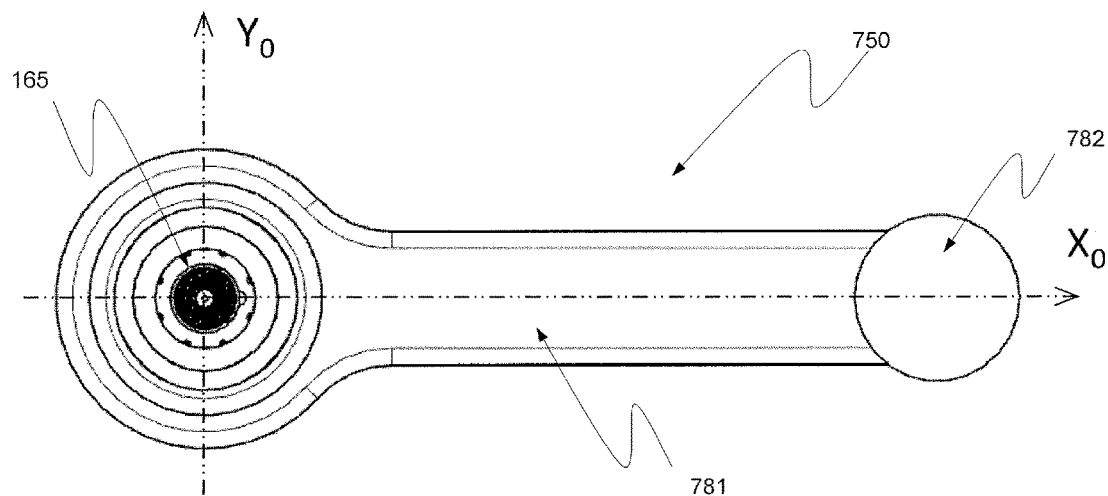
FIG. 27A is a diagram for illustrating an operation direction of the operation part of the actuator 165 when the rotation operation lever 780 is at a neutral position.
Figure 27B:
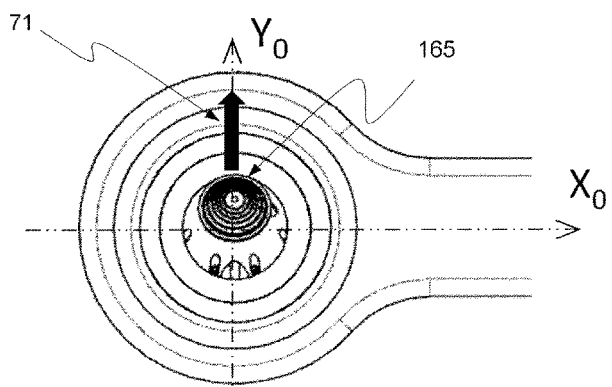
FIG. 27B is a diagram for illustrating an operation direction of the operation part of the actuator 165 when the rotation operation lever 780 is at the neutral position.
Figure 27C:
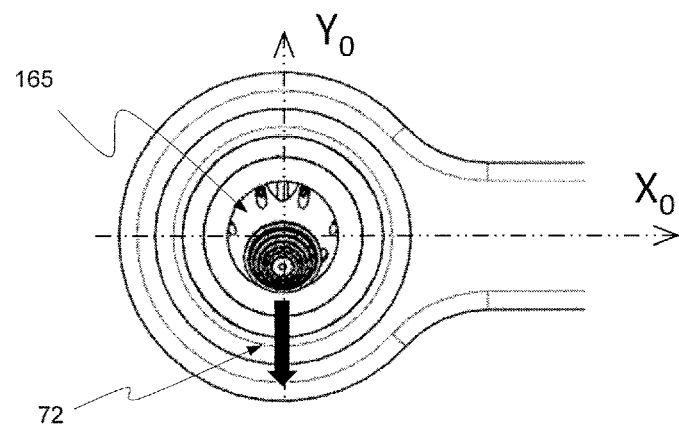
FIG. 27C is a diagram for illustrating an operation direction of the operation part of the actuator 165 when the rotation operation lever 780 is at the neutral position.
Figure 27D:
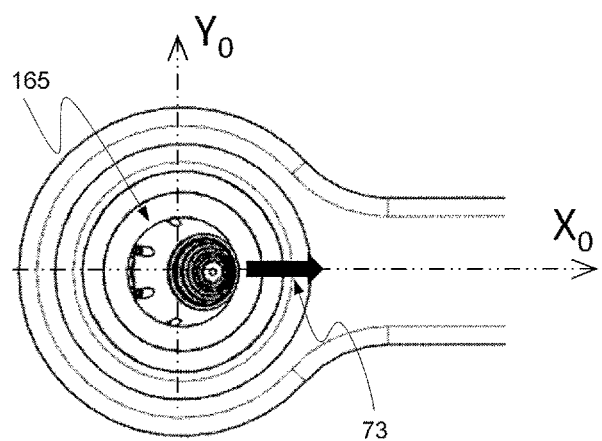
FIG. 27D is a diagram for illustrating an operation direction of the operation part of the actuator 165 when the rotation operation lever 780 is at the neutral position.
Figure 27E:
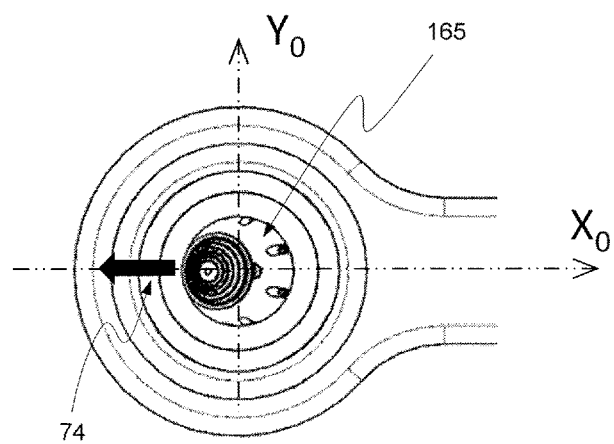
FIG. 27E is a diagram for illustrating an operation direction of the operation part of the actuator 165 when the rotation operation lever 780 is at the neutral position.

As illustrated in FIG. 27B and FIG. 27C, an operation in an upward direction 71 and an operation in a downward direction 72 in the vertical direction of the operation part 850 installed on the movable unit 180 of the actuator 165 match the upward direction and the downward direction in the Y axis direction in the coordinates of the display calculation processing part 700. Similarly, as illustrated in FIG. 27D and FIG. 27E, an operation in a rightward direction 73 and an operation in a leftward direction 74 of the operation part 850 installed on the movable unit 180 of the actuator 165 match the rightward direction and the leftward direction in the X axis direction in the coordinates of the display calculation processing part 700.

Figure 28A:
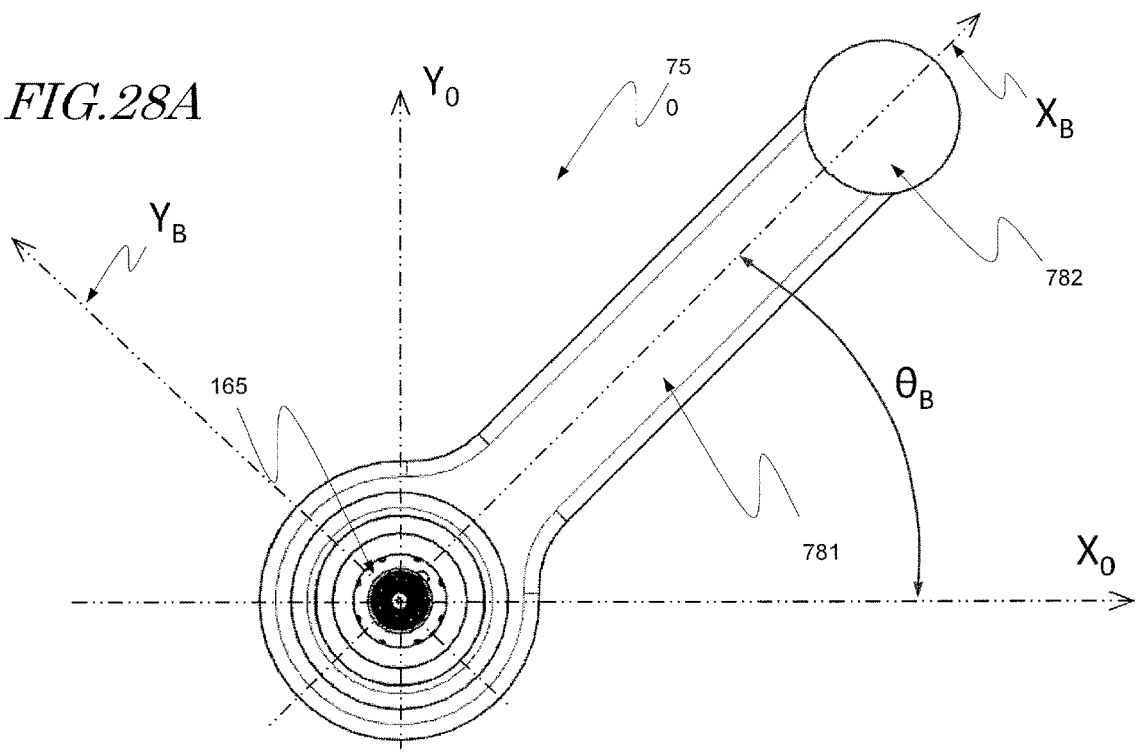
FIG. 28A is a diagram for illustrating an operation direction when the coordinate conversion for the actuator 165 is carried out under a state in which the rotation operation lever 780 is rotated by an operation rotation angle θB about the Z0 axis in the input/output operation device 750 according to the second embodiment of the present invention.
Figure 28B:
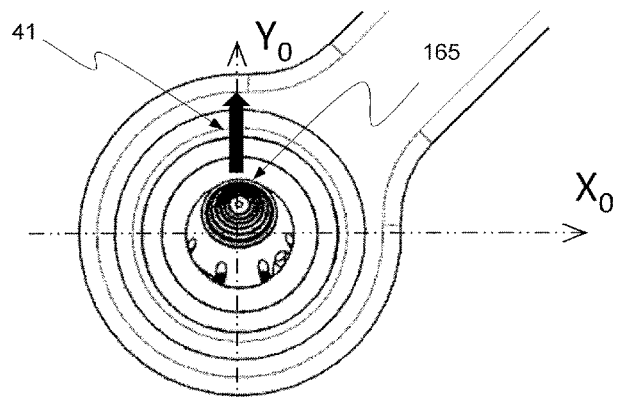
FIG. 28B is a diagram for illustrating an operation direction when the coordinate conversion for the actuator 165 is carried out under the state in which the rotation operation lever 780 is rotated by the operation rotation angle θB about the Z0 axis in the input/output operation device 750 according to the second embodiment of the present invention.
Figure 28C:
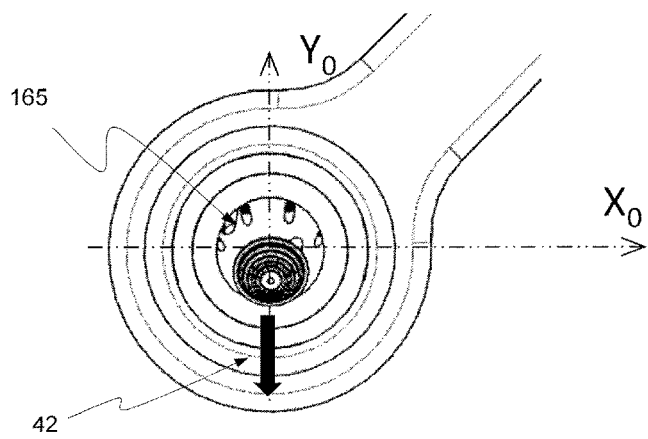
FIG. 28C is a diagram for illustrating an operation direction when the coordinate conversion for the actuator 165 is carried out under the state in which the rotation operation lever 780 is rotated by the operation rotation angle θB about the Z0 axis in the input/output operation device 750 according to the second embodiment of the present invention.
Figure 28D:
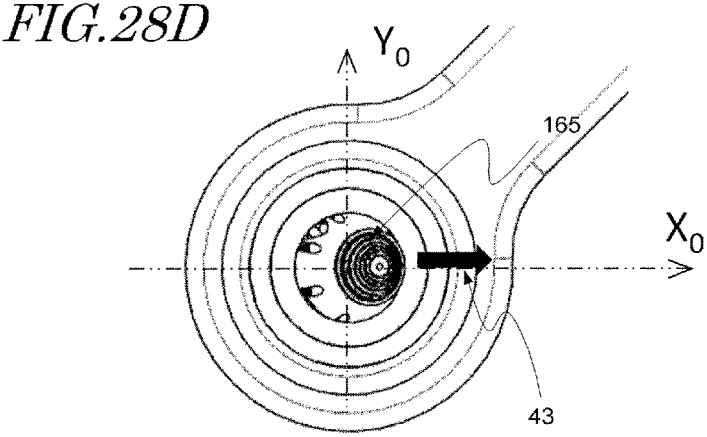
FIG. 28D is a diagram for illustrating an operation direction when the coordinate conversion for the actuator 165 is carried out under the state in which the rotation operation lever 780 is rotated by the operation rotation angle θB about the Z0 axis in the input/output operation device 750 according to the second embodiment of the present invention.
Figure 28E:
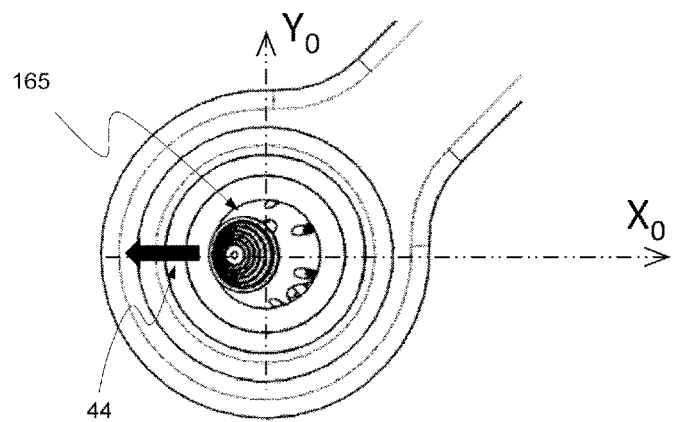
FIG. 28E is a diagram for illustrating an operation direction when the coordinate conversion for the actuator 165 is carried out under the state in which the rotation operation lever 780 is rotated by the operation rotation angle θB about the Z0 axis in the input/output operation device 750 according to the second embodiment of the present invention.

As illustrated in FIG. 28A, when the rotation operation lever 780 is rotated by an angle θB about the Zo axis, the straight line 14 and the straight line 13 of the actuator 165 do not match the Xo axis and the Yo axis.

As illustrated in FIG. 28B to FIG. 28E, the upward and downward operations in the vertical direction and the leftward and rightward operations in the horizontal direction of the actuator 165 are different from operation directions 57 and 58 and the Xo axis and the Yo axis of the vehicle in which the rotation operation lever 780 is provided.

Therefore, as illustrated in FIG. 27A to FIG. 27E, when the operation directions 71 and 72 and the operation directions 73 and 74 are defined as target directions in the 700 so that the operation part 850 of the actuator 165 is moved, in the directions of the straight line 14 and the straight line 13 while the state in which the rotation angle of the rotation operation lever 780 is 0 degrees is set as a reference, the operator is required to carry out an operation in a direction different from the horizontal direction and the vertical direction displayed on the display calculation processing part 700.

According to the second embodiment, in order to solve this mismatch, the coordinates in the actuator 165 are converted depending on the rotation angle of the rotation operation lever 780 so that the coordinates match the coordinates of the display calculation processing part 700, which is the stationary coordinate system.

For example, as illustrated in FIG. 28B to FIG. 28E, when the operation part 850 of the actuator 165 is driven in the Xo axis direction and the Yo axis direction in the coordinates of the display calculation processing part 700, and the operation part 850 is driven (in the operation directions 41 to 44) at angles acquired by respectively subtracting θB at the coordinates of the actuator 165, the coordinates in the actuator 165 match the coordinate system of the display calculation processing part 700, that is, the Xo axis and the Yo axis for the operator operating the vehicle in which the rotation operation lever 780 is installed. Conversely, when the coordinates ($X_A$-$Y_A$ coordinate system) of the actuator 165 are converted to the coordinates (Xo-Yo coordinate system) of the display calculation processing part 700, $θ_B$ only needs to be added to $θ_O$.

For example, as illustrated in FIG. 29B to FIG. 29E, when the operation part 850 of the actuator 165 is driven in the Xo axis and the Yo axis in the coordinates of the display calculation processing part 700, and the operation part 850 is driven (in the operation directions 61 to 64) at angles acquired by respectively adding $θ_B$ at the coordinates of the actuator 165, the coordinates in the actuator 165 match, the coordinate system of the display calculation processing part 700, that is, the Xo axis and the Yo axis for the operator operating the vehicle in which the rotation operation lever 780 is installed. When the coordinates ($X_A$-$Y_A$ coordinate system) of the actuator 165 are converted to the coordinates (Xo-Yo coordinate system) of the display calculation processing part 700, $θ_B$ is subtracted from $θ_O$.

As illustrated in FIG. 17, those coordinate conversions are realized by the control calculation processing part 94 receiving the signal 83 relating to the rotation angle $θ_B$ of the rotation operation lever 780 from a rotation sensor or the like provided on the rotation shaft of the rotation operation lever 780, and applying the above-mentioned calculation to the rotation angle signals 89x and 89y and the target position coordinate signals 80x and 80y of the movable unit 180. Specifically, the control calculation processing part carries out the calculation described in the first embodiment with reference to FIG. 21B. In other words, the control calculation processing part 94 uses the Xo-Yo coordinate system, which is the stationary coordinate system with respect to 0 degrees, which is the reference rotation angle of the rotation operation lever 780, to carry out control of driving the operation part 850 provided on the movable unit 180 of the actuator even when the rotation operation lever 780 is held at a different rotation angle $θ_B$.

As a result, for example, when the target direction displayed on the display calculation processing part 700 is the vertical direction or the horizontal direction, and the rotation operation lever 780 is at any rotation angle, correct input can be made by operating the operation part 850 of the actuator 165 toward the direction displayed on the display calculation processing part 700. Moreover, when the rotation operation lever 780 is at any rotation angle, the operation part 850 of the actuator 185 can be driven toward the target direction displayed on the display calculation processing part 700.

A description has been given of the case in which the operation direction of the rotation operation lever 780 is held constant so as to be parallel with the horizontal direction $X_0$ and the vertical direction $Y_0$, but it should be understood that the operation direction can be held constant at a specified certain angle.

Even when the rotation operation lever 780 is rotated in this way, the operation direction of the actuator 165 of the input/output operation device 750 is held constant in the directions, which are the $X_0 Y_0$ absolute coordinates, and the determination/recognition of the operation is thus extremely simplified. As a result, safety and security of the HMI is realized by enabling a different operation with the left hand in parallel, suppressing the movement of the line of sight of the driver, and further enabling a touch operation without looking at a steering wheel through the tactile/force sense, and the switch operation for the determination/selection independently of the direction even during traveling particularly while the rotation operation lever 780 is rotated by the right hand.

INDUSTRIAL APPLICABILITY

The input/output operation device disclosed in this application is preferably used as a human-machine interface (HMI) to be used in various fields, and is preferably used as an input/output operation device for operating, for example, a navigation system, an air conditioner, an audio device, and a radio in a vehicle.

REFERENCE SIGNS LIST

10 Z axis
11, 12 rotation axis
13, 14 straight line
20, 21, 22 rotation direction
94 control calculation processing part
70 spherical center
850 operation part
180 movable unit
102W opening part
102R protruded spherical surface
165 actuator
200 base
200A recessed spherical surface
200F, 280T opening part
201 detachment prevention member
201A detachment prevention restriction surface
203, 204 magnetic yoke
301, 302, 303 drive coil
350 drive circuit part
360 detection circuit part
401, 402 drive magnet
406 inclination angle detection magnet
501a, 501b, 503a, 503b magnetic sensor
508 magnetic bias magnet
550 steering wheel
551 rim
552 hub
553 rotation shaft
600 coil spring
650 coupling rod
670 magnetic back yoke
700 display calculation processing part
750 steering input/output operation device
780 rotation operation lever
781 rotation lever
782 operation part

The invention claimed is:

1. An input/output operation device, comprising:
   an actuator comprising:
      a movable unit comprising an operation part, which has a surface with which a finger comes in contact, and one of a recessed contact surface and a protruded spherical surface located inside, the movable unit being freely rotatable independently about two axes orthogonal to each other;
      a fixed unit comprising the other one of the recessed contact surface and the protruded spherical surface, the one of the recessed contact surface and the protruded spherical surface of the movable unit loosely fitting the other one of the recessed contact surface and the protruded spherical surface of the fixed unit, and the other one of the recessed contact surface and the protruded spherical surface being in point- or line-contact with each other, the fixed unit supporting, for free rotation, the movable unit about a spherical center of the protruded spherical surface; and
      a driver driving the movable unit with respect to the fixed unit;
   a detection circuit part to output a position signal corresponding to a position of the operation part;
   a drive circuit part controlling the driver;
   a control calculation processing circuit controlling the drive circuit part; and
   a rotation body on which the actuator is installed, and which rotates about a rotation axis,
   wherein the control calculation processing circuit is configured to receive a current rotation angle of the rotation body, convert, based on the current rotation angle, current position coordinates of the operation part from an actuator coordinate system that moves with the actuator to current position coordinates of a stationary coordinate system that is fixed with respect to a reference rotation angle of the rotation body, and control the drive of the operation part, at different rotation angles of the rotation body, based on the current position coordinates of the stationary coordinate system.

2. The input/output operation device of claim 1, wherein:
   the two axes comprise an X axis and a Y axis orthogonal to the X axis, the X axis and the Y axis having an origin located at the spherical center of the protruded spherical surface;
   the fixed unit comprises at least one magnetic substance;
   the movable unit comprises at least one attraction magnet, and freely rotates about the spherical center of the protruded spherical surface by a magnetic attraction force between the at least one attraction magnet and the at least one magnetic substance;
   the driver comprises:
      a first driver rotating the movable unit about the X axis passing through the spherical center; and a second driver rotating the movable unit about the Y axis in a plane containing the X axis;

the detection circuit part generates a first rotation angle signal and a second rotation angle signal corresponding to a first rotation angle about the X axis of the movable unit and a second rotation angle about the Y axis of the movable unit, respectively; and the control calculation processing circuit generates a first target rotation angle signal corresponding to a rotation angle about the X axis and a second target rotation angle signal corresponding to a rotation angle about the Y axis.

3. The input/output operation device of claim 2, wherein the stationary coordinate system has an origin corresponding to the spherical center of the protruded spherical surface.

4. The input/output operation device of claim 3, wherein:
the driver further comprises a third driver rotating the movable unit about a Z axis passing through the spherical center and orthogonal to the X axis and the Y axis;

the detection circuit part generates a third rotation angle signal corresponding to a third rotation angle about the Z axis of the movable unit;

the control calculation processing circuit generates a drive signal having a predetermined drive waveform pattern;

the drive circuit part receives the drive signal to generate a signal for driving the third driver; and the movable unit is driven for vibration in a direction about the Z axis by the third driver.

5. The input/output operation device of claim 4, wherein the predetermined drive waveform pattern includes a vibration waveform including a frequency component in an audible range.

6. The input/output operation device of claim 2, wherein the control calculation processing circuit generates the current position coordinates of the operation part in the actuator coordinate system, which is a two-dimensional coordinate system corresponding to a movable range area of the operation part based on the first rotation angle signal and the second rotation angle signal and generates the first target rotation angle signal and the second target rotation angle signal based on position feedback control using a difference between target position coordinates and the current position coordinates of the operation part in the actuator coordinate system.

7. The input/output operation device of claim 2, wherein the movable unit comprises the recessed contact surface, and the fixed unit comprises the other one of the recessed contact surface and the protruded spherical surface.

8. The input/output operation device of claim 7, wherein the recessed contact surface comprises a conical surface.

9. The input/output operation device of claim 2, wherein the movable unit comprises the protruded spherical surface, and the fixed unit comprises the other one of the recessed contact surface and the protruded spherical surface.

10. The input/output operation device of claim 2, further comprising a detachment prevention member arranged in the fixed unit, the detachment prevention member comprising a restriction surface for restricting movement of the movable unit so as to prevent the movable unit from being detached from the fixed unit, wherein the restriction surface comprises a recessed partial spherical surface having a center matching the spherical center.

11. The input/output operation device of claim 10, wherein:
the restriction surface of the detachment prevention member and the external shape surface of the movable unit has a gap formed therebetween; and the gap is determined so that, even when the one of the recessed contact surface and the protruded spherical surface of the movable unit is separated from the other one of the recessed contact surface and the protruded spherical surface of the fixed unit, the movable unit and the fixed unit return to the point- or line-contact state by the magnetic attraction force.

12. The input/output operation device of claim 2, wherein a center of gravity of the movable unit matches the spherical center.

13. The input/output operation device of claim 4, wherein:
the fixed unit further comprises a base and a coupling rod fixing the other one of the recessed contact surface and the protruded spherical surface to the base; and the movable unit comprises an opening part into which the coupling rod is to be inserted, and a rotation angle of the movable unit is restricted by contact between the opening part and the coupling rod.

14. The input/output operation device of claim 13, wherein the third driver comprises third drive coils wound on the pair of first magnetic yokes and the pair of second magnetic yokes, respectively, and uses the pair of first drive magnets and the pair of second drive magnets as third drive magnets.

15. The input/output operation device of claim 14, wherein the driver further comprises a pair of magnetic back yokes, which are arranged on the spherical center side of the movable unit, and couple one of the pair of first drive magnets and one of the pair of second drive magnets to each other, and to couple another one of the pair of first drive magnets and another one of the pair of second drive magnets to each other.

16. The input/output operation device of claim 14, wherein the pair of first drive coils, the pair of second drive coils, and the third drive coils are each arranged inside the fixed unit, and are each inhibited from being exposed on an external shape surface of the fixed unit.

17. The input/output operation device of claim 4, wherein:
the first driver comprises a pair of first drive magnets arranged symmetrically about the Z axis in the movable unit, a pair of first magnetic yokes arranged on a base of the fixed unit so as to be opposed to the pair of first drive magnets, respectively, and a pair of first drive coils wound on the pair of first magnetic yokes, respectively;

the second driver comprises a pair of second drive magnets arranged symmetrically about the Z axis in the movable unit, a pair of second magnetic yokes arranged on the base of the fixed unit so as to be opposed to the pair of second drive magnets, respectively, and a pair of second drive coils wound on the pair of second magnetic yokes, respectively;

the pair of first drive magnets and the pair of first drive coils are arranged on one straight line passing through the spherical center of the protruded spherical surface;

the pair of second drive magnets and the pair of second drive coils are arranged on another straight line passing through the spherical center of the protruded spherical surface and orthogonal to the one straight line; and respective positions in the Z axis direction of centers of the pair of first drive magnets, the pair of first drive coils, the pair of second drive magnets, and the pair of second drive coils substantially match a position of the spherical center of the protruded spherical surface.

18. The input/output operation device of claim 17, wherein the pair of first drive magnets and the pair of second drive magnets are each positioned inside the movable unit, and are each inhibited from being exposed on an external shape surface of the movable unit.

19. The input/output operation device of claim 4, wherein under a state in which the movable unit is at a neutral position, the pair of first drive magnets and the pair of second drive magnets are arranged downward at a rotation angle A equal to or less than 45 degrees with respect to a horizontal surface passing through the spherical center and vertical to the Z axis, and the pair of first drive coils and the pair of first magnetic yokes, and the pair of second drive coils and the pair of second magnetic yokes are arranged to be rotated with respect to the fixed unit so as to be opposed to the pair of first drive magnets and the pair of second drive magnets, respectively.

20. The input/output operation device of claim 19, wherein the rotation angle A is equal to or more than 15 degrees and equal to or less than 25 degrees.

* * * * *